(12) United States Patent
Yamada et al.

(10) Patent No.: US 8,508,797 B2
(45) Date of Patent: Aug. 13, 2013

(54) IMAGE PROCESSING DEVICE AND IMAGE PROCESSING METHOD

(75) Inventors: Akitoshi Yamada, Yokohama (JP); Mitsuhiro Ono, Tokyo (JP); Rie Kajihara, Minoo (JP); Tomokazu Ishikawa, Kawasaki (JP); Yuji Konno, Kawasaki (JP); Yutaka Kano, Yokohama (JP); Hitoshi Nishikori, Inagi (JP); Norihiro Kawatoko, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 12/917,206

(22) Filed: Nov. 1, 2010

(65) Prior Publication Data
US 2011/0043838 A1 Feb. 24, 2011

Related U.S. Application Data

(63) Continuation of application No. PCT/JP2010/060314, filed on Jun. 17, 2010.

(30) Foreign Application Priority Data

Jun. 18, 2009 (JP) ................................. 2009-145448

(51) Int. Cl.
*H04N 1/60* (2006.01)
(52) U.S. Cl.
USPC .......................... 358/1.9; 358/3.01; 358/3.03
(58) Field of Classification Search
USPC ............. 358/1.9, 3.01, 3.03, 3.05, 1.15, 3.23, 358/3.26, 518
See application file for complete search history.

(56) References Cited

U.S. PATENT DOCUMENTS

| 6,511,143 B1 | 1/2003 | Ishikawa et al. |
| 6,525,838 B1 * | 2/2003 | Nagae et al. ................. 358/3.01 |

(Continued)

FOREIGN PATENT DOCUMENTS

| JP | 2000-103088 A | 4/2000 |
| JP | 2001-150700 A | 6/2001 |
| JP | 2008-162151 A | 7/2008 |

*Primary Examiner* — Kimberly A Williams
(74) *Attorney, Agent, or Firm* — Canon USA Inc. IP Division

(57) ABSTRACT

When recording is performed in a pixel region by M (M is an integer equal to or larger than 2) passes with N (N is an integer equal to or larger than 2) recording element groups, density variation due to a deviation between recording positions of dots that are recorded by different passes is suppressed while a load of data processing is decreased.

First, multivalued image data (24-1 to 24-2) corresponding to the M passes is generated from input image data, and the multivalued image data corresponding to the M passes is quantized to generate quantized data (26-1 to 26-2) corresponding to the M passes. Then, the quantized data corresponding to the M passes is divided into quantized data being complements of each other and corresponding to the N recording element groups. Accordingly, the quantized data (28-1 to 28-4) corresponding to the M passes for the N recording element groups is obtained. With this configuration, the density variation due to the deviation between the recording positions by the M passes can be suppressed. Also, since the number of pieces of data subjected to the quantization is small, the load of the quantization can be decreased.

18 Claims, 42 Drawing Sheets

(56) References Cited

U.S. PATENT DOCUMENTS

| | | | |
|---|---|---|---|
| 7,002,708 B2* | 2/2006 | Damera-Venkata | 358/1.9 |
| 7,327,491 B2* | 2/2008 | Kato et al. | 358/1.9 |
| 7,352,489 B2* | 4/2008 | Chang | 358/1.9 |
| 7,379,211 B2* | 5/2008 | Ishii et al. | 358/3.03 |
| 7,982,916 B2* | 7/2011 | Spaulding et al. | 358/3.03 |
| 8,098,403 B2* | 1/2012 | Spaulding et al. | 358/3.03 |
| 2009/0268226 A1* | 10/2009 | Horii | 358/1.14 |
| 2011/0075174 A1* | 3/2011 | Kajihara et al. | 358/1.9 |

* cited by examiner

FIG. 7A

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 1 | 0 |
|---|---|---|---|
| 1 | 0 | 0 | 0 |
| 0 | 1 | 0 | 1 |

FIG. 7B

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 1 | 0 |
|---|---|---|---|
| 1 | 1 | 0 | 0 |
| 0 | 0 | 0 | 1 |

FIG. 7C

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 1 | 0 |
|---|---|---|---|
| 1 | 1 | 0 | 0 |
| 0 | 0 | 0 | 1 |

FIG. 7D

FIRST PLANE

| 1 | 0 | 0 | 1 |
|---|---|---|---|
| 0 | 1 | 0 | 0 |
| 0 | 0 | 1 | 0 |

SECOND PLANE

| 1 | 0 | 0 | 1 |
|---|---|---|---|
| 0 | 1 | 0 | 0 |
| 0 | 0 | 0 | 1 |

FIG. 7E

FIRST PLANE

| 1 | 0 | 0 | 1 |
|---|---|---|---|
| 0 | 1 | 0 | 0 |
| 0 | 0 | 1 | 0 |

SECOND PLANE

| 1 | 0 | 0 | 1 |
|---|---|---|---|
| 0 | 1 | 0 | 0 |
| 0 | 0 | 1 | 0 |

FIG. 7F

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 0 | 1 |
|---|---|---|---|
| 0 | 1 | 0 | 0 |
| 0 | 0 | 1 | 0 |

FIG. 7G

FIRST PLANE

| 1 | 0 | 0 | 1 |
|---|---|---|---|
| 0 | 1 | 0 | 0 |
| 0 | 0 | 1 | 0 |

SECOND PLANE

| 0 | 0 | 0 | 0 |
|---|---|---|---|
| 0 | 1 | 0 | 0 |
| 0 | 0 | 0 | 1 |

FIG. 7H

|   | TOTAL NUMBER OF DOTS (PIECE) | NUMBER OF OVERLAP DOTS (PIECE) | DOT OVERLAP RATIO (%) |
|---|---|---|---|
| (A) | 8 | 0 | $0 (= 0 \div 8 \times 100)$ |
| (B) | 8 | 2 | $25 (= 2 \div 8 \times 100)$ |
| (C) | 8 | 4 | $50 (= 4 \div 8 \times 100)$ |
| (D) | 8 | 6 | $75 (= 6 \div 8 \times 100)$ |
| (E) | 8 | 8 | $100 (= 8 \div 8 \times 100)$ |
| (F) | 7 | 6 | $86 (= 6 \div 7 \times 100)$ |
| (G) | 6 | 2 | $33 (= 2 \div 6 \times 100)$ |

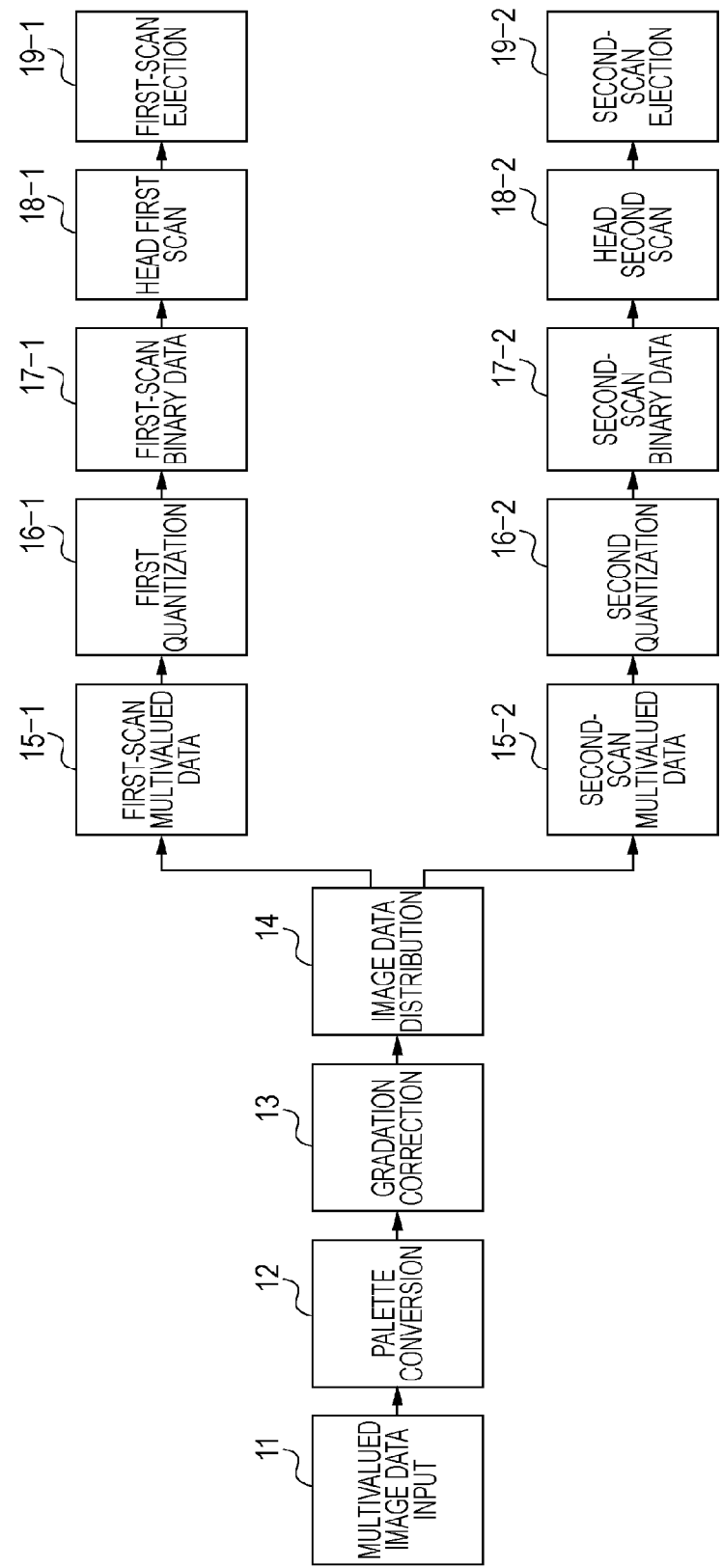

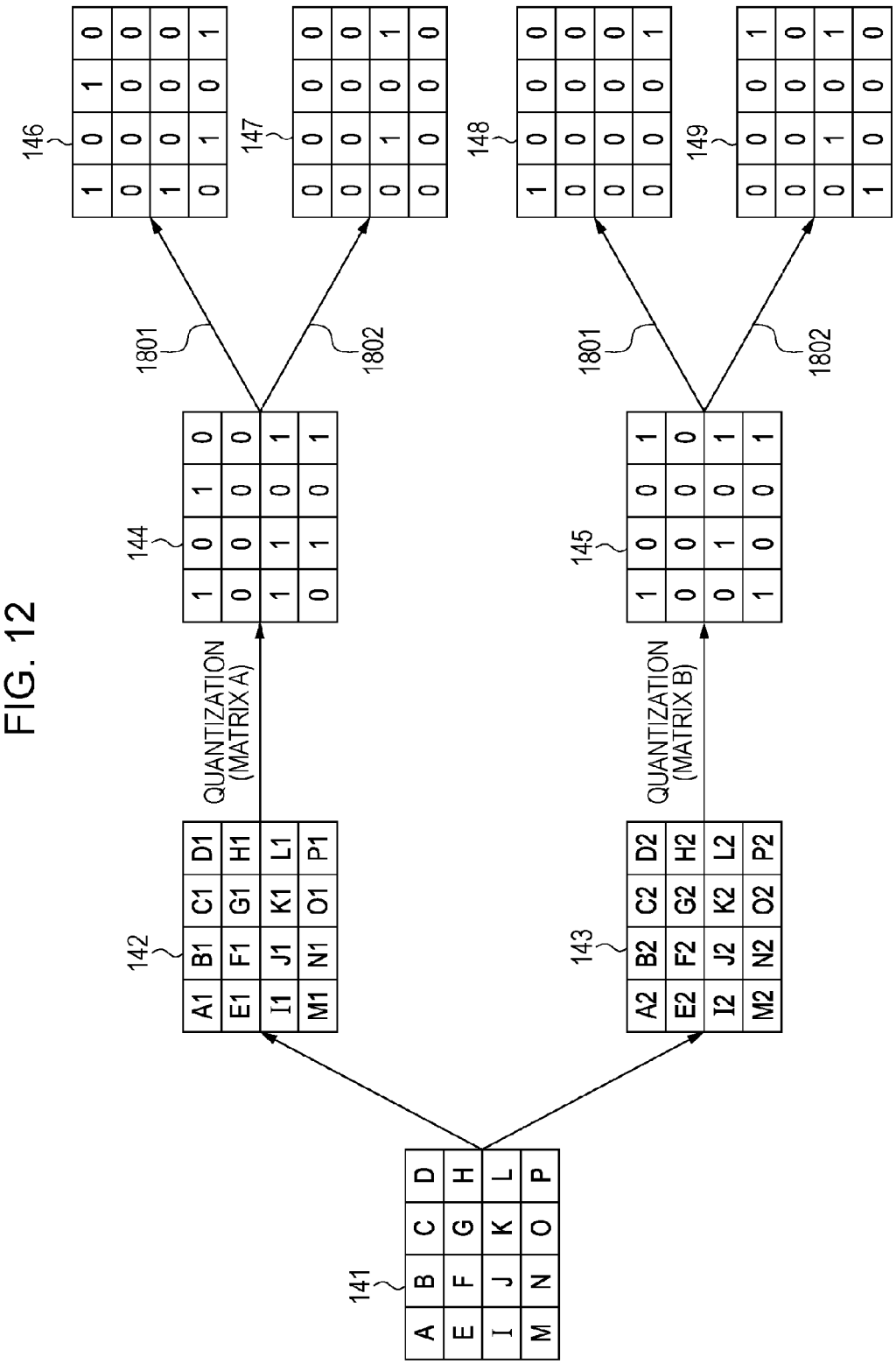

FIG. 13A

DIFFUSION MATRIX A

|  | ● | 9 | 3 |
|---|---|---|---|
| 5 | 9 | 3 |  |
|  | 3 |  |  |

● IS PIXEL TO BE PROCESSED

FIG. 13B

DIFFUSION MATRIX B

| | | ● | 2 | 1 |
|---|---|---|---|---|
| 1 | 1 | 2 | 1 | |

● IS PIXEL TO BE PROCESSED

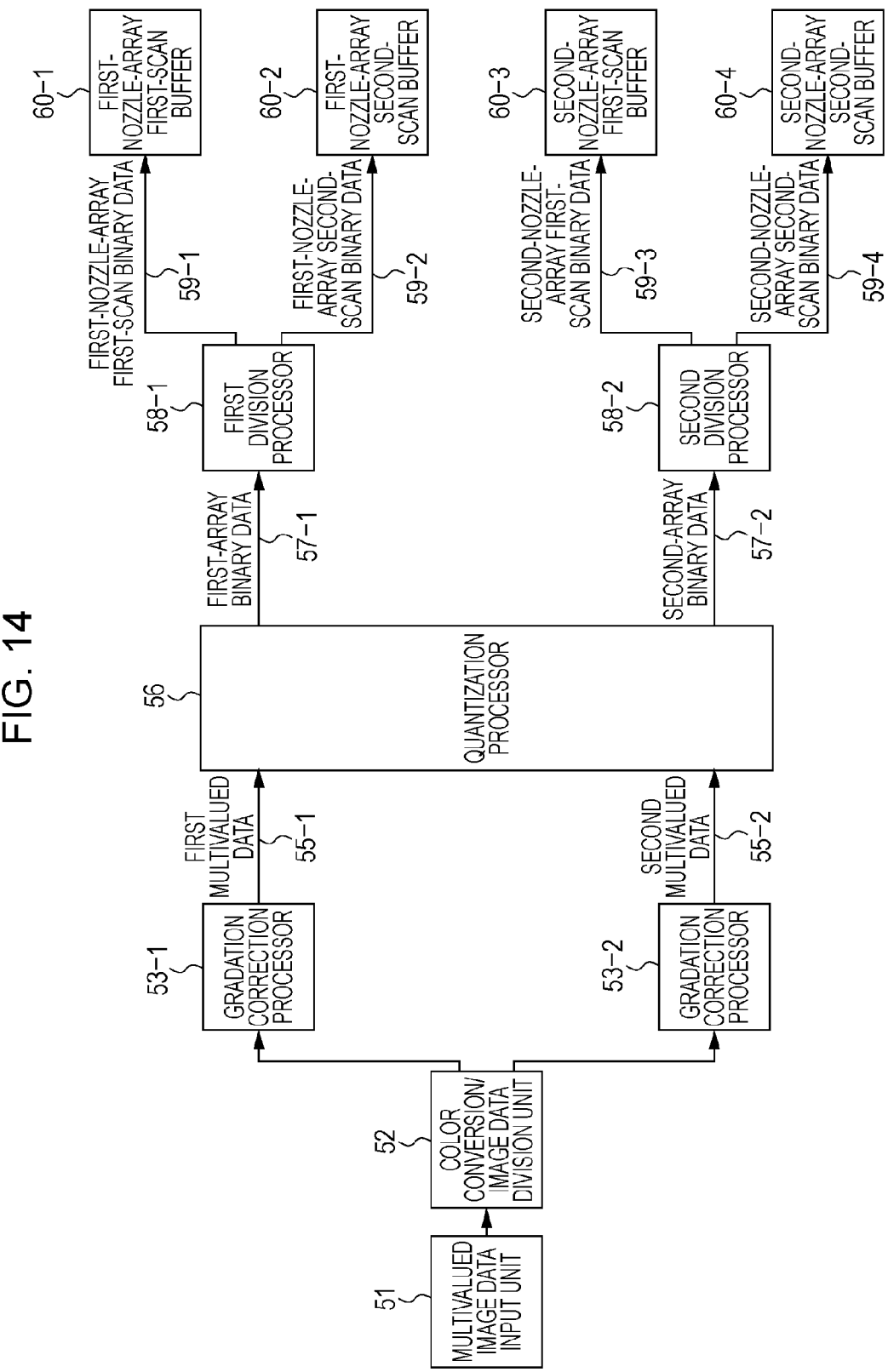

IMAGE PROCESSING DEVICE AND IMAGE PROCESSING METHOD

This application is a Continuation of International Application No. PCT/JP2010/060314, filed Jun. 17, 2010, which claims the benefit of Japanese Patent Application No. 2009-145448, filed Jun. 18, 2009, both of which are hereby incorporated by reference herein in their entirety.

TECHNICAL FIELD

The present invention relates to an image processing apparatus and an image processing method each of which processes input image data corresponding to an image to be recorded in a single region of a recording medium, to record the image in the single region of the recording medium by a plurality of relative movements between the recording medium and recording means that includes a plurality of recording element groups.

BACKGROUND ART

A known example of a recording system that uses a recording head including a plurality of recording elements for recording dots may be an inkjet recording system that records dots on a recording medium by ejecting ink from recording elements (nozzles). Inkjet recording apparatuses of such a system may be classified into a full-line type and a serial type depending on the difference between configurations of the types. With any one of the full-line type and serial type, an ejection quantity and an ejection direction may vary among the plurality of recording elements of the recording head. Then, the variation may cause density unevenness and lines to appear in an image.

A known technique that decreases the density unevenness and lines may be a multi-pass recording system. The multi-pass recording system divides image data that is recorded in a single region of a recording medium, into image data that is recorded by a plurality of recording scans. The divided image data is successively recorded by the plurality of recording scans with a conveyance operation. Accordingly, even if ejection characteristics of individual recording elements vary, dots that are recorded by a single recording element are not continuously arranged in a scanning direction. Influences of the individual recording elements can be spread in a wide range. Consequently, a uniform and smooth image can be obtained.

The multi-pass recording system may be applied to a recording apparatus of the serial type or a full-multi type including a plurality of recording heads (a plurality of recording element groups) that eject ink of a single type. In particular, image data is divided into image data that is recorded by the plurality of recording element groups for ejecting the ink of the single type, and the divided image data is recorded by the plurality of recording element groups during at least a single relative movement. Consequently, even if the ejection characteristics of the individual recording elements vary, the influences of variation can be reduced. Further, the above-mentioned two recording methods may be combined, to record an image by the plurality of recording scans with the plurality of recording element groups for ejecting the ink of the single type.

Conventionally, when image data is divided, a mask is used. The mask has data that permits recording of a dot (1: data that does not mask image data) and data that does not permit recording of a dot (0: data that masks image data), the former data and the latter data being previously arranged in the mask. To be more specific, logical multiplication is performed between the mask and binary image data that is recorded in a single region of a recording medium. Thus, the binary image data is divided into binary image data that is recorded by the recording scans or recording heads.

In such a mask, the arrangement of the recording permissive data (1) is determined such that the plurality of recording scans (or the plurality of recording heads) are complements of each other. That is, a dot is recorded on a pixel, on which binarized image data is recorded (1), by one of the recording scans or one of the recording heads. Hence, image information before the division can be saved even after the division.

However, the multi-pass recording may cause another problem, such as density variation or density unevenness due to a deviation between recording positions (registration) on a recording scan basis or a recording head (recording element group) basis. The deviation between the recording positions on a recording scan basis or a recording element group basis represents a deviation as follows. The deviation is a deviation between dot groups (planes), i.e., a deviation between a dot group (plane) recorded by a first recording scan (or one recording element group) and a dot group (plane) recorded by a second recording scan (or another recording element group). The deviation between the planes results from, for example, a variation in distance (gap) between a recording medium and a surface with ejection ports, or a variation in conveyance distance of the recording medium. If the deviation between the planes occurs, a dot coverage may vary, and this may result in the density variation and density unevenness. Hereinafter, like the case described above, a dot group or a pixel group that is recorded by a single recording scan with one means (for example, a single recording element group that ejects a single type of ink) is called "plane."

In light of the situations, since a high-quality image is being desired, a method for processing image data for multi-pass recording is requested, the method which can deal with a deviation between recording positions of planes resulting from variations in various recording conditions. Hereinafter, no matter which recording condition causes the deviation between the recording positions of the planes, a resistance to the density variation and density unevenness resulting from the deviation is called "robustness" in this specification.

Patent Literatures 1 and 2 each disclose a method for processing image data to increase robustness. Those literatures focus on that a variation in image density resulting from variations in various recording conditions occurs because binary image data, which is distributed to correspond to different recording scans or different recording element groups, is fully complements of each other. If image data corresponding to different recording scans or different recording element groups is generated such that the complementary relationship is degraded, multi-pass recording with good "robustness" can be provided. Regarding those literatures, to prevent significant density variation from occurring even if a plurality of planes are shifted from each other, multivalued image data before binarization is divided into data corresponding to the different recording scans or recording element groups, and the divided multivalued image data is individually binarized.

FIG. 10 is a block diagram showing the method for processing image data described in each of Patent Literature 1 and 2. The method distributes multivalued image data into two recording scans. Multivalued image data (RGB) input from a host computer is converted by palette conversion 12 into multivalued density data (CMYK) corresponding to ink colors provided in a recording apparatus. Then, gradation correction (13) is performed for the multivalued density data (CMYK). The following processing is performed individually for black (K), cyan (C), magenta (M), and yellow (Y).

Multivalued density data of each color is distributed by image data distribution 14 into first-scan multivalued data 15-1 and second-scan multivalued data 15-2. In particular, if a value of multivalued image data of black is "200," "100" which is a half the "200" is distributed for a first scan, and "100" which is the other half is distributed for a second scan. Then, the first-scan multivalued data 15-1 is quantized by first quantization 16-1 in accordance with a predetermined diffusion matrix, converted into first-scan binary data 17-1, and stored in a first-scan band memory. Meanwhile, the second-scan multivalued data 15-2 is quantized by second quantization 16-2 in accordance with a predetermined diffusion matrix that is different from the matrix of the first quantization, converted into second-scan binary data 17-2, and stored in a second-scan band memory. During the first recording scan and the second recording scan, ink is ejected in accordance with the binary data stored in the band memories. The case in which the single image data is distributed into the two recording scans has been described with reference to FIG. 10. Also, Patent Literatures 1 and 2 disclose a case in which single image data is distributed into two recording heads (two recording element groups).

FIG. 6A illustrates an arrangement state of dots (black dots) 1401 recorded by a first recording scan and dots (white dots) 1402 recorded by a second recording scan when image data is divided by using mask patterns that are complements of each other. Herein, density data of "255" is input for all pixels, and every pixel has a single dot recorded thereon by either the first recording scan or the second recording scan. That is, the dots recorded by the first recording scan and the dots recorded by the second recording scan are arranged not to overlap each other.

FIG. 6B illustrates an arrangement state of dots when image data is distributed by the method disclosed in each of Patent Literatures 1 and 2. In the drawing, black dots are dots 1501 recorded by the first recording scan, white dots are dots 1502 recorded by the second recording scan, and gray dots are dots 1503 redundantly recorded by the first recording scan and the second recording scan. In FIG. 6B, the dots recorded by the first recording scan and the dots recorded by the second recording scan are not complements of each other. Therefore, as compared with FIG. 6A with the fully complementary relationship, there are the part (the gray dots) 1503 in which two dots overlap each other, and a white region in which no dot is recorded appear.

Here, a case is considered in which a first plane that is a set of dots recorded by the first recording scan is deviated in a main-scanning direction or a sub-scanning direction by a single pixel from a second plane that is a set of dots recorded by the second recording scan. At this time, if the first plane and the second plane are complements of each other as shown in FIG. 6A, the dots recorded in the first plane completely overlap the dots recorded in the second plane, the white region is exposed, and the image density is markedly decreased. Although the deviation is smaller than the single pixel, if a distance between adjacent dots or an overlap part varies, the variation may significantly affect the dot coverage to the white region and even the image density. In other words, if the deviation between the planes varies because of the variation in distance (gap) between the recording medium and the surface with ejection ports or the variation in conveyance distance of the recording medium, a uniform image density may vary, and the variation is recognized as the density unevenness.

In contrast, in the case in FIG. 6B, although the first plane is deviated from the second plane by a single pixel, the dot coverage to the recording medium does not significantly vary. A part in which the dots recorded by the first recording scan overlap the dots recorded by the second recording scan may newly appear; however, a part, in which the redundantly recorded two dots are separated from one another, may also appear. Thus, regarding a region with a certain size, the dot coverage to the recording medium does not markedly vary, and the image density hardly varies. That is, with the method in each of Patent Literatures 1 and 2, even if the distance (gap) between the recording medium and the surface with ejection ports varies, or if the conveyance distance of the recording medium varies, the variation in image density and the occurrence of the density unevenness can be suppressed, and an image with good robustness can be output.

CITATION LIST

Patent Literature

PTL 1 Japanese Patent Laid-Open No. 2000-103088
PTL 2 Japanese Patent Laid-Open No. 2001-150700

However, with the method in each of Patent Literatures 1 and 2, when M-pass (M is an integer equal to or larger than 2) recording is performed by using N (N is an integer equal to or larger than 2) recording element groups that eject ink of a single type, multivalued image data is generated for N×M planes in accordance with input image data, and the multivalued image data for the N×M planes is quantized. Since the number of pieces of data subjected to the quantization may be large, a load of data processing may be large. With the conventional method, although the density variation can be suppressed, the load of data processing cannot be decreased.

The present invention is made in view of the above-described situations, and an object of the present invention is to provide an image processing apparatus and an image processing method each of which can suppress a density variation due to a deviation between recording positions of dots while a load of data processing is decreased.

SUMMARY OF INVENTION

Accordingly, the present invention provides an image processing apparatus that processes input image data corresponding to an image to be recorded in a predetermined region of a recording medium, to record the image in the predetermined region of the recording medium by a plurality of relative movements between the recording medium and recording means that includes a plurality of recording element groups for ejecting ink of a single color. The apparatus includes first generating means for generating multivalued image data for the single color corresponding to the plurality of relative movements from the input image data on a pixel basis; second generating means for quantizing the multivalued image data for the single color generated by the first generating means on a pixel basis to generate quantized data corresponding to the plurality of relative movements; and dividing means for dividing the quantized data generated by the second generating means and corresponding to the plurality of relative movements into quantized data having being complements of each other and corresponding to the plurality of recording element groups.

With the above configuration, since the multivalued image data corresponding to the M relative movements or the N recording element groups is quantized, the density variation due to a deviation between recording positions by the M relative movements or a deviation between recording positions by the N recording element groups can be suppressed. Also, the number of pieces of data subjected to the quantization corresponds to the N×M sets of data or the N×M planes according to the conventional method; however, in the present invention, since the number of pieces of data corresponds to the M (or N) sets of data or the M (or N) planes, the load of the quantization can be decreased.

Further features of the present invention will become apparent from the following description of exemplary embodiments with reference to the attached drawings.

BRIEF DESCRIPTION OF DRAWINGS

FIG. 7A is an illustration explaining a dot overlap ratio.
FIG. 7B is an illustration explaining a dot overlap ratio.
FIG. 7C is an illustration explaining a dot overlap ratio.
FIG. 7D is an illustration explaining a dot overlap ratio.
FIG. 7E is an illustration explaining a dot overlap ratio.
FIG. 7F is an illustration explaining a dot overlap ratio.
FIG. 7G is an illustration explaining a dot overlap ratio.
FIG. 7H is an illustration explaining the dot overlap ratios.

FIG. 10 is a block diagram explaining a method for distributing image data described in each of Patent Literatures 1 and 2.

FIG. 12 is a schematic illustration explaining a specific example of image processing shown in FIG. 21.

FIG. 13A illustrates an example of an error diffusion matrix used by quantization.

FIG. 13B illustrates an example of an error diffusion matrix used by quantization.

FIG. 14 is a block diagram explaining image processing when multi-pass recording is performed, the multi-pass recording which completes an image in a single region by two recording element groups.

DESCRIPTION OF EMBODIMENTS

Embodiments of the present invention will be described below with reference to the attached drawings.

The embodiments described below each use an inkjet recording apparatus. However, the present invention is not limited to the inkjet recording apparatus. Any apparatus, other than the inkjet recording apparatus, may be applied to the present invention as long as the apparatus is of a type that records an image on a recording medium by recording means for recording dots during a relative movement between the recording means and the recording medium.

The "relative movement (or relative scan)" between the recording means and the recording medium is an operation in which the recording means moves relative to (scans) the recording medium, or an operation in which the recording medium moves (is conveyed) relative to the recording means. When a serial-type recording apparatus executes multi-pass recording, a recording head performs scanning a plurality of times so that the recording means faces a single region of the recording medium a plurality of times. When a full-line-type recording apparatus executes multi-pass recording, the recording medium is conveyed a plurality of times so that the recording means faces a single region of the recording medium a plurality of times. The recording means is at least one recording element group (nozzle array) or at least one recording head.

Figure 11:
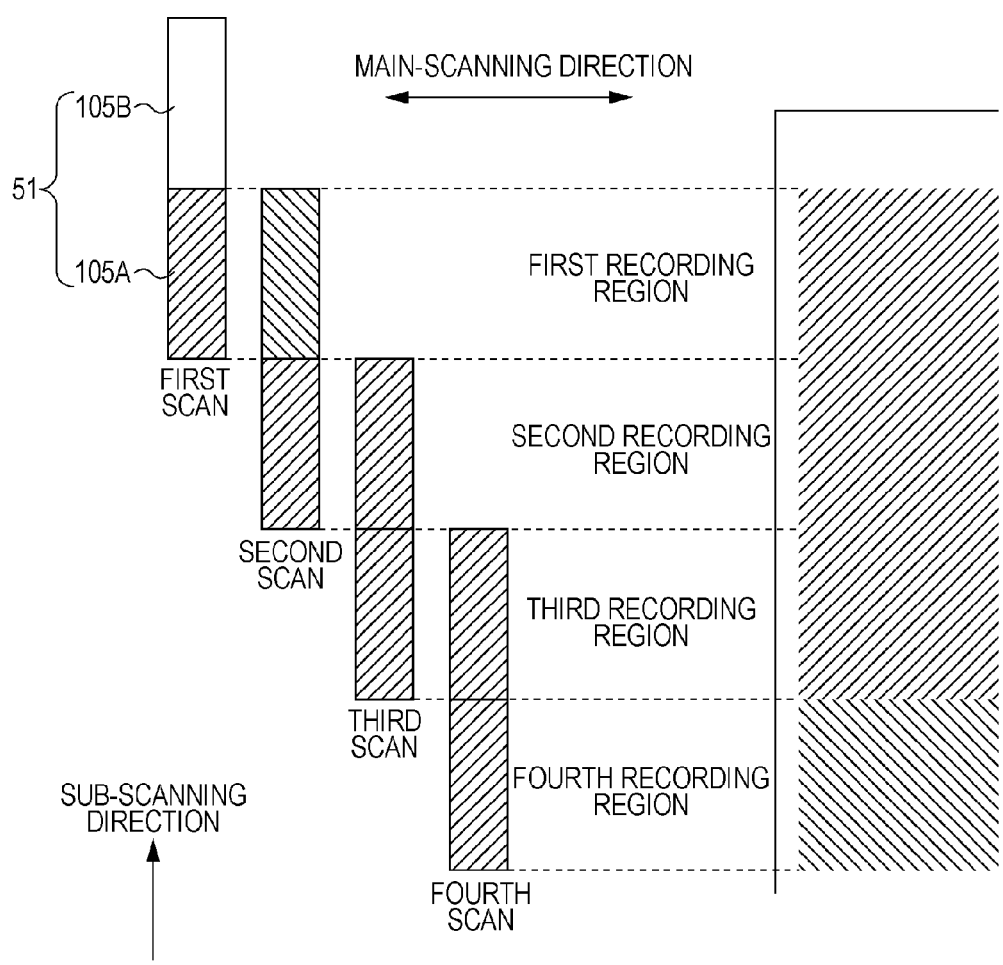
FIG. 11 illustrates a state of multi-pass recording by two passes.

The image processing apparatus described hereinafter performs data processing for recording an image in a single region (predetermined region) of the recording medium by a plurality of relative movements for the single region by the recording means. The "single region (predetermined region)" is a "single pixel region" in narrow sense, and is a "recordable region by a single relative movement" in broad sense. The "pixel region (also merely referred to as "pixel")" is a minimum unit region whose gradation can be expressed by multivalued image data. The "recordable region by a single relative movement" is a region on the recording medium above which the recording means passes during a single relative movement, or a region (for example, a raster region) smaller than this region. For example, in the serial-type recording apparatus, if a multi-pass mode by M passes (M is an integer equal to or larger than 2) is executed as shown in FIG. 11, a recording region in FIG. 11 may be defined as a "single region" in broad sense.

<Brief Description for Recording Apparatus>

Figure 1:
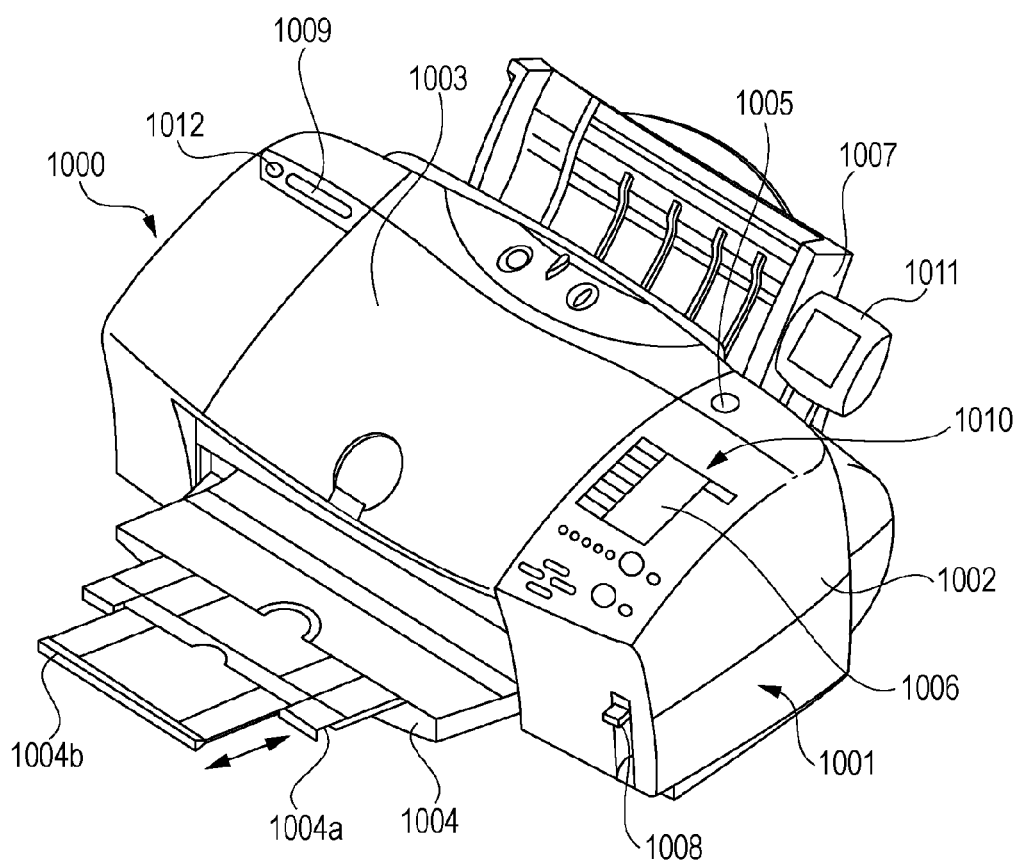
FIG. 1 is a perspective view showing the overview of a photo direct printer apparatus (hereinafter, referred to as PD printer) 1000 according to an embodiment of the present invention.

FIG. 1 is a perspective view showing the overview of a photo direct printer apparatus (hereinafter, referred to as PD printer) 1000 according to an embodiment of the present invention, or showing an image forming apparatus (image processing apparatus). The PD printer 1000 has various functions as follows in addition to a function as a normal PC printer that receives data from a host computer (PC) and performs printing. In particular, the PD printer 1000 has a function of directly reading image data stored in a storage medium such as a memory card and then performing printing, and a function of receiving image data from, for example, a digital camera or a PDA, and then performing printing.

Referring to FIG. 1, a main body that serves as an outer shell of the PD printer 1000 according to this embodiment includes exterior members including a lower case 1001, an upper case 1002, an access cover 1003, and an output tray 1004. The lower case 1001 forms a substantially lower half section of the main body of the PD printer 1000, and the upper case 1002 forms a substantially upper half section. By combining both cases, a hollow structure having a housing space therein is defined for housing mechanisms (described later). Upper and front surfaces of the structure respectively have openings.

An end of the output tray 1004 is rotatably held by the lower case 1001. When the output tray 1004 is rotated, the opening formed in the front surface of the lower case 1001 is opened or closed. During recording, the output tray 1004 is rotated to the front surface side, and the opening is made. Accordingly, recording media (including normal paper, dedicated paper, resin sheets etc.) after recording can be output to the output tray 1004, and the output recording media are successively stacked on the output tray 1004. The output tray 1004 accommodates two auxiliary trays 1004*a* and 1004*b*. When the trays are pulled out to the front as required, a support area for the recording media can be expanded or contracted in three steps.

An end of the access cover 1003 is rotatably held by the upper case 1002. When the access cover 1003 is rotated, the opening formed in the upper surface is opened or closed. If the access cover 1003 is opened, a recording head cartridge (not shown) or an ink tank (not shown) housed in the main body may be replaced with new one. If the access cover 1003 is opened or closed, a protrusion formed on the back surface of the access cover 1003 rotates a cover open/close lever. By detecting the rotation position with a micro switch or the like, the open/close state of the access cover 1003 can be detected.

A power key 1005 is provided on the upper case 1002. An operation panel 1010 is provided at a right section of the upper case 1002. The operation panel 1010 includes a liquid crystal display unit 1006 and various key switches. The structure of the operation panel 1010 will be described later in detail with reference to FIG. 2. An automatic feeder 1007 automatically feeds recording media into the main body of the apparatus. A head-sheet gap selection lever 1008 adjusts a gap between the recording head and a recording medium. A card slot 1009 is a slot to which an adopter capable of mounting a memory card is inserted. The apparatus can directly acquire image data stored in the memory card through the adopter, and perform printing. The memory card (PC card) may be, for example, the CompactFlash (registered trademark) memory, a SmartMedia, or a memory stick. A viewer (liquid crystal display unit) 1011 is detachably attached to the main body of the PD printer 1000. The viewer 1011 is used for displaying an image of a single frame or index images when an image to be printed is retrieved from images stored in the PC card. A USB terminal 1012 is provided for connection with a digital camera (described later). A USB connector is provided in a rear surface of the PD apparatus 1000, for connection with a personal computer (PC).

<Brief Description for Operation Unit>

Figure 2:
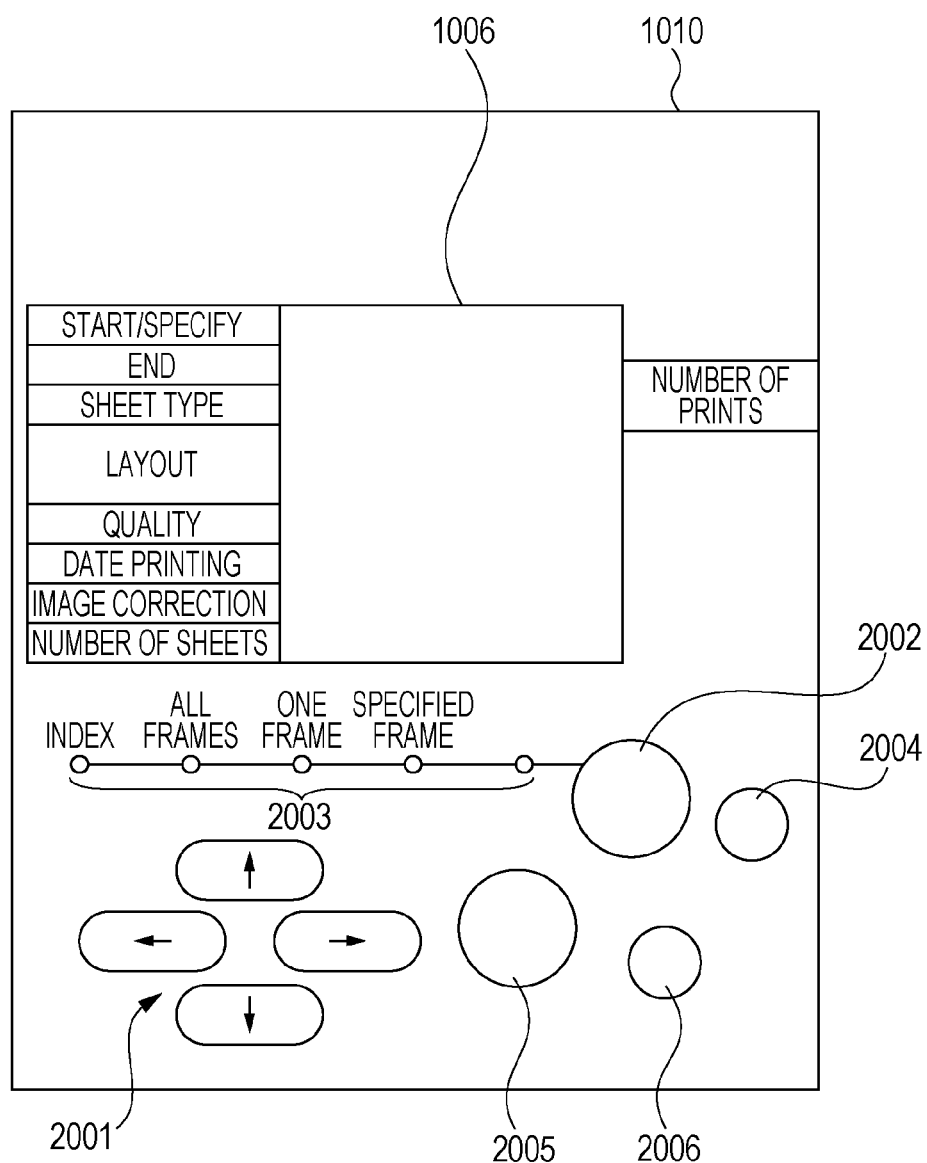
FIG. 2 illustrates the overview of an operation panel 1010 of the PD printer 1000 according to the embodiment of the present invention.

FIG. 2 illustrates the overview of the operation panel 1010 of the PD printer 1000 according to the embodiment of the present invention. Referring to the drawing, the liquid crystal display unit 1006 displays menu items for setting various conditions relating to printing. For example, the following items are provided.

first number of photograph image to be printed among plural-photograph-image file specified frame number (specify start frame/specify print frame)

last photograph number to be printed (end)

number of printing (number of prints)

type of recording medium for printing (sheet type)

number of photographs to be printed on one recording medium (layout)

specify quality of printing (quality)

specify whether photographed data is printed or not (date printing)

specify whether photograph is corrected and printed (image correction)

number of recording media necessary for printing (number of sheets)

These items can be selected or specified by using cursor keys 2001. Also, every time when a mode key 2002 is pressed, type of printing (index printing, all-frame printing, one-frame printing, specified frame printing, etc.) can be changed, and corresponding one of LEDs 2003 is lit accordingly. A maintenance key 2004 provides maintenance for the recording apparatus, for example, for cleaning the recording head. The print start key 2005 is pressed to instruct start of printing or establish setting for the maintenance. A print stop key 2006 is pressed to stop the printing or to stop the maintenance.

<Overview for Electrical Specification of Control Unit>

Figure 3:
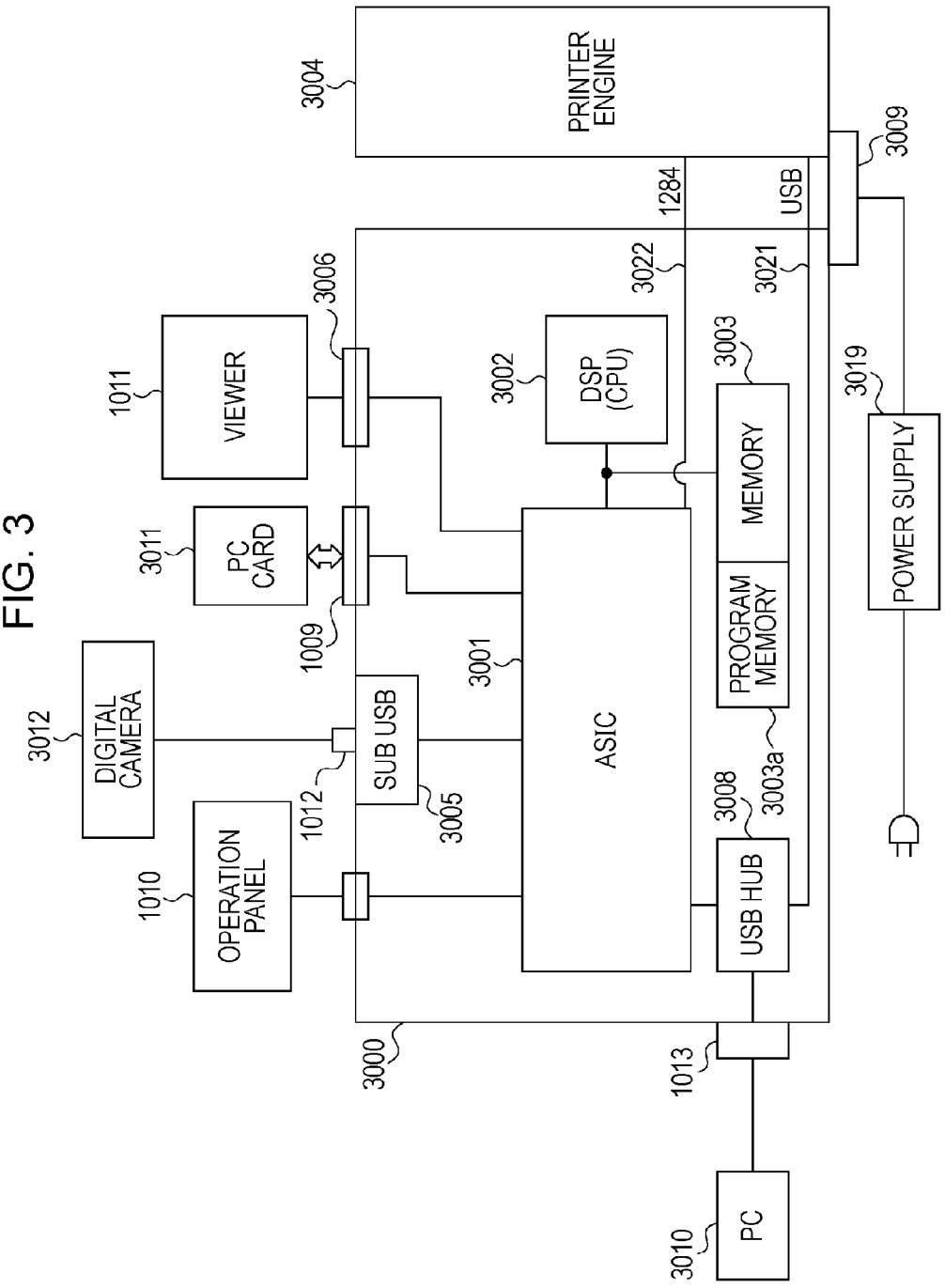
FIG. 3 is a block diagram showing a configuration of a primary portion relating to control of the PD printer 1000 according to the embodiment of the present invention.

FIG. 3 is a block diagram showing a configuration of a primary portion relating to control of the PD printer 1000 according to the embodiment of the present invention. Referring to FIG. 3, components common to those in the above drawings refer the same reference signs, and the redundant description is omitted. Though described later, the PD printer 1000 functions as an image processing apparatus.

In FIG. 3, reference sign 3000 is a control unit (control board). Reference sign 3001 is an image processor ASIC (dedicated custom LSI). A DSP (digital signal processor) 3002 includes a CPU, and handles various control processing (described later), and image processing, such as conversion from a luminance signal (RGB) to a density signal (CMYK), scaling, gamma conversion, and error diffusion. A memory 3003 includes a program memory 3003a that stores a control program of the CPU in the DSP 3002, a RAM area that stores the program during the execution, and a memory area functioning as a work memory that stores image data etc. A printer engine 3004 is for an inkjet printer that prints a color image by using ink of a plurality of colors. A USB connector 3005 is a port for connection with a digital camera (DSC) 3012. A connector 3006 is for connection with the viewer 1011. A USB hub 3008 allows data from a PC 3010 to pass through the USB hub 3008 and to be output to the printer engine 3004 through a USB 3021 when the PD printer 1000 performs printing in accordance with image data from the PC 3010. Thus, the connected PC 3010 can execute printing (function as a typical PC printer) by directly transmitting/receiving data and signals to/from the printer engine 3004. A power supply connector 3009 receives a direct voltage from a power supply 3019, the direct voltage being converted from commercial AC. The PC 3010 is a typical personal computer. Also, reference sign 3011 is the aforementioned memory card (PC card), and 3012 is the digital camera (digital still camera, DSC).

Communication using signals between the control unit 3000 and the printer engine 3004 is provided through the USB 3021 or an IEEE-1284 bus 3022.

<Overview of Electrical Specification of Printer Engine>

Figure 4:
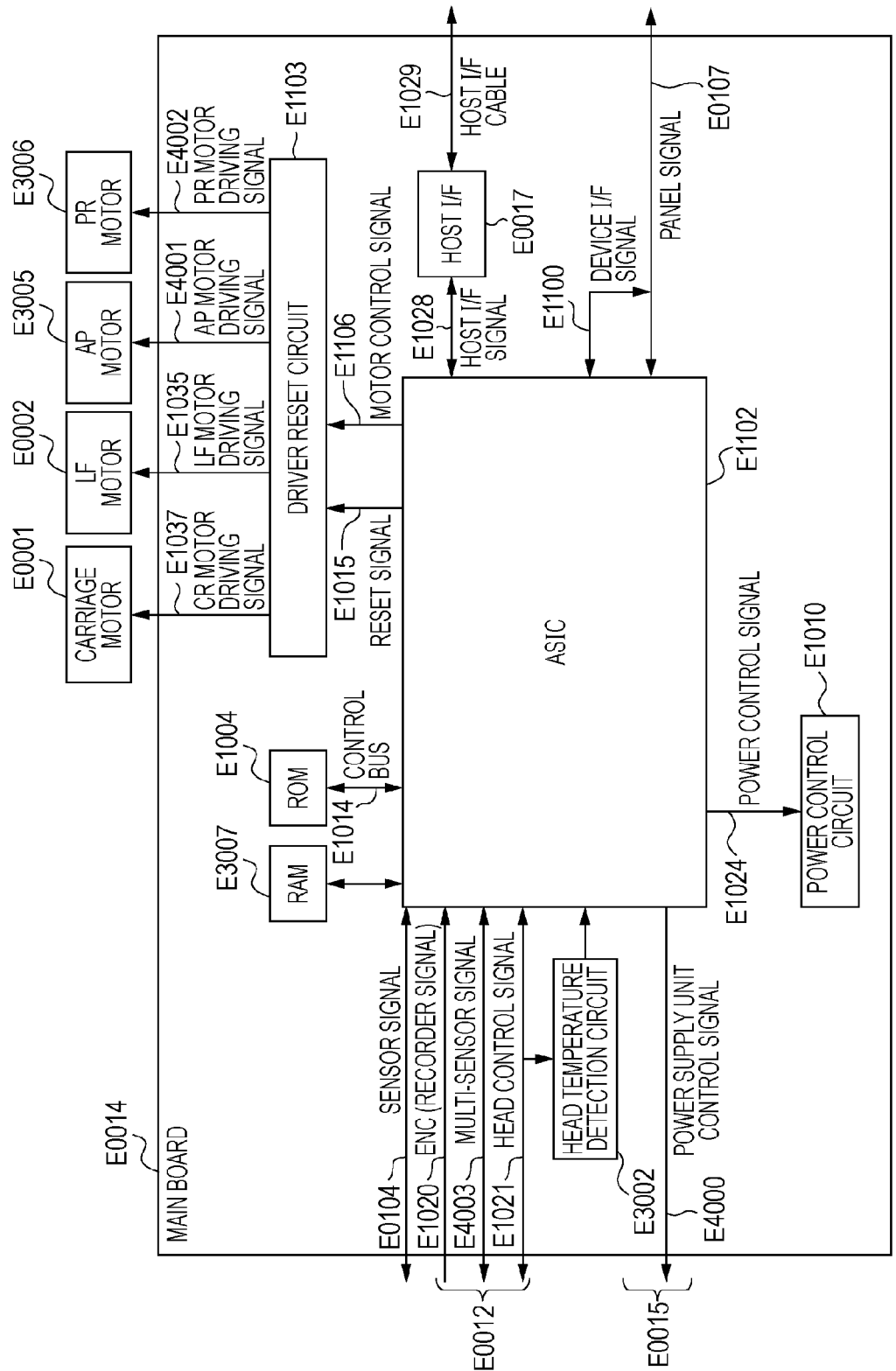
FIG. 4 is a block diagram showing an inner configuration of a printer engine 3004 according to the embodiment of the present invention.

FIG. 4 is a block diagram showing an inner configuration of a printer engine 3004 according to the embodiment of the present invention. In the drawing, reference sign E1004 is a main board. Reference sign E1102 is an engine ASIC (application specific integrated circuit). The engine ASIC E1102 is connected with a ROM E1004 through a control bus E1014, and performs various control based on a program stored in the ROM E1004. For example, the engine ASIC E1102 performs transmission and reception of sensor signals E0104 relating to various sensors, and a multi-sensor signal E4003 relating to a multi-sensor E3000. Also, the engine ASIC E1102 detects an encoder signal E1020, and output states of the power key 1005 and the various keys on the operation panel 1010. Further, based on connection state and data input state of a host I/F E0017 and a device I/F E0100 at the front panel, the engine ASIC E1102 performs various logical operations and condition judgment, controls respective components, and handles drive control of the PD printer 1000.

A driver reset circuit E1103 generates a CR motor driving signal E1037, an LF motor driving signal E1035, an AP motor driving signal E4001, and a PR motor driving signal E4002, and drives respective motors in response to a motor control signal E1106 from the engine ASIC E1102. The driver reset circuit E1103 includes a power supply circuit, and supplies required power to parts including the main board E0014, a carriage board provided in a carriage that moves the recording head mounted thereon, and the operation panel 1010. Further, a decrease in power supply voltage is detected, and a reset signal E1015 is generated and initialized.

A power control circuit E1010 controls power supply to respective sensors including light-emitting elements in response to a power control signal E1024 from the engine ASIC E1102.

The host I/F E0017 is connected with the PC 3010 through the image processing ASIC 3001 and the USB hub 3008 in the control unit 3000 shown in FIG. 3. The host I/F E0017 transmits a host I/F signal E1028 from the engine ASIC E1102 to a host I/F cable E1029, and transmits the signal from the cable E1029 to the engine ASIC E1102.

The power of the printer engine is supplied from a power supply unit E0015 connected with the power supply connector 3009 shown in FIG. 3. The voltage is converted as required and then supplied to the respective parts inside and outside the main board E0014. A power supply unit control signal E4000 is transmitted from the engine ASIC E1102 to the power supply unit E0015, to provide, for example, control of a low power consumption mode for the main body of the PD printer.

The engine ASIC E1102 is a chip of a semiconductor integrated circuit with a built-in processing unit. The engine ASIC E1102 outputs the motor control signal E1106, the power control signal E1024, and the power supply unit control signal E4000. The engine ASIC E1102 transmits and receives signals to and from the host I/F E0017, and the device I/F E0100 at the operation panel by using a panel signal E0107. Further, the engine ASIC E1102 detects states from respective sensors such as a PE sensor and an ASF sensor by using the sensor signal E0104. Furthermore, the engine ASIC E1102 controls the multi-sensor E3000 and detects a state of the multi-sensor E3000 by using the multi-sensor signal E4003. Furthermore, the engine ASIC E1102 detects a state of the panel signal E0107, controls driving of the panel signal E0107, and controls blinking of the LEDs 2003.

The engine ASIC E1102 detects a state of the encoder signal (ENC) E1020, generates a timing signal, interfaces with a recording head 5004 by using a head control signal E1021, and controls recording operation. The encoder signal (ENC) E1020 is an output signal of an encoder sensor E0004 input through a CRFFC E0012. The head control signal E1021 is provided to a carriage board (not shown) through the flexible flat cable E0012. The head control signal received by the carriage board is supplied to a recording head H1000 through a head drive voltage transformation circuit and a head connector. Also, various information from the recording head H1000 is transmitted to the ASIC E1102. A signal of head temperature information of each ejection portion included in the above information is amplified by a head temperature detection circuit E3002 on the main board. Then, the head temperature information is input to the engine ASIC E1102, and is used for various control judgments.

Referring to the drawing, a DRAM E3007 is used as, for example, a recording data buffer, and a reception data buffer when data is received from the PC 3010 through the image processing ASIC 3001 or the USB hub 3008 in the control unit 3000 shown in FIG. 3. Also, the DRAM E3007 is used as a work region required for various control operations.

<Overview of Recording Unit>

Figure 5:
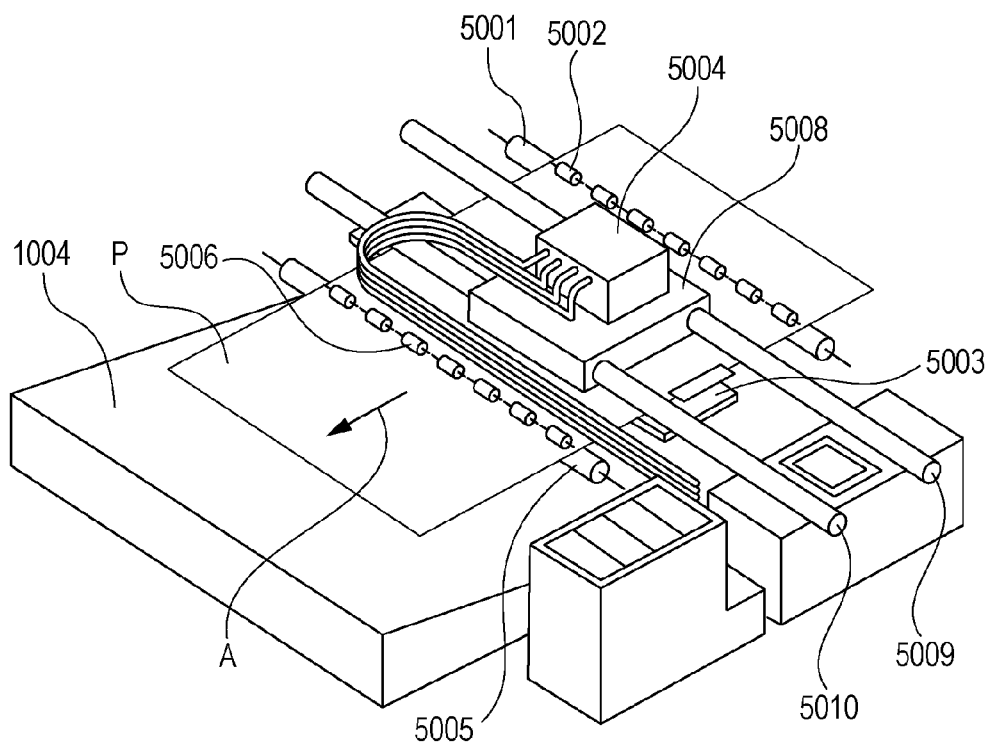
FIG. 5 is a perspective view showing the overview of a recording unit of the printer engine in a serial-type inkjet recording apparatus according to the embodiment of the present invention.
Figure 6A:
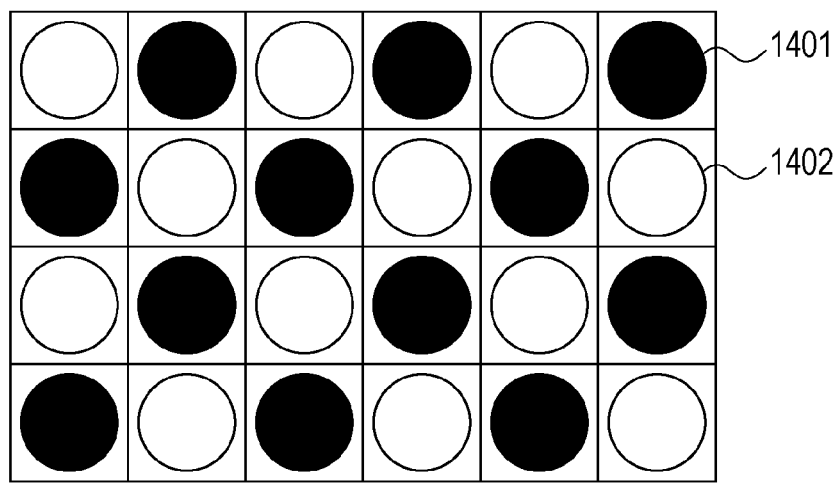
FIG. 6A illustrates a dot arrangement state when image data is divided by using mask patterns that are complements of each other.
Figure 6B:
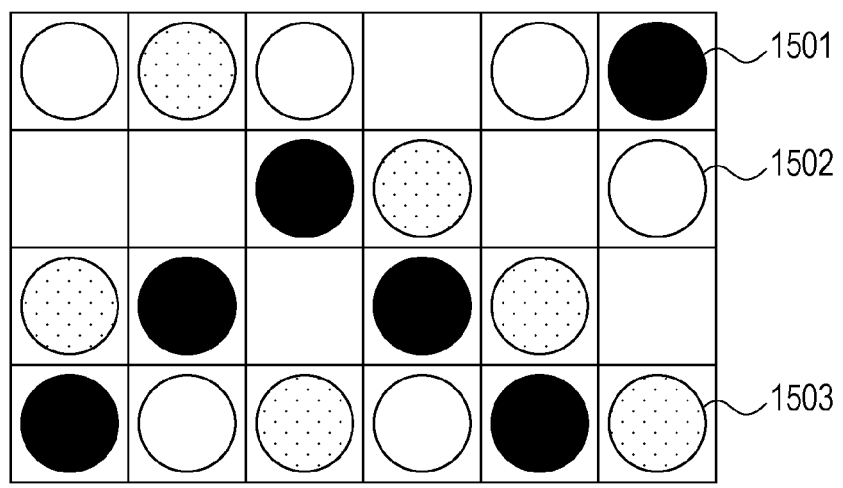
FIG. 6B illustrates a dot arrangement state when image data is divided by a method disclosed in each of Patent Literatures 1 and 2.

FIG. 5 is a perspective view showing the overview of a recording unit of a printer engine in a serial-type inkjet recording apparatus according to the embodiment of the present invention. A recording medium P is fed by the automatic feeder 1007 to a nip portion between a conveyance roller 5001 arranged in a conveyance path and a pinch roller 5002 that is driven by the conveyance roller 5001. Then, the recording medium P is guided onto a platen 5003, and is conveyed in a direction indicated by arrow A (in a sub-scanning direction) by the rotation of the conveyance roller 5001 while being supported by the platen 5003. The pinch roller 5002 is elastically urged to the conveyance roller 5001 by pressing means (not shown) such as a spring. The conveyance roller 5001 and the pinch roller 5002 define components of first conveying means located at the upstream side in the recording medium conveyance direction.

The platen 5003 is provided at a recording position at which the platen 5003 faces a surface (ejection surface) with ejection ports of the recording head 5004 of inkjet type. The platen 5003 supports the back surface of the recording medium P, to maintain a constant distance between the front surface of the recording medium P and the ejection surface. The recording medium P conveyed onto the platen 5003 and having an image recorded thereon is pinched between a rotating output roller 5005 and a spur roller 5006 that is a rotational body driven by the output roller 5005, is conveyed in the A direction, and is output from the platen 5003 to the output tray 1004. The output roller 5005 and the spur roller 5006 define components of second conveying means located at the downstream side in the recording medium conveyance direction.

The recording head 5004 is detachably attached to a carriage 5008 in a posture such that the ejection surface of the recording head 5004 faces the platen 5003 or the recording medium P. The carriage 5008 is reciprocated along two guide rails 5009 and 5010 by a driving force of a carriage motor E0001. The recording head 5004 executes an ink ejection operation in accordance with a recording signal while the carriage 5008 is moved. The moving direction of the carriage 5008 is a direction intersecting with the recording medium conveyance direction (A direction), the direction of which is called main-scanning direction. The recording medium conveyance direction is called sub-scanning direction. By alternately repeating main-scanning (movement with recording) of the carriage 5008 and the recording head 5004, and conveyance of the recording medium (sub-scanning), recording for the recording medium P is carried out.

Figure 20:
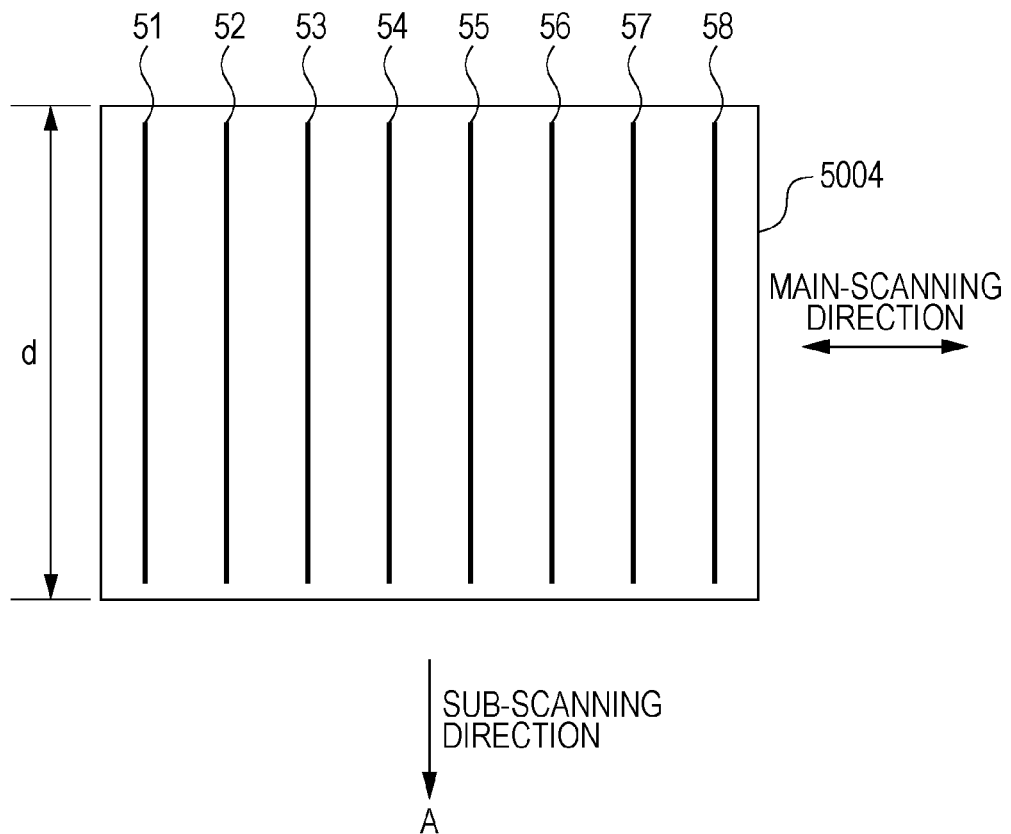
FIG. 20 briefly illustrates a recording head 5004 when viewed from a surface with ejection ports.

FIG. 20 briefly illustrates the recording head 5004 when viewed from the surface with the ejection ports. In the drawing, reference sign 61 is a first cyan nozzle array (recording element group), and 68 is a second cyan nozzle array. Reference sign 62 is a first magenta nozzle array, and 67 is a second magenta nozzle array. Reference sign 63 is a first yellow nozzle array, and 66 is a second yellow nozzle array. Reference sign 64 is a first black nozzle array, and 65 is a second black nozzle array. A width d extends in the sub-scanning direction of the nozzle arrays, and recording with the width d can be provided by a single scan.

The recording head 5004 according to this embodiment includes two nozzle arrays for each of colors including cyan (C), magenta (M), yellow (Y), and black (K). Each nozzle array ejects ink by a substantially equivalent quantity. Both the two nozzle arrays are used for recording an image on a recording medium. Accordingly, the density unevenness and lines due to variations in individual nozzles may be decreased substantially by half. Also, since the nozzle arrays of the respective colors are arranged symmetrically in the main-scanning direction in this embodiment, the order of applying ink to a recording medium can be uniform during a recording scan in a forward direction and a recording scan in a backward direction. That is, the order of applying ink to the recording medium is C, M, Y, K, K, Y, M, and then C in both the forward direction and the backward direction, and hence, the order of applying ink does not cause color unevenness although bidirectional recording is performed.

Further, since the recording apparatus according to this embodiment can execute the multi-pass recording, the recording head 5004 forms an image step by step through a plurality of recording scans in a region in which the recording head 5004 can perform recording by a single recording scan. At this time, if conveyance movement is provided by a distance smaller than the width d of the recording head 5004 between the recording scans, the density unevenness and lines due to variations in the individual nozzles can be further decreased. The execution of the multi-pass recording, or the number of multi-passes (the number of recording scans in a single region) is appropriately determined in accordance with information input by a user through the operation panel 1010 and image information received from the host device.

Next, an example of multi-pass recording that can be executed by the recording apparatus will be described below with reference to FIG. 11. Herein, 2-pass recording is described as an example of the multi-pass recording. However, the present invention is not limited to the 2-pass recording, and the number of passes may be 3, 4, 8, 16, or other number. That is, M-pass (M is an integer equal to or larger than 2) recording may be performed. It is to be noted that a "M-pass mode" (M is an integer equal to or larger than 2) that is desirably applied to the present invention is a mode for performing recording in a single region on a recording medium by M scans with recording element groups while the recording medium is conveyed by a distance smaller than a width of an array range of the recording elements. In this M-pass mode, a conveyance distance of the recording medium at a time is desirably equivalent to a distance corresponding to a width that is 1/M the width of the array range of the recording elements. Accordingly, the width of the single region in the conveyance direction is equivalent to the conveyance distance of the recording medium at a time.

FIG. 11 schematically illustrates a state of the 2-pass recording. FIG. 11 illustrates a relative positional relationship between the recording head 5004 and recording regions when recording is performed in four equivalent regions of first to fourth recording regions. FIG. 11 illustrates a single nozzle array (single recording element group) 61 for a first color that is one of the colors provided for the recording head 5004 shown in FIG. 5. Hereinafter, from among the plurality of nozzles (recording elements) of the nozzle arrays (recording element groups) 61, a nozzle group located at the upstream side in the conveyance direction is called upstream nozzle group 61A, and a nozzle group located at the downstream side in the conveyance direction is called downstream nozzle group 61B. Also, the width in the sub-scanning direction (conveyance direction) of each region (each recording region) is equivalent to a width that is substantially half (640-nozzle width) the width (1280-nozzle width) of the array range of the plurality of recording elements of the recording head.

By a first scan, the upstream nozzle group 61A records only a part of an image to be recorded in the first recording region. Image data recorded by the upstream nozzle group 61A has a gradation value that is substantially ½ the gradation value of original image data (multivalued image data corresponding to an image to be finally recorded in the first recording region)

for each pixel. When the recording by the first scan is ended, the recording medium is conveyed by the distance for 640 nozzles in the Y-direction.

Then, by a second scan, the upstream nozzle group 61A records only a part of an image to be recorded in the second recording region, and the downstream nozzle group 61B completes the image to be recorded in the first recording region. Image data recorded by the downstream nozzle group 61B also has a gradation value that is substantially ½ the gradation value of original image data (multivalued image data corresponding to an image to be finally recorded in the first recording region). The image data with the gradation value that is decreased by substantially half is recorded two times in the first recording region. Thus, the gradation value of the original image data is kept. When the recording by the second scan is ended, the recording medium is conveyed by the distance for the 640 nozzles in the Y-direction.

Then, by a third scan, the upstream nozzle group 61A records only a part of an image to be recorded in the third recording region, and the downstream nozzle group 61B completes the image to be recorded in the second recording region. Then, the recording medium is conveyed by the distance for the 640 nozzles in the Y-direction. Finally, by a fourth scan, the upstream nozzle group 61A records only a part of an image to be recorded in the fourth recording region, and the downstream nozzle group 61B completes the image to be recorded in the third recording region. Then, the recording medium is conveyed by the distance for the 640 nozzles in the Y-direction. Similar recording operation is performed for other recording regions. By repeating the recording main-scans and the conveyance operations as described above, the 2-pass recording is performed for the recording regions.

First Embodiment

Figure 21:
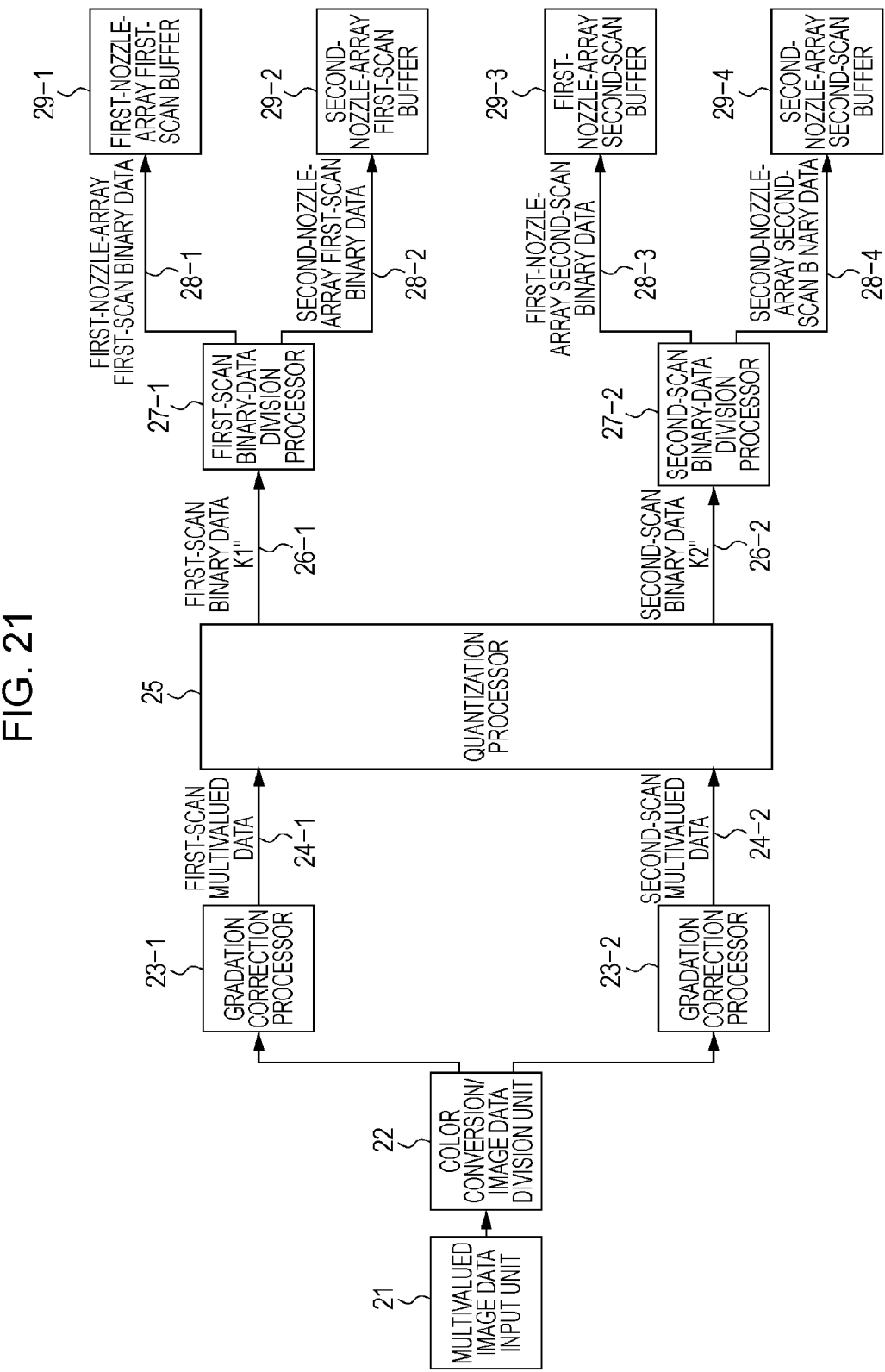
FIG. 21 is a block diagram explaining image processing when multi-pass recording is performed, the multi-pass recording which completes an image in a single region by two recording scans.

FIG. 21 is a block diagram explaining image processing when multi-pass recording is performed, the multi-pass recording which completes an image in a single region by two recording scans as shown in FIG. 11. It is assumed that the control unit 3000 shown in FIG. 3 performs processing shown in FIGS. 21 to 25, and the printer engine 3004 performs processing shown in FIG. 27 and later, for image data input from an image input device such as the digital camera 3012. The control unit 3000 includes a multivalued image data input unit (21), a color conversion/image data division unit (22), gradation correction processors (23-1, 23-2), and a quantization processor (25) shown in FIG. 21. The printer engine 3004 includes binary-data division processors (27-1, 27-2).

The multivalued image data input unit 21 receives multivalued image data of RGB (256-value) from an external device. The color conversion/image data division unit 22 converts the input image data (multivalued RGB data) into two sets of multivalued image data (CMYK data) on a pixel basis for a first recording scan and a second recording scan of each color of ink. In particular, the color conversion/image data division unit 22 previously has a three-dimensional look-up table in which RGB values are associated with CMYK values for the first scan (C1, M1, Y1, K1) and CMYK values for the second scan (C2, M2, Y2, K2). With the three-dimensional look-up tale (LUT), the multivalued RGB data is collectively converted into multivalued data for the first scan (C1, M1, Y1, K1) and multivalued data for the second scan (C2, M2, Y2, K2). At this time, an output value may be calculated for an input value that is deviated from a table grid point value by interpolation based on output values of surrounding table grid points. The color conversion/image data division unit 22 has the role of generating the multivalued data for the first scan (C1, M1, Y1, K1), which is also called the first-scan multivalued data, and the multivalued data for the second scan (C2, M2, Y2, K2), which is also called the second-scan multivalued data, from the input image data on a pixel basis. The color conversion/image data division unit 22 is also called "first generating means."

The configuration of the color conversion/image data division unit 22 is not limited to one using the above-described three-dimensional look-up table. For example, multivalued RGB data may be once converted into multivalued CMYK data corresponding to ink used in a recording apparatus, and the multivalued CMYK data may be substantially evenly divided.

Next, the gradation correction processors 23-1 and 23-2 perform gradation correction for the first-scan multivalued data and the second-scan multivalued data on a color basis. Herein, signal value conversion is performed for multivalued data so that a linear relationship is established between signal values of the multivalued data and density values expressed on a recording medium. Consequently, first-scan multivalued data 24-1 (C1', M1', Y1', K1') and second-scan multivalued data 24-2 (C2', M2', Y2', K2') are obtained. The following processing is performed simultaneously and individually for cyan (C), magenta (M), yellow (Y), and black (K). Hence, the processing only for black (K) will be described below.

Then, the quantization processor 25 performs binarization processing (quantization processing) individually for the first-scan multivalued data 24-1 (K1') and the second-scan multivalued data 24-2 (K2') in an uncorrelated fashion. In particular, known error diffusion that uses an error diffusion matrix shown in FIG. 13A and predetermined quantization thresholds is performed for the first-scan multivalued data 24-1 (K1') to generate first-scan binary data K1" (first quantized data) 26-1. Also, known error diffusion that uses an error diffusion matrix shown in FIG. 13B and predetermined quantization thresholds is performed for the second-scan multivalued data 24-2 (K2') to generate second-scan binary data K2" (second quantized data) 26-2. Since the error diffusion matrix used for the first scan is different from that used for the second scan, a pixel on which dots are recorded by both scans and a pixel on which a dot is recorded only by one of the scans can be mixed. If a pixel corresponds to K1" and K2" both being 1, dots are redundantly recorded on that pixel. If a pixel corresponds to K1" and K2" both being 0, no dot is recorded on that pixel. If a pixel corresponds to K1" and K2" either one of which is 1, only a single dot is recorded on that pixel. As described above, the quantization processor 25 performs the quantization for the multivalued image data (24-1 and 24-2) corresponding to M relative movements on a pixel basis to generate quantized data (26-1 and 26-2) of the single color corresponding to the M relative movements. The quantization processor 25 is called "second generating means."

When the binary image data K1" and K2" is obtained by the quantization processor 25, the binary image data K1" and K2 is sent to the printer engine 3000 shown in FIG. 3 through the IEEE-1284 bus 3022. The subsequent processing is performed by the printer engine 3000. In the printer engine 3000, each of the binary image data K1" (26-1) and K2" (26-2) is divided into binary image data corresponding to two nozzle arrays 64 and 65. In particular, the first-scan binary-data division processor 27-1 divides the first-scan binary image data K1" (26-1) into first-nozzle-array first-scan binary image data 28-1 and second-nozzle-array first-scan binary image data 28-2. The second-scan binary-data division processor 27-2 divides the second-scan binary image data K2" (26-2)

into first-nozzle-array second-scan binary image data 28-3 and second-nozzle-array second-scan binary image data 28-4.

Figure 8:
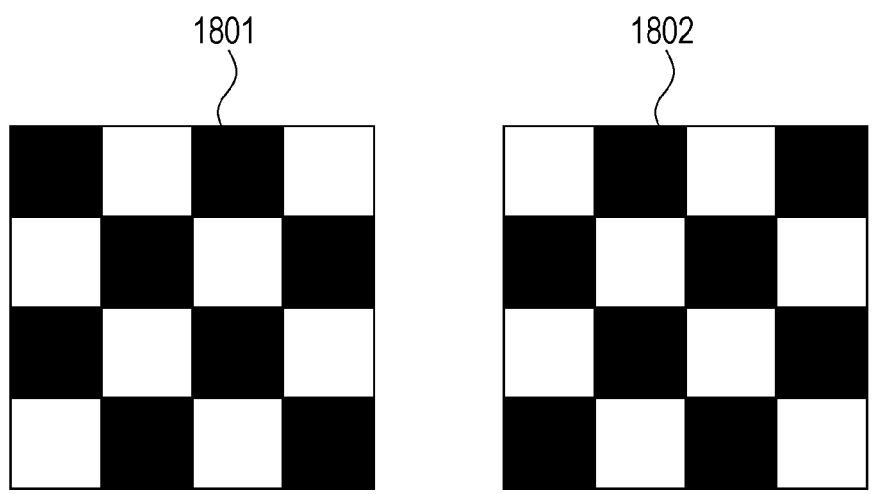
FIG. 8 illustrates an example of mask patterns applicable to the present invention.

The first-scan binary-data division processor and the second-scan binary-data division processor will be described below in detail. In this embodiment, the first-scan binary-data division processor 27-1 and the second-scan binary-data division processor 27-2 execute the division by using a mask previously stored in the memory (ROM E1004). The mask is a set of data in which permission (1) or non-permission (0) for recording binary image data are previously determined for individual pixels. Logical multiplication is performed for the binary image data on a pixel basis, and hence the binary image data is divided. When the binary image data is divided into N pieces, N masks are typically used. Since the binary image data is divided into two pieces in this embodiment, two masks 1801 and 1802 shown in FIG. 8 are used. The mask 1801 is used for generating the binary image data for the first nozzle array. The mask 1802 is used for generating the binary image data for the second nozzle array. These two masks are complements of each other. Binary data divided by one of the masks does not overlap binary data divided by the other of the masks. The probability that dots recorded by different nozzle arrays overlap each other on a sheet is low. Thus, graininess is hardly increased as compared with the dot overlap processing performed for the scans. Referring to FIG. 8, a black part is data that permits recording of image data (1: data that does not mask image data) and a white part is data that does not permit recording of image data (0: data that masks image data). The first-scan binary-data division processor and the second-scan binary-data division processor perform the division with the masks 1801 and 1802. In particular, the first-scan binary-data division processor 27-1 performs the logical multiplication for the binary data K1" (26-1) and the mask 1801 on a pixel basis to generate the first-nozzle-array binary data 28-1. Similarly, the first-scan binary-data division processor 27-1 performs the logical multiplication for the binary data K1" (26-1) and the mask 1802 on a pixel basis to generate the second-nozzle-array binary data 28-1. The second-scan binary-data division processor 27-2 performs the logical multiplication for the binary data K1" (26-2) and the mask 1801 on a pixel basis to generate the first-nozzle-array binary data 28-3. Similarly, the second-scan binary-data division processor 27-2 performs the logical multiplication for the binary data K1" (26-2) and the mask 1802 on a pixel basis to generate the second-nozzle-array binary data 28-4. As described above, the division processors 27-1 and 27-2 generate the quantized data of the single color corresponding to the N recording element groups and being complements of each other, from the quantized data of the single color corresponding to the M relative movements. The division processor 27-1 and 27-2 are called "third generating means." The first-scan binary-data division processor 27-1 and the second-scan binary-data division processor 27-2 each use the same set of the mask patterns 1801 and 1802; however, the processors may use sets of different mask patterns.

Then, the binary image data (28-1 to 28-4) is stored in buffers (29-1 to 29-4) prepared for the corresponding scans of the corresponding nozzle arrays. When the binary image data is stored in the individual buffers by required amounts, recording operation is executed in accordance with the data stored in the corresponding buffers.

Hereinafter, the image processing, which has been described with reference to FIG. 21, will be described in more detail with reference to FIG. 12. FIG. 12 is an image of a specific example of the image processing shown in FIG. 12. In this case, processing for input image data 141 for 4×4 pixels, i.e., 16 pixels in total, will be described. Reference signs A to P represent combinations of RGB values of the input image data 141 respectively corresponding to the pixels. Reference signs A1 to P1 represent combinations of CMYK values of first-scan multivalued image data 142 respectively corresponding to the pixels. Reference signs A2 to P2 represent combinations of CMYK values of second-scan multivalued image data 143 respectively corresponding to the pixels.

In the drawing, the first-scan multivalued image data 142 corresponds to the first-scan multivalued data 24-1 in FIG. 21, and the second-scan multivalued image data 143 corresponds to the first-scan multivalued data 24-2 in FIG. 21. Also, first-scan quantized data 144 corresponds to the first-scan binary data 26-1 in FIG. 21, and the second-scan quantized data 145 corresponds to the second-scan binary data 26-2 in FIG. 21. Further, first-nozzle-array first-scan quantized data 146 corresponds to the binary data 28-1 in FIG. 21, and second-nozzle-array first-scan quantized data 146 corresponds to the binary data 28-2 in FIG. 21. Further, first-nozzle-array second-scan quantized data 148 corresponds to the binary data 28-3 in FIG. 21, and second-nozzle-array second-scan quantized data 149 corresponds to the binary data 28-4 in FIG. 21.

First, the input image data 141 (RGB data) is input to the color conversion/image data division unit 22 in FIG. 21. Then, the color conversion/image data division unit 22 converts the input image data 141 (RGB data) into the first-scan multivalued image data 142 (CMYK data) and the second-scan multivalued image data 143 (CMYK data) by using the three-dimensional LUT. For example, if RGB values of the input image data indicated by reference sign A are (R, G, B)=(0, 0, 0), CMYK values of the multivalued image data 142 indicated by reference sign A1 are (C1, M1, Y1, K1)=(0, 0, 0, 128). Also, CMYK values of the multivalued image data 143 indicated by reference sign A2 are (C2, M2, Y2, K2)=(0, 0, 0, 127). As described above, the color conversion/image data division unit 22 generates the two pieces of multivalued image data (142, 143) corresponding to the two scans. Subsequent processing (gradation correction, quantization, masking) is performed simultaneously and individually for the respective colors of CMYK. Hence, the processing only for a single color (K) will be described for the convenience of description, and the processing for other colors will be omitted.

The first-scan and second-scan multivalued image data (142, 143) obtained as described above is input to the quantization processor 25 in FIG. 21. The quantization processor 25 performs the error diffusion individually for the first-scan and second-scan multivalued image data (142, 143), and generates the first-scan and second-scan quantized data (144, 145). In particular, when the error diffusion is performed for the first-scan multivalued image data 142, as described above, the predetermined threshold and the error diffusion matrix A shown in FIG. 13A are used, to perform the error diffusion for binarizing the first-scan multivalued image data 142. Accordingly, the first-scan binary quantized data 144 is generated. Similarly, when the error diffusion is performed for the second-scan multivalued image data 143, as described above, the predetermined threshold and the error diffusion matrix B shown in FIG. 13B are used, to perform the error diffusion for binarizing the second-scan multivalued image data 143. Accordingly, the second-scan binary quantized data 145 is generated. In the first-scan and second-scan quantized data (144, 145), "1" is data for recording a dot (ejecting ink), and "0" is data for not recording a dot (not ejecting ink).

Then, the first-scan binary-data division processor 27-1 divides the first-scan quantized data 144 by the mask to generate the first-nozzle-array first-scan quantized data 146 and the second-nozzle-array first-scan quantized data 147. In particular, the first-scan quantized data 144 is thinned out by the mask 1801 in FIG. 8A, so that the first-nozzle-array first-scan quantized data 146 is obtained. Also, the first-scan quantized data 144 is thinned out by the mask 1802 in FIG. 8B, so that the second-nozzle-array first-scan quantized data 147 is obtained. The second-scan binary-data division processor 27-2 divides the second-scan quantized data 145 by the mask to generate the first-nozzle-array second-scan quantized data 148 and the second-nozzle-array second-scan quantized data 148. In particular, the second-scan quantized data 145 is thinned out by the mask 1801 in FIG. 8A, so that the first-nozzle-array second-scan quantized data 148 is obtained. Also, the second-scan quantized data 145 is thinned out by the mask 1802 in FIG. 8B, so that the second-nozzle-array second-scan quantized data 149 is obtained. As described above, the four types of binary data 146 to 149 to be recorded by the two scans with the two nozzle arrays are generated.

In this embodiment, since the two mask patterns being complements of each other are used to generate the binary data for the single scan corresponding to the two nozzle arrays, the above-described dot overlap processing is not applied between the nozzle arrays. Of course, the dot overlap processing may be applied between the scans, and also between the nozzle arrays, like the conventional method. However, if the dot overlap processing is applied between the nozzle arrays, the number of pieces of data subjected to the quantization may be large, and hence the load of data processing may be large. Also, in many printers, a deviation between recording positions by different nozzle arrays tends to be smaller than a deviation between recording positions by different scans. In particular, when the recording head, in which the nozzle arrays of the respective colors are collectively arranged as shown in FIG. 20, is used, the density unevenness due to density variation hardly occurs although the dot overlap processing is not applied between the nozzle arrays. With this reason, the dot overlap processing is only applied between the scans and is not applied between the nozzle arrays.

As described above, with the processing shown in FIG. 12, when the binary image data (144, 145) corresponding to the different scans overlap each other, a part in which dots overlap each other (a pixel having "1" in both planes) appears with a certain frequency. Thus, an image capable of handling the density variation can be obtained. Also, since the dot overlap processing is applied between the scans but is not applied between the nozzle arrays, the density variation can be suppressed while the processing load due to the dot overlap processing is decreased. Further, with this embodiment, the masks being complements of each other are used for generating the data corresponding to the two nozzle arrays that eject the ink of the single color. Thus, the probability that dots recorded by the two nozzle arrays overlap each other on a sheet can be decreased. Accordingly, the increase in graininess can be suppressed.

In this embodiment, the division is executed by thinning out the quantized data with the mask. However, the mask does not have to be used during the division. For example, division may be executed by extracting even-numbered column data and odd-numbered column data from quantized data. In this case, even-numbered column data and odd-numbered column data are extracted from the first-scan quantized data. The even-numbered column data serves as the first-nozzle-array first-scan quantized data, and the odd-numbered column data serves as the first-nozzle-array second-scan data. Similar processing is performed for the second-scan quantized data. Even with this data extraction method, the load of data processing can be still decreased as compared with the conventional method.

In this embodiment, it is important to quantize the multivalued data of the single color corresponding to the plurality of scans, generate the quantized data of the single color corresponding to the plurality of scans, and then generate the quantized data being complements of each other to be recorded respectively by the plurality of nozzle arrays corresponding to the plurality of scans, from the quantized data of the single color. Accordingly, regardless of the method of the division, the quantization does not have to be performed when the data respectively corresponding to the plurality of nozzle arrays is generated. Thus, the load of data processing can be decreased.

In this embodiment, the head 5004 including the two recording element groups (nozzle arrays) for ejecting the ink of the single color is used. However, a recording head that can be applied to this embodiment is not limited thereto. This embodiment may use a recording head as long as the recording head includes N (N is an integer equal to or larger than 2) recording element groups for ejecting ink of at least a single color. Also, in this embodiment, the example of so-called 2-pass recording, in which recording for a single region (for example, pixel region) is completed by two relative movements, is described. However, this embodiment is not limited to the 2-pass recording. In this embodiment, the number of passes may be 3, 4, 8, or other number. That is, M-pass (M is an integer equal to or larger than 2) recording may be performed. When the M-pass recording is performed by using the N recording element groups, first, M sets of single-color multivalued image data corresponding to the M passes are generated from input image data on a pixel basis, the M sets of single-color multivalued image data are quantized on a pixel basis, and the M sets of single-color quantized data corresponding to the M passes are generated. Then, each of the M sets of single-color quantized data is divided into the N pieces of data by N masks being complements of each other. Accordingly, binary data for the M passes corresponding to the N recording element groups is generated.

If multi-pass of three passes or more is used, it is not necessary to quantize single-color multivalued image data for all passes. Single-color multivalued image data for a pass may be individually quantized, and the quantized data may be allocated to other passes.

With this embodiment, as described above, when the recording is performed for the single region by the M (M is an integer equal to or larger than 2) relative movements with the N (N is an integer equal to or larger than 2) recording element groups, the density variation due to the deviation between the recording positions by the M relative movements can be suppressed. Also, as compared with the conventional method, in which the multivalued image data of the N×M planes is quantized, the number of pieces of data subjected to the quantization can be decreased, and hence the load of quantization can be more decreased than the conventional method.

Second Embodiment

Figure 9A:
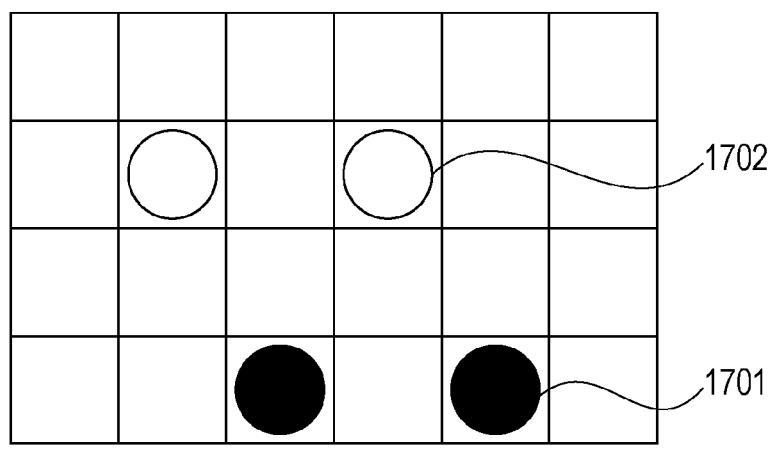
FIG. 9A illustrates dispersed dots.
Figure 9B:
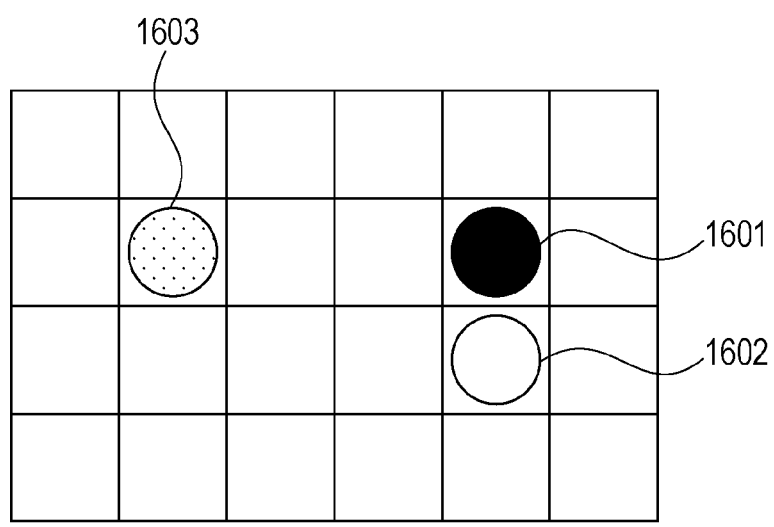
FIG. 9B illustrates a state in which a part in which dots overlap each other and a part in which dots are adjacently arranged are irregularly arranged.

In the above-described first embodiment, the quantization processor 25 quantizes the first-scan multivalued data 24-1 and the second-scan multivalued data 24-2 in an uncorrelated fashion. Thus, the first-scan binary data 26-1 and the second-scan binary data 26-2 (i.e., the plurality of planes) output from the quantization processor 25 do not correlate with each other. Thus, the number of overlap dots may be too large, and the graininess may be increased. More specifically, in order to decrease the graininess, in a highlighted part, it is ideal that few dots (1701, 1702) are evenly dispersed while a certain distance is kept therebetween as shown in FIG. 9A. However, if no correlation is provided for the binary data among the plurality of planes, a part (1603), in which dots overlap with each other, and a part (1601, 1602), in which dots are recorded adjacently, irregularly appear as shown in FIG. 9B. Such a group of dots may cause an increase in graininess.

Therefore, in this embodiment, to suppress the increase in graininess, the quantization processor 25 shown in FIG. 21 quantizes the first-scan multivalued data 24-1 and the second-scan multivalued data 24-2 with the correlation kept therebetween. In particular, the quantization processor 25 quantizes the first-scan multivalued data by using the second-scan multivalued data, and quantizes the second-scan multivalued data by using the first-scan multivalued data. Accordingly, a pixel on which a dot is to be recorded by the first scan (or the second scan) is controlled such that a dot is not recorded by the second scan (or the first scan) as far as possible. The increase in graininess due to overlap of dots can be suppressed. The second embodiment will be described below in detail.

<Relationship between Control of Dot Overlap Ratio, and Density Unevenness and Graininess>

As described in Background Art, if dots, which are recoded by different scans or different recording element groups, overlap each other while being deviated from each other, a density of an image may vary, and the variation is recognized as density unevenness. In this embodiment, some dots which should be recorded in an overlap manner at the same position (same pixel or same sub-pixel) are prepared, and if a deviation between recording positions occurs, adjacent dots overlap each other to increase a white region, and overlap dots are separated from each other to decrease the white region. Accordingly, the increase and decrease of the white region due to the deviation between the recording positions, that is, the increase and decrease of density cancel with each other. It is expected that the density variation can be suppressed as a whole image.

However, the preparation of the overlap dots may cause the graininess to increase. For example, if N dots are recorded while each two dots of all dots overlap each other, the number of positions at which the dots are recorded is (N/2). The gap between the dots increases as compared with a case in which dots do not overlap each other at all. Thus, a spatial frequency of an image with the overlap dots shifts to a low-frequency side as compared with the case without overlap dots. A spatial frequency of an image to be recorded by an inkjet recording apparatus typically contains a range from a low-frequency region, to which the human visual characteristic is relatively sensitive, to a high-frequency region, to which the human visual performance is not relatively sensitive. Therefore, if the recording frequency of the dots is shifted to the low-frequency side, the graininess may become noticeable, possibly resulting in an image defect.

In other words, if the dispersiveness of the dots is increased to decrease the graininess (if the dot overlap ratio is decreased), the robustness is degraded. If the dot overlap ratio is increased to improve the robustness, the graininess becomes a bottleneck. It is difficult to simultaneously avoid both disadvantages.

However, the density variation and the graininess have certain allowable ranges (ranges that are hardly recognized because of the human visual characteristic). If the dot overlap ratio is adjusted at a level such that the above density variation and the graininess fall within the allowable ranges, it is expected that an image with a negligible defect can be output. However, the allowable ranges, the diameter of dots, and the arrangement state may vary depending on various conditions such as the type of ink, the type of recording media, and the density data value. The desirable dot overlap ratio is not always constant. Hence, it is desirable to have a configuration capable of more actively controlling the dot overlap ratio and to adjust the configuration depending on the various conditions.

Herein, the "dot overlap ratio" is described. The "dot overlap ratio" is a ratio of the number of dots (overlap dots) to be redundantly recorded at a single position by different scans or different recording element groups to the total number of dots to be recorded in a unit region defined by a pixel region including K (K is an integer equal to or larger than 1) pixels as shown in FIGS. 7A to 7H and 19 (described later). The single position represents a single pixel position in FIGS. 7A to 7H, or a single sub-pixel region in FIG. 19.

The dot overlap ratio of a first plane and a second plane corresponding to a unit region defined by 4 pixels (main-scanning direction)×3 pixels (sub-scanning direction) will be described below with reference to FIGS. 7A to 7H. The "first plane" represents a set of binary data corresponding to the first scan or the first nozzle group. The "second plane" represents a set of binary data corresponding to the second scan or the second nozzle group. Also, "1" represents data for recording a dot, and "0" represents data for not recording a dot.

In FIGS. 7A to 7E, the number of "1" in the first plane is "4," and the number of "1" in the second plane is "4." Hence, the total number of dots to be recorded in the unit region of 4×3 pixels is "8." The number of "1" in the first and second planes at corresponding pixel positions represent the number of dots (overlap dots) to be redundantly recorded on the corresponding pixels. With these definitions, the number of overlap dots is "0" in FIG. 7A, "2" in FIG. 7B, "4" in FIG. 7C, "6" in FIG. 7D, and "8" in FIG. 7E. Thus, as shown in FIG. 7H, the dot overlap ratios in FIGS. 7A to 7E are 0%, 25%, 50%, 75%, and 100%, respectively.

FIGS. 7F and 7G illustrate the numbers of recorded dots in planes and the total numbers of dots which are different from those shown in FIGS. 7A to 7E. FIG. 7F illustrates a case in which the number of recorded dots in a first plane is "4," the number of recorded dots in a second plane is "3," the total number of dots is "8," the number of overlap dots is "6," and a dot overlap ratio is 86%. FIG. 7G illustrates a case in which the number of recorded dots in a first plane is "4," the number of recorded dots in a second plane is "2," the total number of dots is "6," the number of overlap dots is "2," and a dot overlap ratio is 33%. As described above, the "dot overlap ratio" in the specification is an overlap ratio of dot data when dot data corresponding to different scans or different recording element groups are virtually superposed on each other, and does not represent an area ratio or a ratio with which dots overlap each other on a sheet.

<Image Processing>

Next, image processing according to this embodiment will be described. This embodiment uses the configuration of the image processing shown in FIG. 21 like the first embodiment. However, a quantization method by the quantization processor 25 of this embodiment differs from that of the first embodiment. Since this embodiment differs from the first embodiment only in the quantization method by the quantization processor 25, only the quantization method unique to this embodiment will be described below, and the other description will be omitted.

The quantization processor 25 shown in FIG. 21 receives the first-scan multivalued data 24-1 (K1') and the second-scan multivalued data 24-2 (K2') like the first embodiment. Then, the binarization (quantization) is performed for each of the first-scan multivalued data (K1') and the second-scan multivalued data. In particular, each multivalued data is converted (quantized) into either value of 0 or 1. Hence, the first-scan binary data K1" (first quantized data) 26-1 and the second-scan K2" (second quantized data) 26-2 are obtained. If a pixel corresponds to K1" and K2" both being 1, dots are redundantly recorded on that pixel. If a pixel corresponds to K1" and K2" both being 0, no dot is recorded on that pixel. If a pixel corresponds to K1" and K2" either one of which is 1, only a single dot is recorded on that pixel.

Processing steps executed by the quantization processor 25 will be described with reference to a flowchart in FIG. 26. In this flowchart, K1' and K2' are input multivalued data for a target pixel, and have values from 0 to 255. Also, K1err and K2err are integral error values generated from surrounding pixels, which have been processed with the quantization. K1ttl and K2ttl are sum values of the input multivalued data and the integral error values. Further, K1" and K2" are binary quantized data for the first recording scan and the second recording scan.

In the processing, thresholds (quantization parameters) used for determining the values of K1" and K2" which are the binary quantized data are changed in accordance with the values of K1ttl and K2ttl. Hence, a table is prepared such that the thresholds are directly determined in accordance with the values of K1ttl and K2ttl. Here, it is assumed that the threshold for comparison with K1ttl to determine K1" is K1table [K2ttl], and the threshold for comparison with K2ttl to determine K2" is K2table[K1ttl]. K1table[K2ttl] is a value determined on the basis of the value of K2ttl. K2table[K1ttl] is a value determined on the basis of the value of K1ttl.

When the processing is started, in S21, K1ttl and K2ttl are calculated. Then, in S22, with reference to a threshold table shown in Table 1 (provided below), the two thresholds K1table[K2ttl] and K2table[K1ttl] are acquired by using K1ttl and K2ttl obtained in S21. The threshold K1table[K2ttl] is directly determined by using K2ttl as a "reference value" in the threshold table in Table 1. The threshold K2table[K1ttl] is directly determined by using K1ttl as a "reference value" in the threshold table in Table 1.

In S23 to S25, K1" is determined. In S26 to S28, K2" is determined. To be more specific, in S23, it is judged whether K1ttl calculated in S21 is equal to or larger than the threshold K1table[K2ttl] acquired in S22. If K1ttl is equal to or larger than the threshold, K1"=1 is established. The integral error value K1err (=K1ttl−255) is calculated and updated in accordance with the output value (K1"=1) (S25). In contrast, if K1ttl is smaller than the threshold, K1"=0 is established. The integral error value K1err (=K1ttl) is calculated and updated in accordance with the output value (K1"=0) (S24).

Then, in S26, it is judged whether K2ttl calculated in S21 is equal to or larger than the threshold K2table[K1ttl] acquired in S22. If K2ttl is equal to or larger than the threshold, K2"=1 is established. The integral error value K2err (=K2ttl−255) is calculated and updated in accordance with the output value (K1"=1) (S28). In contrast, if K2ttl is smaller than the threshold, K2"=0 is established. The integral error value K2err (=K2ttl) is calculated and updated in accordance with the output value (K2"=0) (S27).

Then, in S29, the integral error values K1err and K2err updated as described above are diffused to surrounding pixels, which have not been processed by the quantization, according to the error diffusion matrixes shown in FIGS. 13A and 13B. In this embodiment, the error diffusion matrix shown in FIG. 13A is used for diffusing the integral error value K1err to the surrounding pixels, and the error diffusion matrix shown in FIG. 13B is used for diffusing the integral error value K2err to the surrounding pixels.

As described above, in this embodiment, the threshold (quantization parameter) used for quantizing the first-scan multivalued data (K1ttl) is determined on the basis of the second-scan multivalued data (K2ttl). Similarly, the threshold (quantization parameter) used for quantizing the second-scan multivalued data (K2ttl) is determined on the basis of the first-scan multivalued data (K1ttl). That is, quantization for multivalued data corresponding to one of two scans and quantization for multivalued data corresponding to the other of the two scans are executed on the basis of both the multivalued data corresponding to the one of the scans and the multivalued data corresponding to the other of the scans. Accordingly, for example, a pixel on which a dot is recorded by the one of the scans can be controlled such that a dot is not recorded by the other of the scans on that pixel as far as possible. The increase in graininess due to overlap of dots can be suppressed.

Figure 22A:
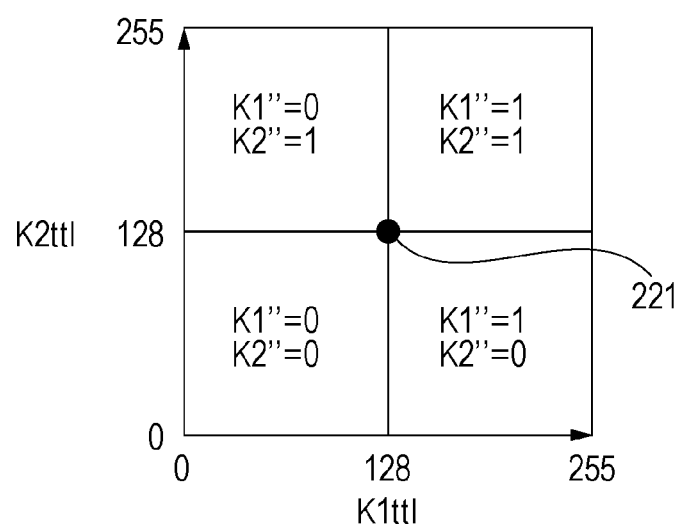
FIG. 22A illustrates a correspondence between results (K1", K2") of quantization by binarization by using thresholds written in a threshold table in Table 1 and input values (K1ttl, K2ttl).
Figure 26:
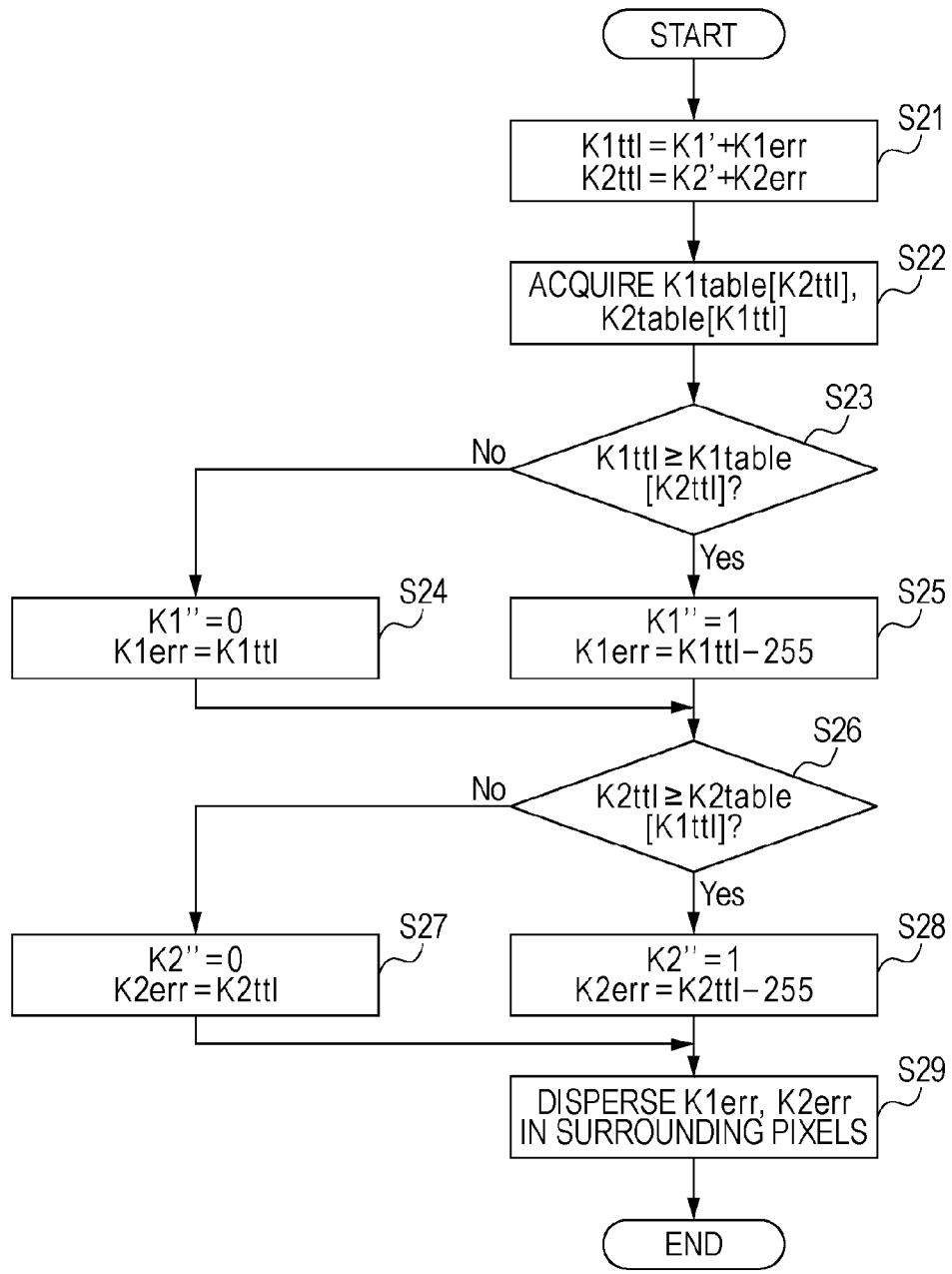
FIG. 26 is a flowchart showing an exemplary method of quantization that can be executed by a control unit 3000 according to the second embodiment.

FIG. 22A is an illustration explaining results of quantization (binarization) according to the flowchart in FIG. 26 with thresholds written in columns for FIG. 22A in the threshold table in Table 1 in correspondence with input values (K1ttl and K2ttl). K1ttl and K2ttl may be any of the values from 0 to 255. As shown in the columns for FIG. 22 in the threshold table, recording (1) or non-recording (0) is determined with reference to a threshold 128. A point 221 in the drawing is a boundary point between a region in which no dot is recorded (K1"=0 and K2"=0) and a region in which two dots overlap each other (K1"=1 and K2"=1). In this example, the probability of K1"=1 (i.e., dot recording ratio) is K1'/255, and the probability of K2" is K2'/255. Hence, a dot overlap ratio (probability with which two dots are redundantly recorded on a single pixel) is about (K1'/255)×(K2"/255).

Figure 22B:
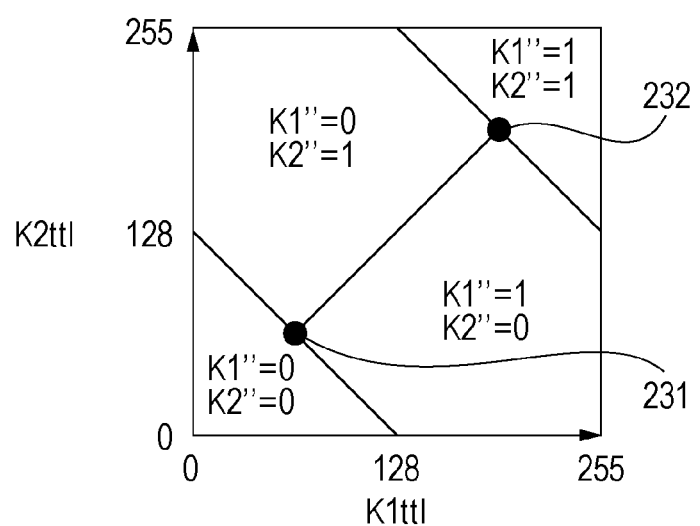
FIG. 22B illustrates a correspondence between results (K1", K2") of quantization by binarization by using thresholds written in the threshold table in Table 1 and input values (K1ttl, K2ttl).

FIG. 22B is an illustration explaining results of quantization (binarization) according to the flowchart in FIG. 26 with thresholds written in columns for FIG. 22B in the threshold table in Table 1 in correspondence with input values (K1ttl and K2ttl). A point 231 is a boundary between a region in which no dot is recorded (K1"=0 and K2"=0) and a region in which only a single dot is recorded (K1"=1 and K2"=0, or K1"=0 and K2"=0). A point 232 is a boundary between a region in which two dots are redundantly recorded (K1"=1 and K2"=1) and the region in which only a single dot is recorded (K1"=1 and K2"=0, or K1"=0 and K2"=0). Since the points 231 and 232 are separated from each other by a certain distance, the region in which a single dot is recorded is increased, and the region in which two dots are recorded is decreased as compared with FIG. 22A. That is, in FIG. 22B, the probability of the decrease in dot overlap ratio is high, and this is advantageous to decrease the graininess as compared with FIG. 22A. If there is a point at which the dot overlap ratio is rapidly changed like FIG. 22A, the density unevenness may occur due to a slight change in gradation. In contrast, in FIG. 22B, the dot overlap ratio is gradually changed in accordance with a change in gradation. Thus, the density unevenness like FIG. 22A hardly occurs.

In the quantization of this embodiment, by setting various conditions for the values Kttl and the relationship between K1' and K2', the values K1" and K2" and the dot overlap ratio can be adjusted in various fashions. Some examples will be described below with reference to FIGS. 22C to 22G. Similarly to FIGS. 22A and 22B described above, FIGS. 22C to 22G each illustrate a correspondence between results (K1", K2") of quantization by using thresholds written in the threshold table in Table 1 and input values (K1ttl, K2ttl).

Figure 22C:
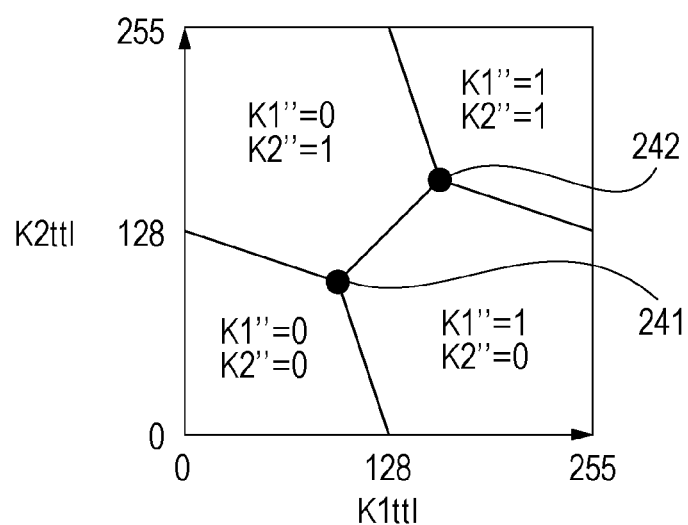
FIG. 22C illustrates a correspondence between results (K1", K2") of quantization by binarization by using thresholds written in the threshold table in Table 1 and input values (K1ttl, K2ttl).

FIG. 22C illustrates a case in which the dot overlap ratio is a value between the value in FIG. 22A and the value in FIG.

22B. A point 241 is determined at an intermediate point between the point 221 in FIG. 22A and the point 231 in FIG. 22B. Also, a point 242 is determined at an intermediate point between the point 221 in FIG. 22A and the point 232 in FIG. 22B.

Figure 22D:
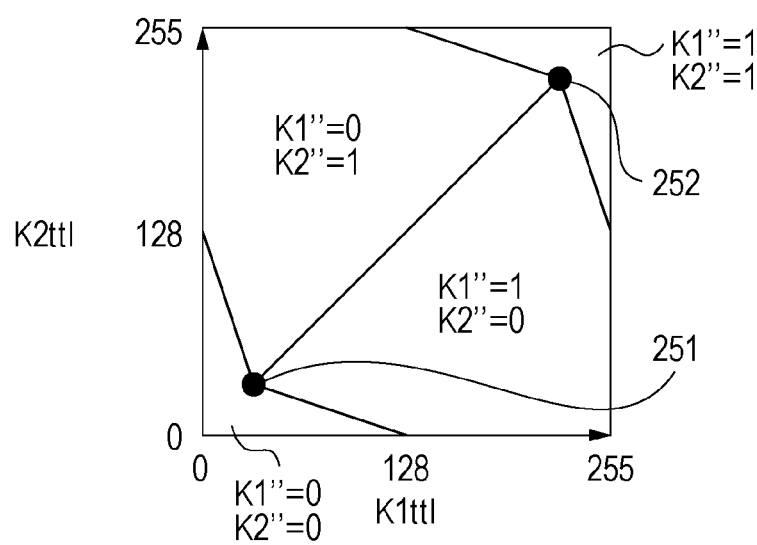
FIG. 22D illustrates a correspondence between results (K1", K2") of quantization by binarization by using thresholds written in the threshold table in Table 1 and input values (K1ttl, K2ttl).

FIG. 22D illustrates a case in which the dot overlap ratio is further decreased as compared with FIG. 22B. A point 251 is determined at a point that externally divides a segment between the point 221 in FIG. 22A and the point 231 in FIG. 22B by 3:2. Also, a point 252 is determined at a point that externally divides a segment between the point 221 in FIG. 22A and the point 232 in FIG. 22B by 3:2.

Figure 22E:
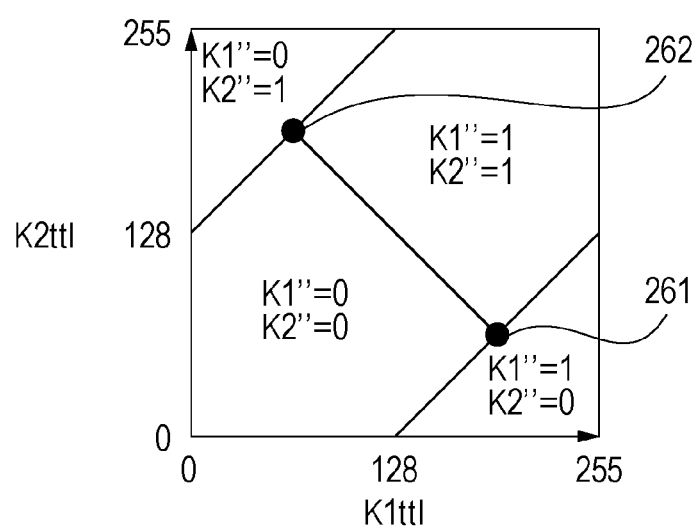
FIG. 22E illustrates a correspondence between results (K1", K2") of quantization by binarization by using thresholds written in the threshold table in Table 1 and input values (K1ttl, K2ttl).

FIG. 22E illustrates a case in which the dot overlap ratio is increased as compared with FIG. 22A. In the drawing, a point 261 is a boundary point among a region in which no dot is recorded (K1"=0 and K2"=0), a region in which only a single dot is recorded (K1"=1 and K2"=0), and a region in which two dots are redundantly recorded (K1"=1 and K2"=1). Also, a point 262 is a boundary point among the region in which no dot is recorded (K1"=0 and K2"=0), a region in which only a single dot is recorded (K1"=0 and K2"=1), and the region in which two dots are redundantly recorded (K1"=1 and K2"=1). In FIG. 22E, a shift easily occurs from the region in which no dot is recorded (K1"=0 and K2"=0) to the region in which two dots are redundantly recorded (K1"=1 and K2"=1). The dot overlap ratio can be increased.

Figure 22F:
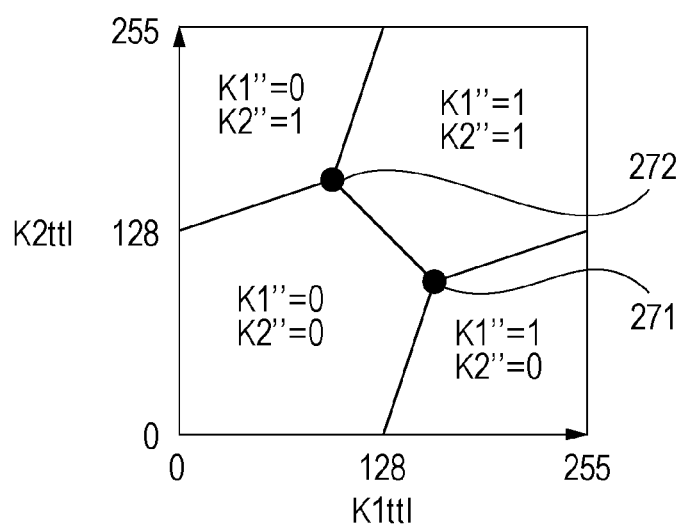
FIG. 22F illustrates a correspondence between results (K1", K2") of quantization by binarization by using thresholds written in the threshold table in Table 1 and input values (K1ttl, K2ttl).

FIG. 22F illustrates a case in which the dot overlap ratio is a value between the value in FIG. 22A and the value in FIG. 22E. A point 271 is determined at an intermediate point between the point 221 in FIG. 22A and the point 261 in FIG. 22E. A point 272 is determined at an intermediate point between the point 221 in FIG. 22A and the point 262 in FIG. 22E.

Figure 22G:
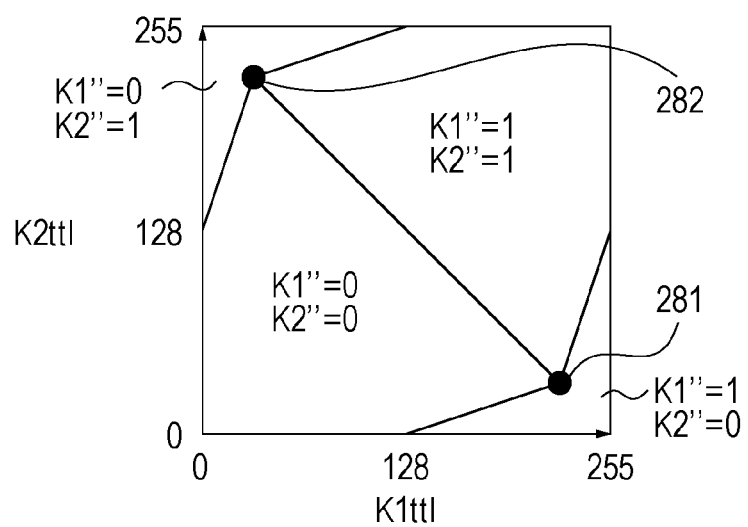
FIG. 22G illustrates a correspondence between results (K1", K2") of quantization by binarization by using thresholds written in the threshold table in Table 1 and input values (K1ttl, K2ttl).

FIG. 22G illustrates a case in which the dot overlap ratio is further increased as compared with FIG. 22E. A point 281 is determined at a point that externally divides a segment between the point 221 in FIG. 22A and the point 261 in FIG. 22E by 3:2. A point 282 is determined at a point that externally divides a segment between the point 221 in FIG. 22A and the point 262 in FIG. 22E by 3:2.

Next, the method of quantization using the threshold table in Table 1 will be specifically described. Table 1 is the threshold table for acquiring the thresholds in S22 of the flowchart in FIG. 26 to obtain the results of the processing shown in FIGS. 22A to 22G.

Described here is a case in which input values (K1ttl, K2ttl) are (100, 120), and thresholds written in columns for FIG. 22B of the threshold table are used. In S22 in FIG. 26, a threshold K1table[K2ttl] is obtained on the basis of the threshold table in Table 1 and K2ttl (reference value). If the reference value (K2ttl) is "120," the threshold K1table[K2ttl] is "120." Similarly, a threshold K2table[K1ttl] is obtained on the basis of the threshold table and K1ttl (reference value). If the reference value (K1ttl) is "100," the threshold K2table [K1ttl] is "101." Then, in S23 in FIG. 26, K1ttl and the threshold K1table[K2ttl] are compared and judged. In this case, since the judgment results in K1ttl (=100)<threshold K1table[K2ttl] (=120), K1"=0 (S24) is established. Similarly, in S26 in FIG. 26, K2ttl and the threshold K2table[K1ttl] are compared and judged. In this case, since the judgment results in K2ttl (=120)≧threshold K2table[K1ttl] (=101), K2"=1 (S28) is established. Consequently, as shown in FIG. 22B, if (K1ttl, K2ttl)=(100, 120), (K1", K2")=(0, 1) is established.

Described here is another case with input values (K1ttl, K2ttl)=(120, 120), and thresholds written in columns for FIG. 22C of the threshold table are used. In this case, a threshold K1table[K2ttl] is "120," and a threshold K2table[K1ttl] is "121." Hence, since the judgment results in K1ttl (=120) ≧threshold K1table[K2ttl] (=120), K1"=1 is established. Also, since the judgment results in K2ttl (=120)<threshold K2table[K1ttl] (=121), K2"=0 is established. Consequently, as shown in FIG. 22C, if (K1ttl, K2ttl)=(120, 120), (K1", K2")=(1, 0) is established.

With the above-described quantization, the multivalued data corresponding to the two scans is quantized on the basis of the multivalued data corresponding to the two scans, so that the dot overlap ratio between the two scans is controlled. Accordingly, the dot overlap ratio between dots recorded by one of the scans and dots recorded by the other of the scans can fall within a desirable range, that is, in a range that can provide both the high robustness and the low graininess.

TABLE 1

|  | FIG. 22A | | FIG. 22B | | FIG. 22C | | FIG. 22D | | FIG. 22E | | FIG. 22F | | FIG. 22G | |
| --- | --- | --- | --- | --- | --- | --- | --- | --- | --- | --- | --- | --- | --- | --- |
| Reference value | K1 table | K2 table | K1 table | K2 table | K1 table | K2 table | K1 table | K2 table | K1 table | K2 table | K1 table | K2 table | K1 table | K2 table |
| 0 | 128 | 128 | 128 | 128 | 128 | 128 | 128 | 128 | 127 | 127 | 127 | 127 | 127 | 127 |
| 1 | 128 | 128 | 127 | 127 | 127 | 127 | 125 | 125 | 128 | 128 | 128 | 128 | 130 | 130 |
| 2 | 128 | 128 | 126 | 126 | 127 | 127 | 122 | 122 | 129 | 129 | 128 | 128 | 133 | 133 |
| 3 | 128 | 128 | 125 | 125 | 127 | 127 | 119 | 119 | 130 | 130 | 128 | 128 | 136 | 136 |
| 4 | 128 | 128 | 124 | 124 | 126 | 126 | 116 | 116 | 131 | 131 | 129 | 129 | 139 | 139 |
| 5 | 128 | 128 | 123 | 123 | 126 | 126 | 113 | 113 | 132 | 132 | 129 | 129 | 142 | 142 |
| 6 | 128 | 128 | 122 | 122 | 126 | 126 | 110 | 110 | 133 | 133 | 129 | 129 | 145 | 145 |
| 7 | 128 | 128 | 121 | 121 | 125 | 125 | 107 | 107 | 134 | 134 | 130 | 130 | 148 | 148 |
| 8 | 128 | 128 | 120 | 120 | 125 | 125 | 104 | 104 | 135 | 135 | 130 | 130 | 151 | 151 |
| 9 | 128 | 128 | 119 | 119 | 125 | 125 | 101 | 101 | 136 | 136 | 130 | 130 | 154 | 154 |
| 10 | 128 | 128 | 118 | 118 | 124 | 124 | 98 | 98 | 137 | 137 | 131 | 131 | 157 | 157 |
| 11 | 128 | 128 | 117 | 117 | 124 | 124 | 95 | 95 | 138 | 138 | 131 | 131 | 160 | 160 |
| 12 | 128 | 128 | 116 | 116 | 124 | 124 | 92 | 92 | 139 | 139 | 131 | 131 | 163 | 163 |
| 13 | 128 | 128 | 115 | 115 | 123 | 123 | 89 | 89 | 140 | 140 | 132 | 132 | 166 | 166 |
| 14 | 128 | 128 | 114 | 114 | 123 | 123 | 86 | 86 | 141 | 141 | 132 | 132 | 169 | 169 |
| 15 | 128 | 128 | 113 | 113 | 123 | 123 | 83 | 83 | 142 | 142 | 132 | 132 | 172 | 172 |
| 16 | 128 | 128 | 112 | 112 | 122 | 122 | 80 | 80 | 143 | 143 | 133 | 133 | 175 | 175 |
| 17 | 128 | 128 | 111 | 111 | 122 | 122 | 77 | 77 | 144 | 144 | 133 | 133 | 178 | 178 |
| 18 | 128 | 128 | 110 | 110 | 122 | 122 | 74 | 74 | 145 | 145 | 133 | 133 | 181 | 181 |
| 19 | 128 | 128 | 109 | 109 | 121 | 121 | 71 | 71 | 146 | 146 | 134 | 134 | 184 | 184 |
| 20 | 128 | 128 | 108 | 108 | 121 | 121 | 68 | 68 | 147 | 147 | 134 | 134 | 187 | 187 |
| 21 | 128 | 128 | 107 | 107 | 121 | 121 | 65 | 65 | 148 | 148 | 134 | 134 | 190 | 190 |
| 22 | 128 | 128 | 106 | 106 | 120 | 120 | 62 | 62 | 149 | 149 | 135 | 135 | 193 | 193 |

TABLE 1-continued

| | FIG. 22A | | FIG. 22B | | FIG. 22C | | FIG. 22D | | FIG. 22E | | FIG. 22F | | FIG. 22G | |
|---|---|---|---|---|---|---|---|---|---|---|---|---|---|---|
| Reference value | K1 table | K2 table | K1 table | K2 table | K1 table | K2 table | K1 table | K2 table | K1 table | K2 table | K1 table | K2 table | K1 table | K2 table |
| 23 | 128 | 128 | 105 | 105 | 120 | 120 | 59 | 59 | 150 | 150 | 135 | 135 | 196 | 196 |
| 24 | 128 | 128 | 104 | 104 | 120 | 120 | 56 | 56 | 151 | 151 | 135 | 135 | 199 | 199 |
| 25 | 128 | 128 | 103 | 103 | 119 | 119 | 53 | 53 | 152 | 152 | 136 | 136 | 202 | 202 |
| 26 | 128 | 128 | 102 | 102 | 119 | 119 | 50 | 50 | 153 | 153 | 136 | 136 | 205 | 205 |
| 27 | 128 | 128 | 101 | 101 | 119 | 119 | 47 | 47 | 154 | 154 | 136 | 136 | 208 | 208 |
| 28 | 128 | 128 | 100 | 100 | 118 | 118 | 44 | 44 | 155 | 155 | 137 | 137 | 211 | 211 |
| 29 | 128 | 128 | 99 | 99 | 118 | 118 | 41 | 41 | 156 | 156 | 137 | 137 | 214 | 214 |
| 30 | 128 | 128 | 98 | 98 | 118 | 118 | 38 | 38 | 157 | 157 | 137 | 137 | 217 | 217 |
| 31 | 128 | 128 | 97 | 97 | 117 | 117 | 35 | 35 | 158 | 158 | 138 | 138 | 220 | 220 |
| 32 | 128 | 128 | 96 | 96 | 117 | 117 | 32 | 33 | 159 | 159 | 138 | 138 | 223 | 222 |
| 33 | 128 | 128 | 95 | 95 | 117 | 117 | 33 | 34 | 160 | 160 | 138 | 138 | 222 | 221 |
| 34 | 128 | 128 | 94 | 94 | 116 | 116 | 34 | 35 | 161 | 161 | 139 | 139 | 221 | 220 |
| 35 | 128 | 128 | 93 | 93 | 116 | 116 | 35 | 36 | 162 | 162 | 139 | 139 | 220 | 219 |
| 36 | 128 | 128 | 92 | 92 | 116 | 116 | 36 | 37 | 163 | 163 | 139 | 139 | 219 | 218 |
| 37 | 128 | 128 | 91 | 91 | 115 | 115 | 37 | 38 | 164 | 164 | 140 | 140 | 218 | 217 |
| 38 | 128 | 128 | 90 | 90 | 115 | 115 | 38 | 39 | 165 | 165 | 140 | 140 | 217 | 216 |
| 39 | 128 | 128 | 89 | 89 | 115 | 115 | 39 | 40 | 166 | 166 | 140 | 140 | 216 | 215 |
| 40 | 128 | 128 | 88 | 88 | 114 | 114 | 40 | 41 | 167 | 167 | 141 | 141 | 215 | 214 |
| 41 | 128 | 128 | 87 | 87 | 114 | 114 | 41 | 42 | 168 | 168 | 141 | 141 | 214 | 213 |
| 42 | 128 | 128 | 86 | 86 | 114 | 114 | 42 | 43 | 169 | 169 | 141 | 141 | 213 | 212 |
| 43 | 128 | 128 | 85 | 85 | 113 | 113 | 43 | 44 | 170 | 170 | 142 | 142 | 212 | 211 |
| 44 | 128 | 128 | 84 | 84 | 113 | 113 | 44 | 45 | 171 | 171 | 142 | 142 | 211 | 210 |
| 45 | 128 | 128 | 83 | 83 | 113 | 113 | 45 | 46 | 172 | 172 | 142 | 142 | 210 | 209 |
| 46 | 128 | 128 | 82 | 82 | 112 | 112 | 46 | 47 | 173 | 173 | 143 | 143 | 209 | 208 |
| 47 | 128 | 128 | 81 | 81 | 112 | 112 | 47 | 48 | 174 | 174 | 143 | 143 | 208 | 207 |
| 48 | 128 | 128 | 80 | 80 | 112 | 112 | 48 | 49 | 175 | 175 | 143 | 143 | 207 | 206 |
| 49 | 128 | 128 | 79 | 79 | 111 | 111 | 49 | 50 | 176 | 176 | 144 | 144 | 206 | 205 |
| 50 | 128 | 128 | 78 | 78 | 111 | 111 | 50 | 51 | 177 | 177 | 144 | 144 | 205 | 204 |
| 51 | 128 | 128 | 77 | 77 | 111 | 111 | 51 | 52 | 178 | 178 | 144 | 144 | 204 | 203 |
| 52 | 128 | 128 | 76 | 76 | 110 | 110 | 52 | 53 | 179 | 179 | 145 | 145 | 203 | 202 |
| 53 | 128 | 128 | 75 | 75 | 110 | 110 | 53 | 54 | 180 | 180 | 145 | 145 | 202 | 201 |
| 54 | 128 | 128 | 74 | 74 | 110 | 110 | 54 | 55 | 181 | 181 | 145 | 145 | 201 | 200 |
| 55 | 128 | 128 | 73 | 73 | 109 | 109 | 55 | 56 | 182 | 182 | 146 | 146 | 200 | 199 |
| 56 | 128 | 128 | 72 | 72 | 109 | 109 | 56 | 57 | 183 | 183 | 146 | 146 | 199 | 198 |
| 57 | 128 | 128 | 71 | 71 | 109 | 109 | 57 | 58 | 184 | 184 | 146 | 146 | 198 | 197 |
| 58 | 128 | 128 | 70 | 70 | 108 | 108 | 58 | 59 | 185 | 185 | 147 | 147 | 197 | 196 |
| 59 | 128 | 128 | 69 | 69 | 108 | 108 | 59 | 60 | 186 | 186 | 147 | 147 | 196 | 195 |
| 60 | 128 | 128 | 68 | 68 | 108 | 108 | 60 | 61 | 187 | 187 | 147 | 147 | 195 | 194 |
| 61 | 128 | 128 | 67 | 67 | 107 | 107 | 61 | 62 | 188 | 188 | 148 | 148 | 194 | 193 |
| 62 | 128 | 128 | 66 | 66 | 107 | 107 | 62 | 63 | 189 | 189 | 148 | 148 | 193 | 192 |
| 63 | 128 | 128 | 65 | 65 | 107 | 107 | 63 | 64 | 190 | 190 | 148 | 148 | 192 | 191 |
| 64 | 128 | 128 | 64 | 65 | 106 | 106 | 64 | 65 | 191 | 190 | 149 | 149 | 191 | 190 |

TABLE 2

| 65 | 128 | 128 | 65 | 66 | 106 | 106 | 65 | 66 | 190 | 189 | 149 | 149 | 190 | 189 |
|---|---|---|---|---|---|---|---|---|---|---|---|---|---|---|
| 66 | 128 | 128 | 66 | 67 | 106 | 106 | 66 | 67 | 189 | 188 | 149 | 149 | 189 | 188 |
| 67 | 128 | 128 | 67 | 68 | 105 | 105 | 67 | 68 | 188 | 187 | 150 | 150 | 188 | 187 |
| 68 | 128 | 128 | 68 | 69 | 105 | 105 | 68 | 69 | 187 | 186 | 150 | 150 | 187 | 186 |
| 69 | 128 | 128 | 69 | 70 | 105 | 105 | 69 | 70 | 186 | 185 | 150 | 150 | 186 | 185 |
| 70 | 128 | 128 | 70 | 71 | 104 | 104 | 70 | 71 | 185 | 184 | 151 | 151 | 185 | 184 |
| 71 | 128 | 128 | 71 | 72 | 104 | 104 | 71 | 72 | 184 | 183 | 151 | 151 | 184 | 183 |
| 72 | 128 | 128 | 72 | 73 | 104 | 104 | 72 | 73 | 183 | 182 | 151 | 151 | 183 | 182 |
| 73 | 128 | 128 | 73 | 74 | 103 | 103 | 73 | 74 | 182 | 181 | 152 | 152 | 182 | 181 |
| 74 | 128 | 128 | 74 | 75 | 103 | 103 | 74 | 75 | 181 | 180 | 152 | 152 | 181 | 180 |
| 75 | 128 | 128 | 75 | 76 | 103 | 103 | 75 | 76 | 180 | 179 | 152 | 152 | 180 | 179 |
| 76 | 128 | 128 | 76 | 77 | 102 | 102 | 76 | 77 | 179 | 178 | 153 | 153 | 179 | 178 |
| 77 | 128 | 128 | 77 | 78 | 102 | 102 | 77 | 78 | 178 | 177 | 153 | 153 | 178 | 177 |
| 78 | 128 | 128 | 78 | 79 | 102 | 102 | 78 | 79 | 177 | 176 | 153 | 153 | 177 | 176 |
| 79 | 128 | 128 | 79 | 80 | 101 | 101 | 79 | 80 | 176 | 175 | 154 | 154 | 176 | 175 |
| 80 | 128 | 128 | 80 | 81 | 101 | 101 | 80 | 81 | 175 | 174 | 154 | 154 | 175 | 174 |
| 81 | 128 | 128 | 81 | 82 | 101 | 101 | 81 | 82 | 174 | 173 | 154 | 154 | 174 | 173 |
| 82 | 128 | 128 | 82 | 83 | 100 | 100 | 82 | 83 | 173 | 172 | 155 | 155 | 173 | 172 |
| 83 | 128 | 128 | 83 | 84 | 100 | 100 | 83 | 84 | 172 | 171 | 155 | 155 | 172 | 171 |
| 84 | 128 | 128 | 84 | 85 | 100 | 100 | 84 | 85 | 171 | 170 | 155 | 155 | 171 | 170 |
| 85 | 128 | 128 | 85 | 86 | 99 | 99 | 85 | 86 | 170 | 169 | 156 | 156 | 170 | 169 |
| 86 | 128 | 128 | 86 | 87 | 99 | 99 | 86 | 87 | 169 | 168 | 156 | 156 | 169 | 168 |
| 87 | 128 | 128 | 87 | 88 | 99 | 99 | 87 | 88 | 168 | 167 | 156 | 156 | 168 | 167 |
| 88 | 128 | 128 | 88 | 89 | 98 | 98 | 88 | 89 | 167 | 166 | 157 | 157 | 167 | 166 |
| 89 | 128 | 128 | 89 | 90 | 98 | 98 | 89 | 90 | 166 | 165 | 157 | 157 | 166 | 165 |
| 90 | 128 | 128 | 90 | 91 | 98 | 98 | 90 | 91 | 165 | 164 | 157 | 157 | 165 | 164 |
| 91 | 128 | 128 | 91 | 92 | 97 | 97 | 91 | 92 | 164 | 163 | 158 | 158 | 164 | 163 |

TABLE 2-continued

| | | | | | | | | | | | | | | |
|---|---|---|---|---|---|---|---|---|---|---|---|---|---|---|
| 92 | 128 | 128 | 92 | 93 | 97 | 97 | 92 | 93 | 163 | 162 | 158 | 158 | 163 | 162 |
| 93 | 128 | 128 | 93 | 94 | 97 | 97 | 93 | 94 | 162 | 161 | 158 | 158 | 162 | 161 |
| 94 | 128 | 128 | 94 | 95 | 96 | 96 | 94 | 95 | 161 | 160 | 159 | 159 | 161 | 160 |
| 95 | 128 | 128 | 95 | 96 | 96 | 96 | 95 | 96 | 160 | 159 | 159 | 159 | 160 | 159 |
| 96 | 128 | 128 | 96 | 97 | 96 | 97 | 96 | 97 | 159 | 158 | 159 | 158 | 159 | 158 |
| 97 | 128 | 128 | 97 | 98 | 97 | 98 | 97 | 98 | 158 | 157 | 158 | 157 | 158 | 157 |
| 98 | 128 | 128 | 98 | 99 | 98 | 99 | 98 | 99 | 157 | 156 | 157 | 156 | 157 | 156 |
| 99 | 128 | 128 | 99 | 100 | 99 | 100 | 99 | 100 | 156 | 155 | 156 | 155 | 156 | 155 |
| 100 | 128 | 128 | 100 | 101 | 100 | 101 | 100 | 101 | 155 | 154 | 155 | 154 | 155 | 154 |
| 101 | 128 | 128 | 101 | 102 | 101 | 102 | 101 | 102 | 154 | 153 | 154 | 153 | 154 | 153 |
| 102 | 128 | 128 | 102 | 103 | 102 | 103 | 102 | 103 | 153 | 152 | 153 | 152 | 153 | 152 |
| 103 | 128 | 128 | 103 | 104 | 103 | 104 | 103 | 104 | 152 | 151 | 152 | 151 | 152 | 151 |
| 104 | 128 | 128 | 104 | 105 | 104 | 105 | 104 | 105 | 151 | 150 | 151 | 150 | 151 | 150 |
| 105 | 128 | 128 | 105 | 106 | 105 | 106 | 105 | 106 | 150 | 149 | 150 | 149 | 150 | 149 |
| 106 | 128 | 128 | 106 | 107 | 106 | 107 | 106 | 107 | 149 | 148 | 149 | 148 | 149 | 148 |
| 107 | 128 | 128 | 107 | 108 | 107 | 108 | 107 | 108 | 148 | 147 | 148 | 147 | 148 | 147 |
| 108 | 128 | 128 | 108 | 109 | 108 | 109 | 108 | 109 | 147 | 146 | 147 | 146 | 147 | 146 |
| 109 | 128 | 128 | 109 | 110 | 109 | 110 | 109 | 110 | 146 | 145 | 146 | 145 | 146 | 145 |
| 110 | 128 | 128 | 110 | 111 | 110 | 111 | 110 | 111 | 145 | 144 | 145 | 144 | 145 | 144 |
| 111 | 128 | 128 | 111 | 112 | 111 | 112 | 111 | 112 | 144 | 143 | 144 | 143 | 144 | 143 |
| 112 | 128 | 128 | 112 | 113 | 112 | 113 | 112 | 113 | 143 | 142 | 143 | 142 | 143 | 142 |
| 113 | 128 | 128 | 113 | 114 | 113 | 114 | 113 | 114 | 142 | 141 | 142 | 141 | 142 | 141 |
| 114 | 128 | 128 | 114 | 115 | 114 | 115 | 114 | 115 | 141 | 140 | 141 | 140 | 141 | 140 |
| 115 | 128 | 128 | 115 | 116 | 115 | 116 | 115 | 116 | 140 | 139 | 140 | 139 | 140 | 139 |
| 116 | 128 | 128 | 116 | 117 | 116 | 117 | 116 | 117 | 139 | 138 | 139 | 138 | 139 | 138 |
| 117 | 128 | 128 | 117 | 118 | 117 | 118 | 117 | 118 | 138 | 137 | 138 | 137 | 138 | 137 |
| 118 | 128 | 128 | 118 | 119 | 118 | 119 | 118 | 119 | 137 | 136 | 137 | 136 | 137 | 136 |
| 119 | 128 | 128 | 119 | 120 | 119 | 120 | 119 | 120 | 136 | 135 | 136 | 135 | 136 | 135 |
| 120 | 128 | 128 | 120 | 121 | 120 | 121 | 120 | 121 | 135 | 134 | 135 | 134 | 135 | 134 |
| 121 | 128 | 128 | 121 | 122 | 121 | 122 | 121 | 122 | 134 | 133 | 134 | 133 | 134 | 133 |
| 122 | 128 | 128 | 122 | 123 | 122 | 123 | 122 | 123 | 133 | 132 | 133 | 132 | 133 | 132 |
| 123 | 128 | 128 | 123 | 124 | 123 | 124 | 123 | 124 | 132 | 131 | 132 | 131 | 132 | 131 |
| 124 | 128 | 128 | 124 | 125 | 124 | 125 | 124 | 125 | 131 | 130 | 131 | 130 | 131 | 130 |
| 125 | 128 | 128 | 125 | 126 | 125 | 126 | 125 | 126 | 130 | 129 | 130 | 129 | 130 | 129 |
| 126 | 128 | 128 | 126 | 127 | 126 | 127 | 126 | 127 | 129 | 128 | 129 | 128 | 129 | 128 |
| 127 | 128 | 128 | 127 | 128 | 127 | 128 | 127 | 128 | 128 | 127 | 128 | 127 | 128 | 127 |
| 128 | 128 | 128 | 128 | 129 | 128 | 129 | 128 | 129 | 127 | 126 | 127 | 126 | 127 | 126 |

TABLE 3

| | | | | | | | | | | | | | | |
|---|---|---|---|---|---|---|---|---|---|---|---|---|---|---|
| 129 | 128 | 128 | 129 | 130 | 129 | 130 | 129 | 130 | 126 | 125 | 126 | 125 | 126 | 125 |
| 130 | 128 | 128 | 130 | 131 | 130 | 131 | 130 | 131 | 125 | 124 | 125 | 124 | 125 | 124 |
| 131 | 128 | 128 | 131 | 132 | 131 | 132 | 131 | 132 | 124 | 123 | 124 | 123 | 124 | 123 |
| 132 | 128 | 128 | 132 | 133 | 132 | 133 | 132 | 133 | 123 | 122 | 123 | 122 | 123 | 122 |
| 133 | 128 | 128 | 133 | 134 | 133 | 134 | 133 | 134 | 122 | 121 | 122 | 121 | 122 | 121 |
| 134 | 128 | 128 | 134 | 135 | 134 | 135 | 134 | 135 | 121 | 120 | 121 | 120 | 121 | 120 |
| 135 | 128 | 128 | 135 | 136 | 135 | 136 | 135 | 136 | 120 | 119 | 120 | 119 | 120 | 119 |
| 136 | 128 | 128 | 136 | 137 | 136 | 137 | 136 | 137 | 119 | 118 | 119 | 118 | 119 | 118 |
| 137 | 128 | 128 | 137 | 138 | 137 | 138 | 137 | 138 | 118 | 117 | 118 | 117 | 118 | 117 |
| 138 | 128 | 128 | 138 | 139 | 138 | 139 | 138 | 139 | 117 | 116 | 117 | 116 | 117 | 116 |
| 139 | 128 | 128 | 139 | 140 | 139 | 140 | 139 | 140 | 116 | 115 | 116 | 115 | 116 | 115 |
| 140 | 128 | 128 | 140 | 141 | 140 | 141 | 140 | 141 | 115 | 114 | 115 | 114 | 115 | 114 |
| 141 | 128 | 128 | 141 | 142 | 141 | 142 | 141 | 142 | 114 | 113 | 114 | 113 | 114 | 113 |
| 142 | 128 | 128 | 142 | 143 | 142 | 143 | 142 | 143 | 113 | 112 | 113 | 112 | 113 | 112 |
| 143 | 128 | 128 | 143 | 144 | 143 | 144 | 143 | 144 | 112 | 111 | 112 | 111 | 112 | 111 |
| 144 | 128 | 128 | 144 | 145 | 144 | 145 | 144 | 145 | 111 | 110 | 111 | 110 | 111 | 110 |
| 145 | 128 | 128 | 145 | 146 | 145 | 146 | 145 | 146 | 110 | 109 | 110 | 109 | 110 | 109 |
| 146 | 128 | 128 | 146 | 147 | 146 | 147 | 146 | 147 | 109 | 108 | 109 | 108 | 109 | 108 |
| 147 | 128 | 128 | 147 | 148 | 147 | 148 | 147 | 148 | 108 | 107 | 108 | 107 | 108 | 107 |
| 148 | 128 | 128 | 148 | 149 | 148 | 149 | 148 | 149 | 107 | 106 | 107 | 106 | 107 | 106 |
| 149 | 128 | 128 | 149 | 150 | 149 | 150 | 149 | 150 | 106 | 105 | 106 | 105 | 106 | 105 |
| 150 | 128 | 128 | 150 | 151 | 150 | 151 | 150 | 151 | 105 | 104 | 105 | 104 | 105 | 104 |
| 151 | 128 | 128 | 151 | 152 | 151 | 152 | 151 | 152 | 104 | 103 | 104 | 103 | 104 | 103 |
| 152 | 128 | 128 | 152 | 153 | 152 | 153 | 152 | 153 | 103 | 102 | 103 | 102 | 103 | 102 |
| 153 | 128 | 128 | 153 | 154 | 153 | 154 | 153 | 154 | 102 | 101 | 102 | 101 | 102 | 101 |
| 154 | 128 | 128 | 154 | 155 | 154 | 155 | 154 | 155 | 101 | 100 | 101 | 100 | 101 | 100 |
| 155 | 128 | 128 | 155 | 156 | 155 | 156 | 155 | 156 | 100 | 99 | 100 | 99 | 100 | 99 |
| 156 | 128 | 128 | 156 | 157 | 156 | 157 | 156 | 157 | 99 | 98 | 99 | 98 | 99 | 98 |
| 157 | 128 | 128 | 157 | 158 | 157 | 158 | 157 | 158 | 98 | 97 | 98 | 97 | 98 | 97 |
| 158 | 128 | 128 | 158 | 159 | 158 | 159 | 158 | 159 | 97 | 96 | 97 | 96 | 97 | 96 |
| 159 | 128 | 128 | 159 | 160 | 159 | 160 | 159 | 160 | 96 | 95 | 96 | 95 | 96 | 95 |
| 160 | 128 | 128 | 160 | 161 | 160 | 160 | 160 | 161 | 95 | 94 | 95 | 95 | 95 | 94 |
| 161 | 128 | 128 | 161 | 162 | 160 | 160 | 161 | 162 | 94 | 93 | 95 | 95 | 94 | 93 |
| 162 | 128 | 128 | 162 | 163 | 159 | 159 | 162 | 163 | 93 | 92 | 96 | 96 | 93 | 92 |
| 163 | 128 | 128 | 163 | 164 | 159 | 159 | 163 | 164 | 92 | 91 | 96 | 96 | 92 | 91 |
| 164 | 128 | 128 | 164 | 165 | 159 | 159 | 164 | 165 | 91 | 90 | 96 | 96 | 91 | 90 |
| 165 | 128 | 128 | 165 | 166 | 158 | 158 | 165 | 166 | 90 | 89 | 97 | 97 | 90 | 89 |

TABLE 3-continued

| | | | | | | | | | | | | | | |
|---|---|---|---|---|---|---|---|---|---|---|---|---|---|---|
| 166 | 128 | 128 | 166 | 167 | 158 | 158 | 166 | 167 | 89 | 88 | 97 | 97 | 89 | 88 |
| 167 | 128 | 128 | 167 | 168 | 158 | 158 | 167 | 168 | 88 | 87 | 97 | 97 | 88 | 87 |
| 168 | 128 | 128 | 168 | 169 | 157 | 157 | 168 | 169 | 87 | 86 | 98 | 98 | 87 | 86 |
| 169 | 128 | 128 | 169 | 170 | 157 | 157 | 169 | 170 | 86 | 85 | 98 | 98 | 86 | 85 |
| 170 | 128 | 128 | 170 | 171 | 157 | 157 | 170 | 171 | 85 | 84 | 98 | 98 | 85 | 84 |
| 171 | 128 | 128 | 171 | 172 | 156 | 156 | 171 | 172 | 84 | 83 | 99 | 99 | 84 | 83 |
| 172 | 128 | 128 | 172 | 173 | 156 | 156 | 172 | 173 | 83 | 82 | 99 | 99 | 83 | 82 |
| 173 | 128 | 128 | 173 | 174 | 156 | 156 | 173 | 174 | 82 | 81 | 99 | 99 | 82 | 81 |
| 174 | 128 | 128 | 174 | 175 | 155 | 155 | 174 | 175 | 81 | 80 | 100 | 100 | 81 | 80 |
| 175 | 128 | 128 | 175 | 176 | 155 | 155 | 175 | 176 | 80 | 79 | 100 | 100 | 80 | 79 |
| 176 | 128 | 128 | 176 | 177 | 155 | 155 | 176 | 177 | 79 | 78 | 100 | 100 | 79 | 78 |
| 177 | 128 | 128 | 177 | 178 | 154 | 154 | 177 | 178 | 78 | 77 | 101 | 101 | 78 | 77 |
| 178 | 128 | 128 | 178 | 179 | 154 | 154 | 178 | 179 | 77 | 76 | 101 | 101 | 77 | 76 |
| 179 | 128 | 128 | 179 | 180 | 154 | 154 | 179 | 180 | 76 | 75 | 101 | 101 | 76 | 75 |
| 180 | 128 | 128 | 180 | 181 | 153 | 153 | 180 | 181 | 75 | 74 | 102 | 102 | 75 | 74 |
| 181 | 128 | 128 | 181 | 182 | 153 | 153 | 181 | 182 | 74 | 73 | 102 | 102 | 74 | 73 |
| 182 | 128 | 128 | 182 | 183 | 153 | 153 | 182 | 183 | 73 | 72 | 102 | 102 | 73 | 72 |
| 183 | 128 | 128 | 183 | 184 | 152 | 152 | 183 | 184 | 72 | 71 | 103 | 103 | 72 | 71 |
| 184 | 128 | 128 | 184 | 185 | 152 | 152 | 184 | 185 | 71 | 70 | 103 | 103 | 71 | 70 |
| 185 | 128 | 128 | 185 | 186 | 152 | 152 | 185 | 186 | 70 | 69 | 103 | 103 | 70 | 69 |
| 186 | 128 | 128 | 186 | 187 | 151 | 151 | 186 | 187 | 69 | 68 | 104 | 104 | 69 | 68 |
| 187 | 128 | 128 | 187 | 188 | 151 | 151 | 187 | 188 | 68 | 67 | 104 | 104 | 68 | 67 |
| 188 | 128 | 128 | 188 | 189 | 151 | 151 | 188 | 189 | 67 | 66 | 104 | 104 | 67 | 66 |
| 189 | 128 | 128 | 189 | 190 | 150 | 150 | 189 | 190 | 66 | 65 | 105 | 105 | 66 | 65 |
| 190 | 128 | 128 | 190 | 191 | 150 | 150 | 190 | 191 | 65 | 64 | 105 | 105 | 65 | 64 |
| 191 | 128 | 128 | 191 | 192 | 150 | 150 | 191 | 192 | 64 | 63 | 105 | 105 | 64 | 63 |
| 192 | 128 | 128 | 191 | 191 | 149 | 149 | 192 | 193 | 64 | 64 | 106 | 106 | 63 | 62 |

TABLE 4

| | | | | | | | | | | | | | | |
|---|---|---|---|---|---|---|---|---|---|---|---|---|---|---|
| 193 | 128 | 128 | 190 | 190 | 149 | 149 | 193 | 194 | 65 | 65 | 106 | 106 | 62 | 61 |
| 194 | 128 | 128 | 189 | 189 | 149 | 149 | 194 | 195 | 66 | 66 | 106 | 106 | 61 | 60 |
| 195 | 128 | 128 | 188 | 188 | 148 | 148 | 195 | 196 | 67 | 67 | 107 | 107 | 60 | 59 |
| 196 | 128 | 128 | 187 | 187 | 148 | 148 | 196 | 197 | 68 | 68 | 107 | 107 | 59 | 58 |
| 197 | 128 | 128 | 186 | 186 | 148 | 148 | 197 | 198 | 69 | 69 | 107 | 107 | 58 | 57 |
| 198 | 128 | 128 | 185 | 185 | 147 | 147 | 198 | 199 | 70 | 70 | 108 | 108 | 57 | 56 |
| 199 | 128 | 128 | 184 | 184 | 147 | 147 | 199 | 200 | 71 | 71 | 108 | 108 | 56 | 55 |
| 200 | 128 | 128 | 183 | 183 | 147 | 147 | 200 | 201 | 72 | 72 | 108 | 108 | 55 | 54 |
| 201 | 128 | 128 | 182 | 182 | 146 | 146 | 201 | 202 | 73 | 73 | 109 | 109 | 54 | 53 |
| 202 | 128 | 128 | 181 | 181 | 146 | 146 | 202 | 203 | 74 | 74 | 109 | 109 | 53 | 52 |
| 203 | 128 | 128 | 180 | 180 | 146 | 146 | 203 | 204 | 75 | 75 | 109 | 109 | 52 | 51 |
| 204 | 128 | 128 | 179 | 179 | 145 | 145 | 204 | 205 | 76 | 76 | 110 | 110 | 51 | 50 |
| 205 | 128 | 128 | 178 | 178 | 145 | 145 | 205 | 206 | 77 | 77 | 110 | 110 | 50 | 49 |
| 206 | 128 | 128 | 177 | 177 | 145 | 145 | 206 | 207 | 78 | 78 | 110 | 110 | 49 | 48 |
| 207 | 128 | 128 | 176 | 176 | 144 | 144 | 207 | 208 | 79 | 79 | 111 | 111 | 48 | 47 |
| 208 | 128 | 128 | 175 | 175 | 144 | 144 | 208 | 209 | 80 | 80 | 111 | 111 | 47 | 46 |
| 209 | 128 | 128 | 174 | 174 | 144 | 144 | 209 | 210 | 81 | 81 | 111 | 111 | 46 | 45 |
| 210 | 128 | 128 | 173 | 173 | 143 | 143 | 210 | 211 | 82 | 82 | 112 | 112 | 45 | 44 |
| 211 | 128 | 128 | 172 | 172 | 143 | 143 | 211 | 212 | 83 | 83 | 112 | 112 | 44 | 43 |
| 212 | 128 | 128 | 171 | 171 | 143 | 143 | 212 | 213 | 84 | 84 | 112 | 112 | 43 | 42 |
| 213 | 128 | 128 | 170 | 170 | 142 | 142 | 213 | 214 | 85 | 85 | 113 | 113 | 42 | 41 |
| 214 | 128 | 128 | 169 | 169 | 142 | 142 | 214 | 215 | 86 | 86 | 113 | 113 | 41 | 40 |
| 215 | 128 | 128 | 168 | 168 | 142 | 142 | 215 | 216 | 87 | 87 | 113 | 113 | 40 | 39 |
| 216 | 128 | 128 | 167 | 167 | 141 | 141 | 216 | 217 | 88 | 88 | 114 | 114 | 39 | 38 |
| 217 | 128 | 128 | 166 | 166 | 141 | 141 | 217 | 218 | 89 | 89 | 114 | 114 | 38 | 37 |
| 218 | 128 | 128 | 165 | 165 | 141 | 141 | 218 | 219 | 90 | 90 | 114 | 114 | 37 | 36 |
| 219 | 128 | 128 | 164 | 164 | 140 | 140 | 219 | 220 | 91 | 91 | 115 | 115 | 36 | 35 |
| 220 | 128 | 128 | 163 | 163 | 140 | 140 | 220 | 221 | 92 | 92 | 115 | 115 | 35 | 34 |
| 221 | 128 | 128 | 162 | 162 | 140 | 140 | 221 | 222 | 93 | 93 | 115 | 115 | 34 | 33 |
| 222 | 128 | 128 | 161 | 161 | 139 | 139 | 222 | 223 | 94 | 94 | 116 | 116 | 33 | 32 |
| 223 | 128 | 128 | 160 | 160 | 139 | 139 | 223 | 224 | 95 | 95 | 116 | 116 | 32 | 31 |
| 224 | 128 | 128 | 159 | 159 | 139 | 139 | 222 | 222 | 96 | 96 | 116 | 116 | 33 | 33 |
| 225 | 128 | 128 | 158 | 158 | 138 | 138 | 219 | 219 | 97 | 97 | 117 | 117 | 36 | 36 |
| 226 | 128 | 128 | 157 | 157 | 138 | 138 | 216 | 216 | 98 | 98 | 117 | 117 | 39 | 39 |
| 227 | 128 | 128 | 156 | 156 | 138 | 138 | 213 | 213 | 99 | 99 | 117 | 117 | 42 | 42 |
| 228 | 128 | 128 | 155 | 155 | 137 | 137 | 210 | 210 | 100 | 100 | 118 | 118 | 45 | 45 |
| 229 | 128 | 128 | 154 | 154 | 137 | 137 | 207 | 207 | 101 | 101 | 118 | 118 | 48 | 48 |
| 230 | 128 | 128 | 153 | 153 | 137 | 137 | 204 | 204 | 102 | 102 | 118 | 118 | 51 | 51 |
| 231 | 128 | 128 | 152 | 152 | 136 | 136 | 201 | 201 | 103 | 103 | 119 | 119 | 54 | 54 |
| 232 | 128 | 128 | 151 | 151 | 136 | 136 | 198 | 198 | 104 | 104 | 119 | 119 | 57 | 57 |
| 233 | 128 | 128 | 150 | 150 | 136 | 136 | 195 | 195 | 105 | 105 | 119 | 119 | 60 | 60 |
| 234 | 128 | 128 | 149 | 149 | 135 | 135 | 192 | 192 | 106 | 106 | 120 | 120 | 63 | 63 |
| 235 | 128 | 128 | 148 | 148 | 135 | 135 | 189 | 189 | 107 | 107 | 120 | 120 | 66 | 66 |
| 236 | 128 | 128 | 147 | 147 | 135 | 135 | 186 | 186 | 108 | 108 | 120 | 120 | 69 | 69 |
| 237 | 128 | 128 | 146 | 146 | 134 | 134 | 183 | 183 | 109 | 109 | 121 | 121 | 72 | 72 |
| 238 | 128 | 128 | 145 | 145 | 134 | 134 | 180 | 180 | 110 | 110 | 121 | 121 | 75 | 75 |
| 239 | 128 | 128 | 144 | 144 | 134 | 134 | 177 | 177 | 111 | 111 | 121 | 121 | 78 | 78 |

TABLE 4-continued

| 240 | 128 | 128 | 143 | 143 | 133 | 133 | 174 | 174 | 112 | 112 | 122 | 122 | 81  | 81  |
| 241 | 128 | 128 | 142 | 142 | 133 | 133 | 171 | 171 | 113 | 113 | 122 | 122 | 84  | 84  |
| 242 | 128 | 128 | 141 | 141 | 133 | 133 | 168 | 168 | 114 | 114 | 122 | 122 | 87  | 87  |
| 243 | 128 | 128 | 140 | 140 | 132 | 132 | 165 | 165 | 115 | 115 | 123 | 123 | 90  | 90  |
| 244 | 128 | 128 | 139 | 139 | 132 | 132 | 162 | 162 | 116 | 116 | 123 | 123 | 93  | 93  |
| 245 | 128 | 128 | 138 | 138 | 132 | 132 | 159 | 159 | 117 | 117 | 123 | 123 | 96  | 96  |
| 246 | 128 | 128 | 137 | 137 | 131 | 131 | 156 | 156 | 118 | 118 | 124 | 124 | 99  | 99  |
| 247 | 128 | 128 | 136 | 136 | 131 | 131 | 153 | 153 | 119 | 119 | 124 | 124 | 102 | 102 |
| 248 | 128 | 128 | 135 | 135 | 131 | 131 | 150 | 150 | 120 | 120 | 124 | 124 | 105 | 105 |
| 249 | 128 | 128 | 134 | 134 | 130 | 130 | 147 | 147 | 121 | 121 | 125 | 125 | 108 | 108 |
| 250 | 128 | 128 | 133 | 133 | 130 | 130 | 144 | 144 | 122 | 122 | 125 | 125 | 111 | 111 |
| 251 | 128 | 128 | 132 | 132 | 130 | 130 | 141 | 141 | 123 | 123 | 125 | 125 | 114 | 114 |
| 252 | 128 | 128 | 131 | 131 | 129 | 129 | 138 | 138 | 124 | 124 | 126 | 126 | 117 | 117 |
| 253 | 128 | 128 | 130 | 130 | 129 | 129 | 135 | 135 | 125 | 125 | 126 | 126 | 120 | 120 |
| 254 | 128 | 128 | 129 | 129 | 129 | 129 | 132 | 132 | 126 | 126 | 126 | 126 | 123 | 123 |
| 255 | 128 | 128 | 128 | 128 | 129 | 129 | 129 | 129 | 127 | 127 | 126 | 126 | 126 | 126 |

As described above, the first-scan binary data K1" (first quantized data) 26-1 and the second-scan binary data K2" (second quantized data) 26-2 are generated by the quantization processor 25.

The binary data K1" and the binary data K2" are respectively sent to the division processors 27-1 and 27-1, and the processing is performed for the data as described in the first embodiment. Accordingly, the four types of binary data 28-1 to 28-4 in total corresponding to the two nozzle arrays and the two scans are generated.

With the above-described processing, when the binary image data (26-1, 26-2) corresponding to the different scans overlap each other, a part in which dots overlap each other (a pixel having "1" in both planes) appears with a certain frequency. Thus, an image capable of handling the density variation can be obtained. Also, since the part in which dots overlap each other is not so frequently appears, the increase in graininess because dots overlap each other is prevented. Further, since the control for the dot overlap ratio is applied between the scans but is not applied between the nozzle arrays like the first embodiment, the decrease in density unevenness and the decrease in graininess can be attained in a balanced manner while the processing load of the dot overlap control is suppressed.

First Modification of Second Embodiment

As described above, the quantization desirably executed in this embodiment is the error diffusion that can control the dot overlap ratio as described with reference to FIG. 26. However, the quantization applicable to this embodiment is not limited thereto. Another example of quantization applicable to this embodiment will be described below with reference to FIG. 25.

Figure 25:
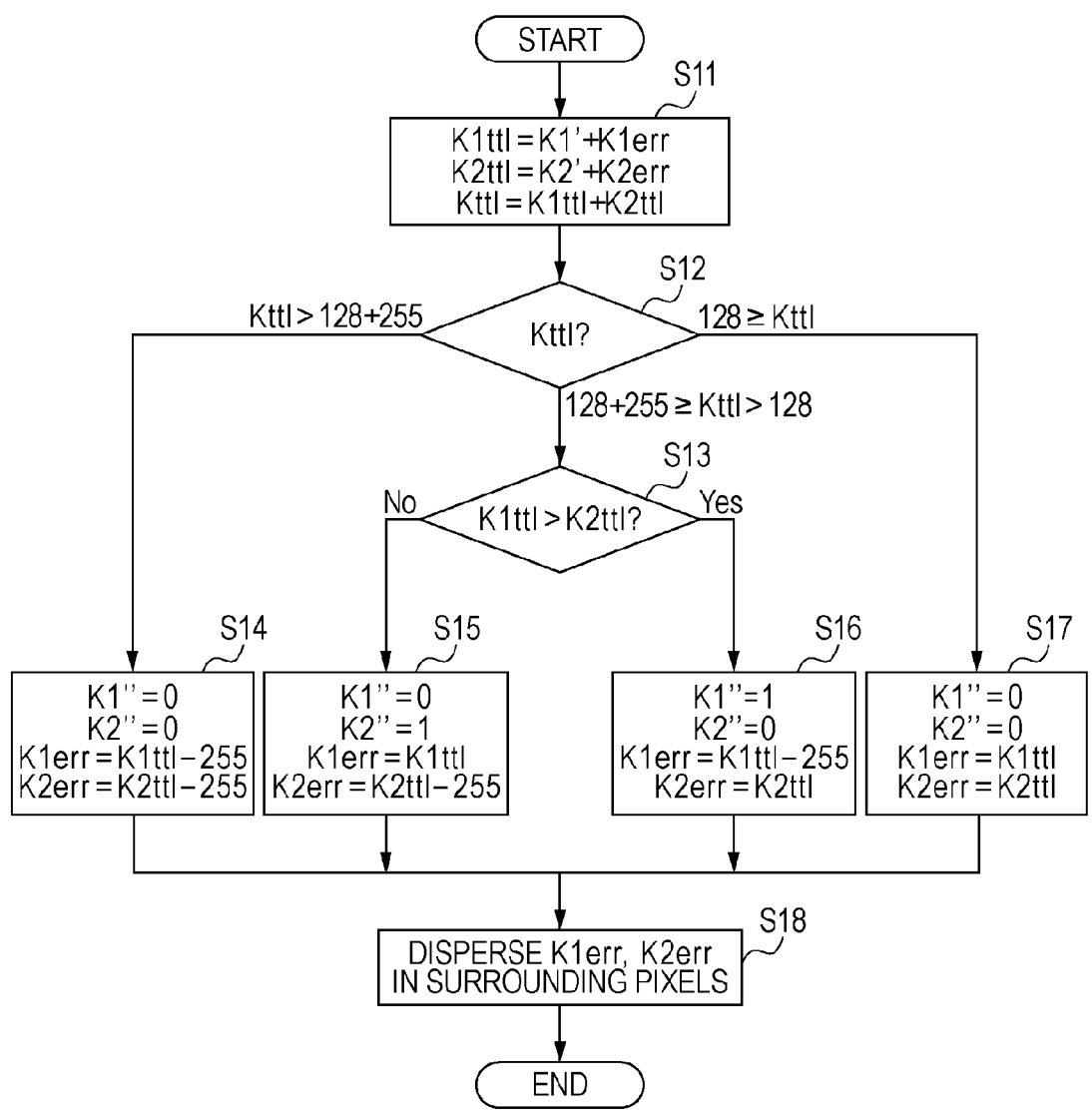
FIG. 25 is a flowchart showing an exemplary method of quantization that can be executed by a control unit 3000 according to a modification of a second embodiment.

FIG. 25 is a flowchart explaining an example of an error diffusion method that can be executed by the control unit 3000 of this embodiment for decreasing a dot overlap ratio. In the flowchart, parameters are equivalent to those described in FIG. 26.

When quantization for a target pixel is started, in S11, K1ttl and K2ttl are calculated, and also Kttl is calculated by adding K1ttl and K2ttl together. At this time, Kttl has a value from 0 to 510. In S12 to S17, values of K1" and K2" corresponding to binary quantized data are determined in accordance with the value of Kttl or the magnitude (whether values being large or small) of K1ttl and K2ttl.

If Kttl>128+255, the processing goes to S14, and K1" and K2" both are determined as 1. If Kttl≦128, the processing goes to S17, and K1" and K2" both are determined as 0. If 128+255≧Kttl>128, the processing goes to S13, and the magnitude (whether values being large or small) between K1ttl and K2ttl is further checked. In S13, if K1ttl>K2ttl, the processing goes to S16, and K1"=1 and K2"=0 are established. If K1ttl≦K2ttl, the processing goes to S15, and K1"=0 and K2"=1 are established.

In S14 to S17, integral error values K1err and K2err are newly calculated and updated in accordance with the determined output values. That is, if K1"=1, K1err=K1ttl−255 is established, and if K1"=0, K1err=K1ttl is established. Similarly, if K2"=1, K2err=K2ttl−255 is established, and if K2"=0, K2err=K2ttl is established. Then, in S18, the updated integral error values K1err and K2err are diffused to surrounding pixels, which have not been processed by the quantization, according to predetermined error diffusion matrixes (for example, the diffusion matrixes shown in FIGS. 13A and 13B). Then, the processing is ended. Here, the error diffusion matrix shown in FIG. 13A is used for diffusing the integral error value K1err to the surrounding pixels, and the error diffusion matrix shown in FIG. 13B is used for diffusing the integral error value K2err to the surrounding pixels.

With the above-described first modification, the quantization for the first-scan multivalued image data and the quantization for the second-scan multivalued image data are executed on the basis of the first-scan and second-scan multivalued image data. Accordingly, an image with a desirable dot overlap ratio can be output by the two scans. A high-quality image with good robustness and decreased graininess can be obtained.

Second Modification of Second Embodiment

In the above embodiment, the example of so-called 2-pass recording, in which recording for a single region (for example, pixel region) is completed by two recording scans, is described. However, this embodiment is not limited to the 2-pass recording. In this embodiment, the number of passes may be 3, 4, 8, or other number. That is, M-pass (M is an integer equal to or larger than 2) recording may be performed. Image processing when 3-pass recording is performed will be described below.

In a second modification, the number of scans for a single region, i.e., the number of multi-passes is three, and a dot overlap ratio is controlled for three planes. In this case, the number of multivalued density data generated by the color conversion/image data distribution unit 22 is three. In particular, with reference to a three-dimensional LUT in which input image data (RGB) is associated with multivalued density data (C1M1Y1K1, C3M2Y2K2, C3M3Y3K3) corresponding to three passes, the input image data is collectively converted into the multivalued density data. Then, the quantization processor 25 quantizes three multivalued data, i.e., first multivalued data to third multivalued data, by using thresholds obtained with reference to the prepared threshold table. Hence, three binary data are output.

Figure 16:
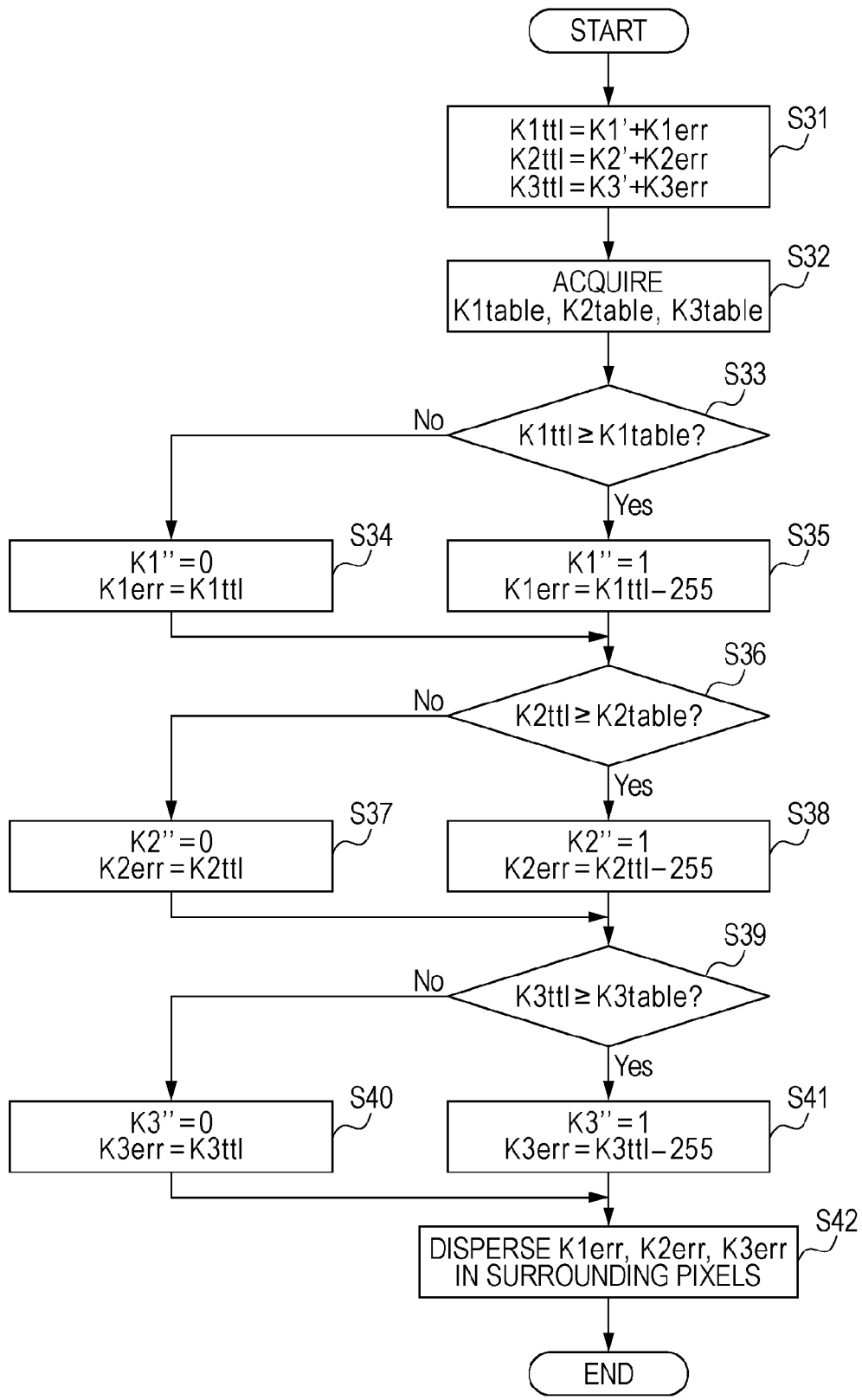
FIG. 16 is a flowchart explaining processing steps when the control unit 3000 actualizes quantization of three planes.

FIG. 16 is a flowchart explaining processing steps when the control unit 3000 of this embodiment quantizes the multivalued data for three planes corresponding to three scans. In the flowchart, parameters are equivalent to those described in FIG. 26. However, input multivalued data K3', an integral error value K3err, a value K3ttl obtained by adding the input multivalued data and the integral error value together, and binary output data K3" are additionally provided as parameters. Also, it is assumed that a threshold for comparison with K3ttl to determine K3" is K3table, and is a value determined from a maximum value between K1ttl and K2ttl with reference to the threshold table.

When the processing is started, in S31, K1ttl, K2ttl, and K3ttl are calculated. In S32, K1table, K2table, and K3table are acquired with reference to the threshold table. The threshold table for the reference in this embodiment has an additional column for K3table as compared with the threshold table shown in Table 1. K1table uses a larger one of K2ttl and K3ttl, i.e., MAX[K2ttl, K3ttl] as a reference value for selecting its threshold. Also, K2table uses MAX[K1ttl, K3ttl] and K3table uses MAX[K1ttl, K2ttl] as reference values for selecting their thresholds.

In S33 to S35, K1" is determined. In S36 to S38, K2" is determined. In S39 to S41, K3" is determined. In any case, if K1ttl, K2ttl, or K3ttl is equal to or larger than the corresponding threshold acquired in S32, K1"=1 (S35), K2"=1 (S38), or K3"=1 (S41) are established. In contrast, if K1ttl, K2ttl, or K3ttl is smaller than the corresponding threshold acquired in S32, K1"=0 (S34), K2"=0 (S37), or K3"=0 (S40) are established. Then, integral error values K1err, K2err, and K3err are calculated and updated in accordance with the output values. Further, in S42, the updated integral error values K1err, K2err, and K3err are diffused to surrounding pixels, which have not been processed by the quantization, according to predetermined error diffusion matrixes. Then, the processing is ended. Here, the error diffusion matrix shown in FIG. 13A is used for diffusing the integral error value K1err to the surrounding pixels, and the error diffusion matrix shown in FIG. 13B is used for diffusing the integral error value K2err to the surrounding pixels.

In the above example, a reference value for determining a threshold (for example, K1table) used for quantizing multivalued data corresponding to a target recording scan is a maximum value (MAX[K2ttl, K3ttl]) corresponding to other recording scans. However, the reference value in this embodiment is not limited thereto. For example, the sum of multivalued data (K2ttl+K3ttl) corresponding to other recording scans may serve as a reference value. With any method for determining a reference value, the method is effective as long as a threshold table for directly providing thresholds appropriate for quantizing multivalued data of individual recording scans on the basis of a reference value.

With the above-described method, 3-pass data can be generated such that a desirable dot overlap ratio is attained. Also, with the above-described method, even when multi-pass recording is performed, in which a recording head performs M (M is an integer equal to or larger than 2) scans for a single region (for example, a pixel region) on a recording medium, the M-pass data can be generated so that a desirable dot overlap ratio is attained. In this case, when data for M passes is quantized, thresholds are selected on the basis of M pieces of multivalued data.

Others

In the above case, the table with the reference values, from which the threshold for the binarization (quantization) can be selected, is prepared to obtain a desirable dot overlap ratio. However, the method for quantization is not limited thereto. Recording (1) or non-recording (0) does not have to be determined by the comparison with the threshold. For example, if two planes are used, a two-dimensional table may be prepared such that K1" and K2" use both K1ttl and K2ttl as reference values so that recording (1) or non-recording (0) is directly determined. Also, if three planes are used, a three-dimensional table may be prepared such that K1", K2", and K3" use K1ttl, K2ttl, and K3ttl as reference values so that recording or non-recording is directly determined.

Although the details of such tables are omitted, if such multi-dimensional tables are used, the control may be executed simply with a higher degree of freedom for the dot overlap ratio. In contrast, if the one-dimensional threshold table shown in Table 1 is used, the table can be created with a small memory capacity.

Further, the binarization (quantization) may be performed only by branching and arithmetical operation without the use of a table. In this case, the advantage of the embodiments can be attained as long as a certain coefficient used for the arithmetical operation is determined so as to provide a desirable dot overlap ratio. In this case, the memory capacity (consumption ROM size or RAM size) can be further decreased as compared with the case in which the table is prepared.

Third Embodiment

The second embodiment describes the quantization for controlling the dot overlap ratio among a plurality of recording scans with ink of a single color such as a black ink. In contrast, this embodiment describes quantization capable of controlling a dot overlap ratio among ink of different colors in addition to the dot overlap ratio among the recording scans.

Typically, cyan (C), magenta (M), yellow (Y), and black (K) used for an inkjet recording apparatus have brightnesses which significantly differ from each other, and have appearances of graininess and gradation unevenness which differ from each other. For example, the brightnesses of cyan and magenta are lower than the brightness of yellow, and are more easily visually recognizable. If the cyan and magenta overlap each other and consequently a blue dot is formed on a recording medium, the dot is further easily recognizable. Due to this, the cyan and magenta are desirably controlled so that the cyan and magenta less frequently overlap each other, to decrease the graininess.

In this embodiment, the dot overlap ratio between the two recording scans is controlled as described in the second embodiment. In addition, the dot overlap ratio among ink of different colors such as cyan (one color or first color) and magenta (another color or second color) is controlled. In this case, for example, dot overlap states of four planes have to be considered. In particular, the four planes includes a first-scan plane for cyan ink, a second-scan plane for the cyan ink, a first-scan plane for magenta ink, and a second-scan plane for the magenta ink.

Figure 24:
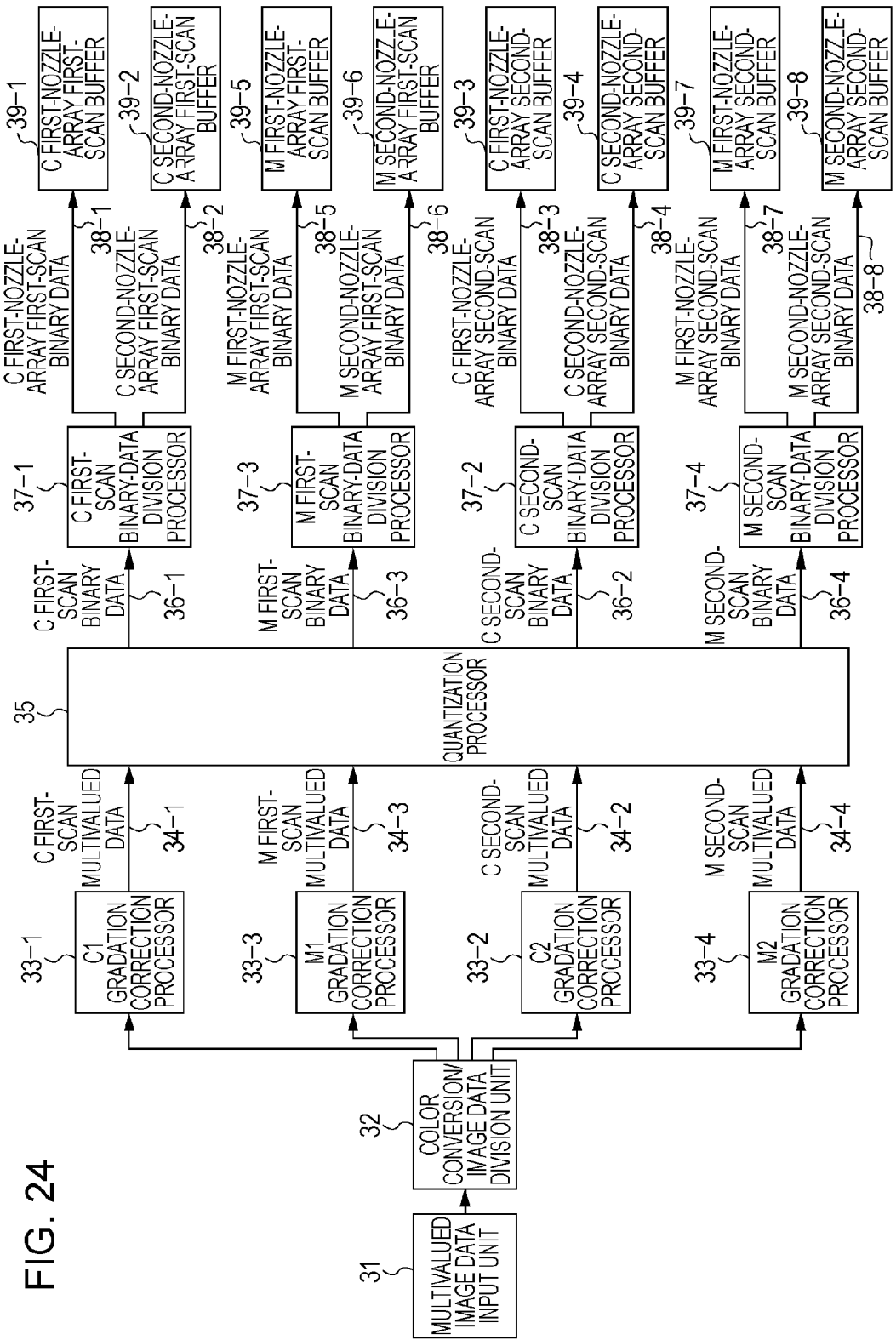
FIG. 24 is a block diagram explaining image processing for cyan and magenta when multi-pass recording is performed, the multi-pass recording which completes an image in a single region by two recording scans according to a third embodiment.

FIG. 24 is a block diagram explaining image processing for the cyan ink (first-color ink) and the magenta ink (second-color ink) when multi-pass recording is performed for completing an image in a single region of a recording medium by two recording scans according to this embodiment.

Processing by a multivalued image data input unit 31 to a color conversion/image data division unit 32 is similar to the processing by the multivalued image data input unit 21 to the color conversion/image data division unit 22 in FIG. 21, and the description thereof will be omitted. The color conversion/image data division unit 22 generates proceeding first-scan multivalued data (C1, M1, Y1, K1) and succeeding second-scan multivalued data (C2, M2, Y2, K2). In the following processing, only the cyan ink and magenta ink will be described.

The multivalued data generated by the color conversion/image data division unit 32 is input to gradation correction processors 34-1 to 34-4. The gradation correction processors 33-1 to 33-4 generate C first-scan multivalued data (C1') 34-1, C second-scan multivalued data (C2') 34-2, M first-scan multivalued data (M1') 34-3, and M second-scan multivalued data (M2') 34-4. The four types of multivalued data (C1', C2', M1', M2') are input to a quantization processor 35.

Figure 17:
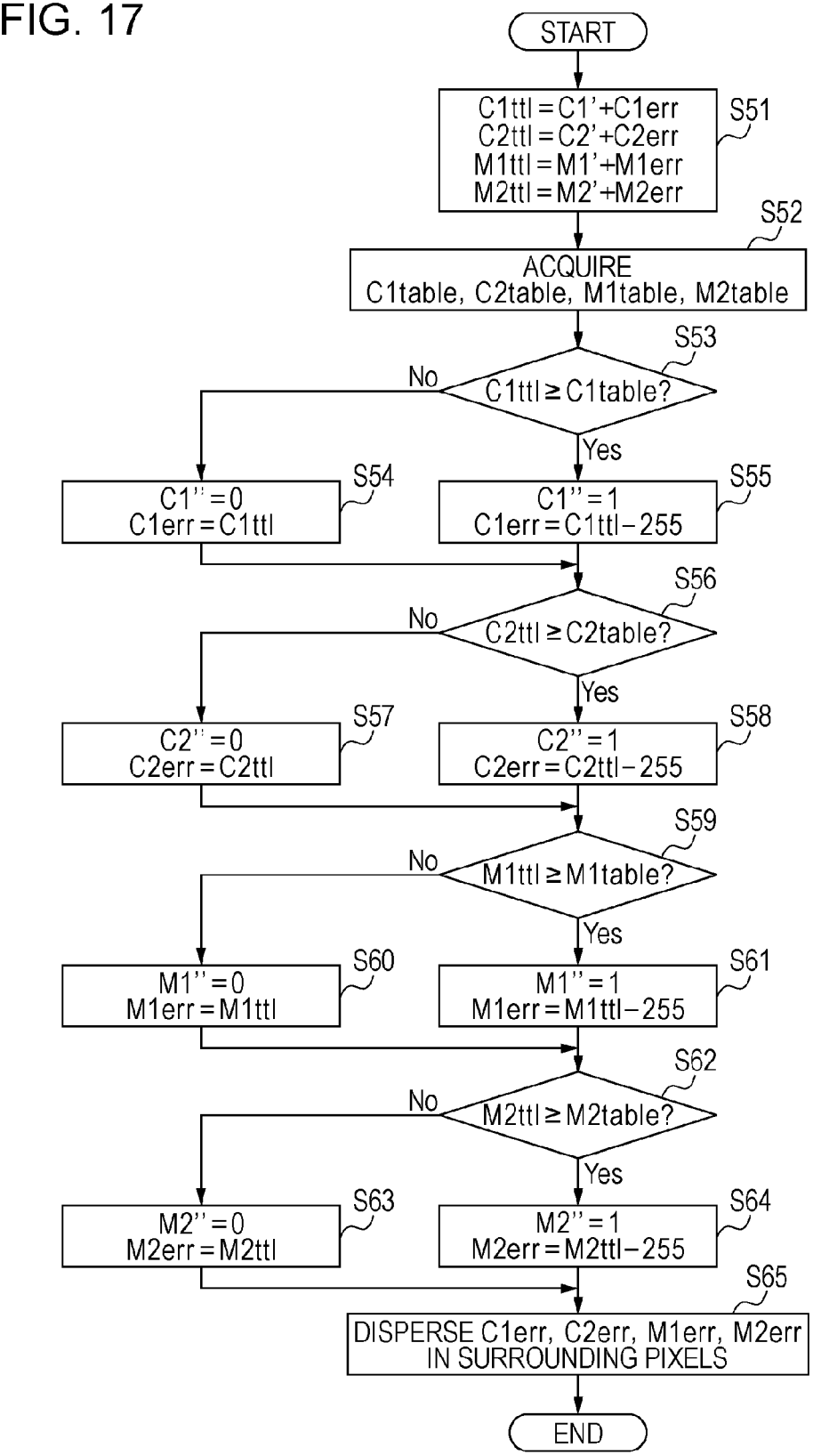
FIG. 17 is a flowchart explaining an example in which the control unit 3000 executes quantization for decreasing a dot overlap ratio.

FIG. 17 is a flowchart explaining an example of quantization that is executed by the control unit 3000 of this embodiment for decreasing a dot overlap ratio. C1' and C2' are multivalued data (C first-scan multivalued data and C second-scan multivalued data) for two scans of the cyan on a target pixel, and each have a value from 0 to 255. M1' and M2' are multivalued data (M first-scan multivalued data and M second-scan multivalued data) for two scans of the magenta on a target pixel, and each have a value from 0 to 255. Also, C1err, C2err, M1err, and M2err are integral error values generated from surrounding pixels, which have been processed with the quantization. C1ttl, C2ttl, M1ttl, and M2ttl are respectively the sums of the input multivalued data and the integral error values of the target pixels. Further, C1" and C2" are binary output data (C first quantized data and C second quantized data) for the scans. M1" and M2" are binary output data (M first quantized data and M second quantized data) for the scans. A threshold for comparison with C1ttl to determine C1" is C1table, and a threshold for comparison with C2ttl to determine C2" is C2table. A threshold for comparison with M1ttl to determine M1" is M1table, and a threshold for comparison with M2ttl to determine M2" is M2table.

When the processing is started, in S51, C1ttl, C2ttl, and M1ttl, and M2ttl are calculated. In S52, C1table, C2table, M1table, and M2table are acquired with reference to a threshold table. The table for the reference in this embodiment directly determines each of C1table, C2table, M1table, and M2table with reference to a single reference value, as compared with the threshold table in Table 1. C1table uses a maximum value from among C2ttl, M1ttl, and M2ttl, i.e., MAX[C2ttl, M1ttl, M2ttl] as a reference value for selecting its threshold. C2table uses MAX[C1ttl, M1ttl, M2ttl] as a reference value for selecting its threshold. M1table uses MAX[C1ttl, C2ttl, M2ttl] as a reference value for selecting its threshold. M2table uses MAX[C1ttl, C2ttl, M1ttl] as a reference value for selecting its threshold.

In S53 to S55, C1" is determined. In S56 to S58, C2" is determined. In S59 to S61, M1" is determined. In S62 to S64, M2" is determined. In any case, if C1ttl, C2ttl, M1ttl, or M2ttl is equal to or larger than the corresponding threshold acquired in S52, C1"=1 (S55), C2"=1 (S57), M1"=1 (S60), or M2"=1 (S63) is established. In contrast, if C1ttl, C2ttl, M1ttl, or M2ttl is smaller than the corresponding threshold acquired in S52, C1"=0 (S54), C2"=0 (S56), M1"=0 (S59), or M2"=0 (S62) is established. Then, integral error values C1err, C2err, M1err, or M2err is calculated and updated in accordance with the output corresponding value. Then, in S65, the updated integral error values C1err, C2err, M1err, and M2err are diffused to surrounding pixels, which have not been processed by the quantization, according to predetermined error diffusion matrixes (for example, the diffusion matrixes shown in FIGS. 13A and 13B). Then, the processing is ended. As described above, the quantization processor 35 quantizes the four types of multivalued data (C1', M1', C2', M2') 34-1 to 34-4 to generate the four types of binary image data (C1", M1", C2", M2") 36-1 to 36-4.

FIG. 24 is referenced again. When the binary image data C1", C2", M1", and M2" for obtaining a desirable dot overlap ratio are acquired by the quantization processor 35, the four types of data are sent to the printer engine 3000 shown in FIG. 3 through the IEEE-1284 bus 3022.

In the printer engine 3000, the first-scan binary image data C1" (36-1) and the second-scan binary image data C2" (36-2) each are divided into data recorded by the two nozzle arrays 61 and 68. In particular, a first-scan binary-data division processor 37-1 divides C1" (36-1) into first-nozzle-array first-scan binary data 38-1 and second-nozzle-array first-scan binary data 38-2. Also, a second-scan binary-data division processor 37-2 divides C2" (36-2) into first-nozzle-array second-scan binary data 38-3 and second-nozzle-array second-scan binary data 38-4. A first-scan binary-data division processor 37-3 divides M1" (36-3) into first-nozzle-array first-scan binary data 38-5 and second-nozzle-array first-scan binary data 38-6. Also, a second-scan binary-data division processor 37-4 divides M2" (36-4) into first-nozzle-array second-scan binary data 38-7 and second-nozzle-array second-scan binary data 38-8. The division by the binary-data division processors 37-1 to 37-4 is executed by using masks previously stored in the memory like the first embodiment.

The image data 38-1 to 38-8 thus generated is stored in buffers (39-1 to 39-8) prepared for the corresponding scans of the corresponding nozzle arrays. When the binary image data is stored in the individual buffers by required amounts, recording operation is executed in accordance with the data stored in the corresponding buffers.

With the above-described embodiment, the table for the quantization to obtain desirable dot overlap ratios for cyan dots and magenta dots is prepared, and the quantization is executed for the first-scan and second-scan multivalued image data for the cyan and magenta by using the table. Accordingly, a high-quality mixed-color image with good robustness and decreased graininess can be output. In addition, since the mask is used for the generation of data of two nozzle arrays corresponding to ink of a single color, a decrease in data processing load can be expected.

The combination of the cyan ink and the magenta ink is described above as an exemplary combination of ink of different colors subjected to the control for the dot overlap ratio; however, a combination of ink of different colors applicable to this embodiment is not limited thereto. For example, a combination of yellow ink and cyan ink, or a combination of yellow ink and magenta ink may be applied.

Fourth Embodiment

In the third embodiment, the thresholds for acquiring the first-scan binary data and the second-scan binary data for the cyan nozzle arrays, and the first-scan binary data and the second-scan binary data for the magenta nozzle arrays are obtained from the common table. However, appearance of an image defect due to a deviation between recording positions by a plurality of recording scans with ink of a single color may differ from appearance of an image defect due to a deviation between recording positions with ink of different colors.

For example, when the recording head 5004, in which the nozzle arrays of the respective colors are collectively arranged as shown in FIG. 20, is used, it is typically expected that a deviation between recording positions by the recording scans is more noticeable than a deviation between recording positions with the ink of different colors. In this case, the dot overlap ratio for the recording scans is desirably larger than the dot overlap ratio for the ink of different colors. In contrast, for example, if the guide rails 5009 and 5010 shown in FIG. 5 are curved, and an inclination of the carriage 5008 is changed during scanning, a deviation between recording positions with the ink of different colors may be more noticeable than a deviation between recording positions by the recording scans. In this case, the dot overlap ratio for the ink of different colors is desirably larger than the dot overlap ratio for the recording scans.

To deal with such situation, this embodiment prepares a table (first threshold table) for quantization laying emphasis on the dot overlap ratio for the ink of different colors (cyan and magenta), and a table (second threshold table) for quantization laying emphasis on the dot overlap ratio for the recording scans. The threshold tables individually have contents that are determined in order to obtain proper overlap ratios depending on the characteristics of the recording apparatus and the recording head.

Figure 15:
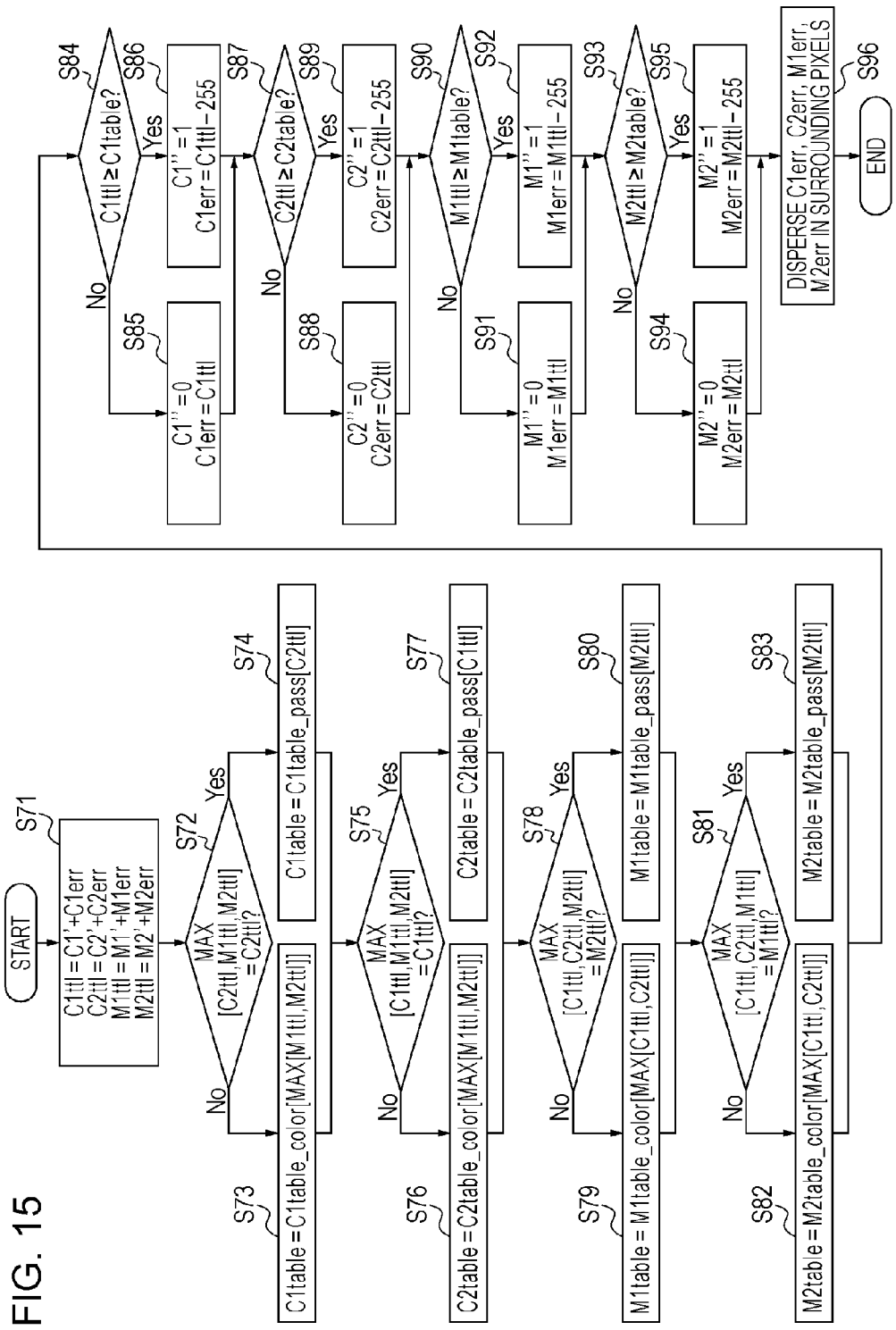
FIG. 15 is a flowchart explaining steps when a control unit 3000 executes quantization.

FIG. 15 is a flowchart explaining steps when the control unit 3000 of this embodiment executes quantization. In the flowchart, parameters are equivalent to those described in FIG. 17. First tables for controlling the dot overlap ratio for first-scan multivalued data C1 and second-scan multivalued data C2 of the cyan with respect to the magenta are C1table_col and C2table_col. Second tables for controlling the dot overlap ratio between the recording scans are C1table_pass and C2table_pass. Tables for controlling the dot overlap ratio for first-scan multivalued data M1 and second-scan multivalued data M2 of the magenta with respect to the cyan are M1table_col and M2table_col. Tables for controlling the dot overlap ratio between the recording scans are M1table_pass and M2table_pass.

When this processing is started, in S71, C1ttl, C2ttl, M1ttl, and M2ttl are calculated. Then, in S72 to S82, tables that are referenced for determining thresholds for quantization are set respectively for C1, C2, M1, and M2.

For example, regarding C1, in S72, it is determined whether a maximum value among C2ttl, M1ttl, and M2ttl is C2ttl. If C2ttl is the maximum value, a deviation between recording positions by the recording scans has priority over a deviation between recording positions with the ink of different colors. The processing goes to S74, C1table_pass is referenced while C2ttl is used as a reference value, and a threshold C1table is acquired. In contrast, if C2ttl is not the maximum value, the deviation between the recording positions with the ink of different colors has priority over the deviation between the recording positions by the recording scans. The processing goes to S73, C1table_col is referenced while a larger one of M1ttl and M2ttl is used as a reference value, and a threshold C1table is acquired. The above-described steps are performed for each of C2, M1, and M2, so that four thresholds C1table, C1table, M1table, and M2table are acquired.

The subsequent processing is similar to those in S53 to S65 described with reference to FIG. 17. In particular, the acquired thresholds are compared with multivalued data to which integral errors are added, recording (1) or non-recording (0) is determined, the integral errors are corrected, and the integral errors are dispersed to surrounding pixels.

With the above-described embodiment, even if there are the plurality of combinations of data for colors and scans, such as C1, C2, M1, and M2, the dot overlap ratio of the combination, which may result in a worse image defect due to the deviation between recording positions, can be quantized with priority.

In the flowchart described with reference to FIG. 15, the table to be referenced (C1table_pass, C1table_col) is determined in accordance with the magnitude (whether values being large or small) of the multivalued data (C2, M1, M2), for example, in S72. However, giving priority to the dot overlap ratio between the ink with different colors or the dot overlap ratio between the recording scans is changed depending on various factors in addition to the magnitude of the multivalued data. If a plurality of threshold tables are prepared like this embodiment, the threshold tables to be referenced are desirably determined by using various criteria for the determination.

Fifth Embodiment

Each of the first to fourth embodiments describes a case in which the processing from inputting of image data to recording is performed with a resolution equivalent to a recording resolution. However, in a situation in which a recording resolution is increased today, if all processing is performed with a resolution equivalent to a recording resolution, a memory size and time required for the processing may become very large and a load of the apparatus may be increased. Owing to this, a configuration is used, in which major image processing is performed with a lower (rougher) resolution than a recording resolution, multivalued image data with 256 gradation scales is converted into multivalued data of L-valued (L is an integer equal to or smaller than 3) data with a lower number of gradation scales than the 256 scales, and then the converted data is sent to the printer engine of the recording apparatus. In this case, the printer engine stores a dot pattern (index pattern) that converts the received L-valued data with a low gradation level into binary data corresponding to the recording resolution. In the following description, ternarization is explained as an example of the L-valuing. However, it is not limited thereto. The value L may be any value such as 4, 5, 9, or 16.

Figure 23:
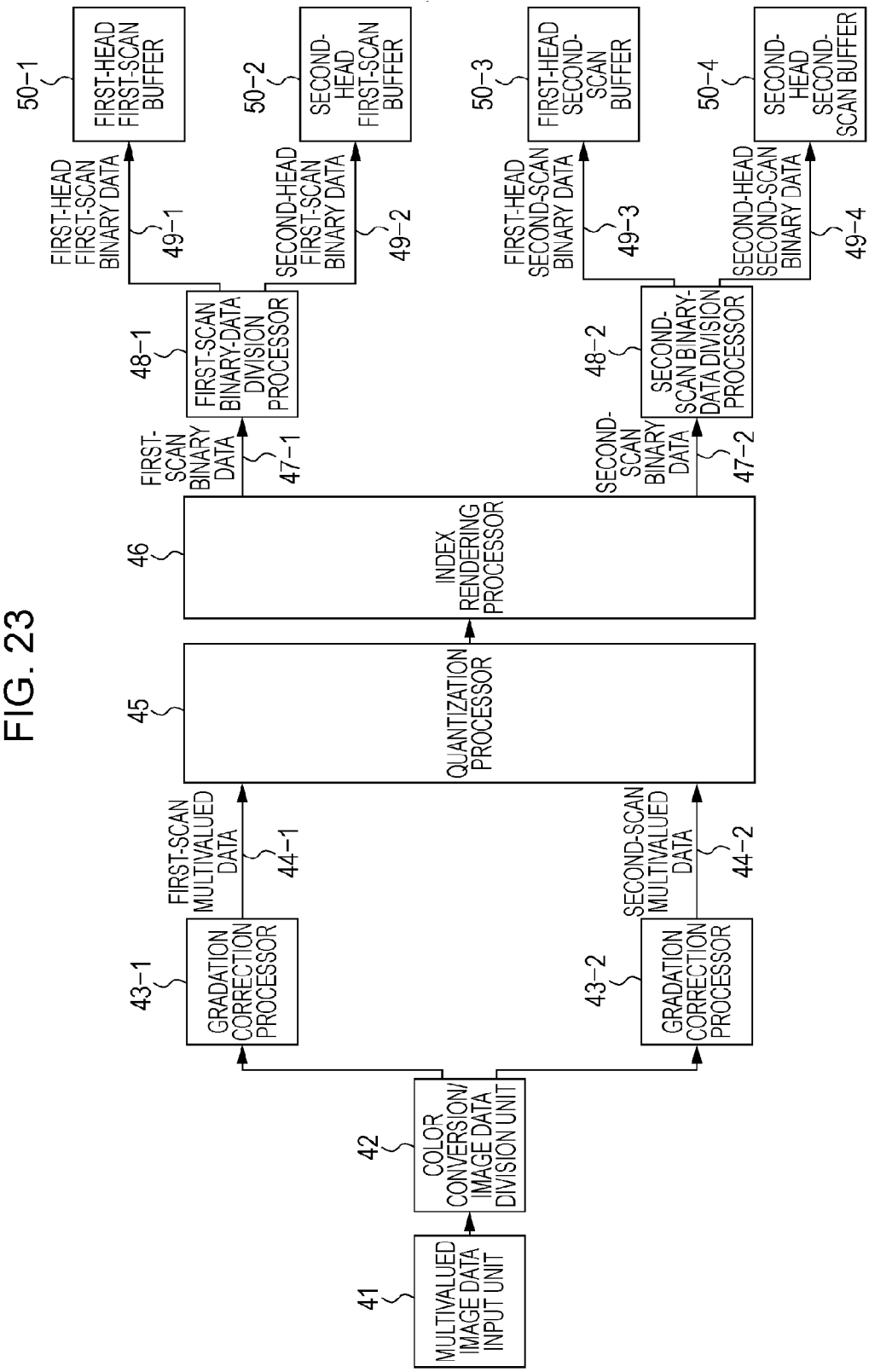
FIG. 23 is a block diagram explaining image processing when multi-pass recording is performed, the multi-pass recording which completes an image in a single region by two recording scans according to a fifth embodiment.

FIG. 23 is a block diagram explaining image processing in this embodiment when multi-pass recording is performed. The multi-pass recording completes an image in a single region (for example, pixel region) by two recording scans. Processing by a multivalued image data input unit 41 to a gradation correction processor 43 is similar to the processing by the multivalued image data input unit 21 to the gradation correction processor 23 in FIG. 21, and the description thereof will be omitted. The following description is given only for black (K).

A quantization processor 45 receives first-scan multivalued data (K1') 44-1 and second-scan multivalued data (K2') 44-2. The quantization processor 45 quantizes each of the first-scan multivalued data (K1') and the second-scan multivalued data (K2') by ternarization into data with values from 0 to 2 by an error diffusion method to generate first-scan quantized data (K1") and second-scan quantized data (K2"). More specifically, the quantization processor 45 acquires K1ttl and K2ttl obtained by integrating errors in surrounding pixels to K1' and K2', like the quantization performed by the quantization processor 25 according to the first embodiment. Then, a threshold used for the quantization of the first-scan multivalued data (K1') is determined on the basis of K2ttl, and a threshold used for the quantization of the second-scan multivalued data (K2') is determined on the basis of K1ttl.

In this embodiment, since the quantization is performed by the ternarization, two threshold, i.e., a first threshold and a second threshold that is larger than the first threshold are used. Output values are determined in accordance with the magnitude (whether values being small or large) between sums of input multivalued data to a target pixel and integral error values (sums: K1ttl and K2ttl) and the first and second thresholds. In particular, if the sum is equal to or larger than the second threshold, the output value is "2," if the sum is equal to or larger than the first threshold and is smaller than the second threshold, the output value is "1," and if the sum is smaller than the first threshold, the output value is "0."

As described above, the first-scan multivalued data (K1') is quantized on the basis of the threshold determined with K2ttl, and the first-scan quantized data (K1") is obtained. Similarly, the second-scan multivalued data (K2') is quantized on the basis of the threshold determined with K1ttl, and the second-scan quantized data (K2") is obtained. Each of the first and second thresholds may be determined with reference to first and second threshold tables while a single reference value is used like the example of binarization.

Figure 18:
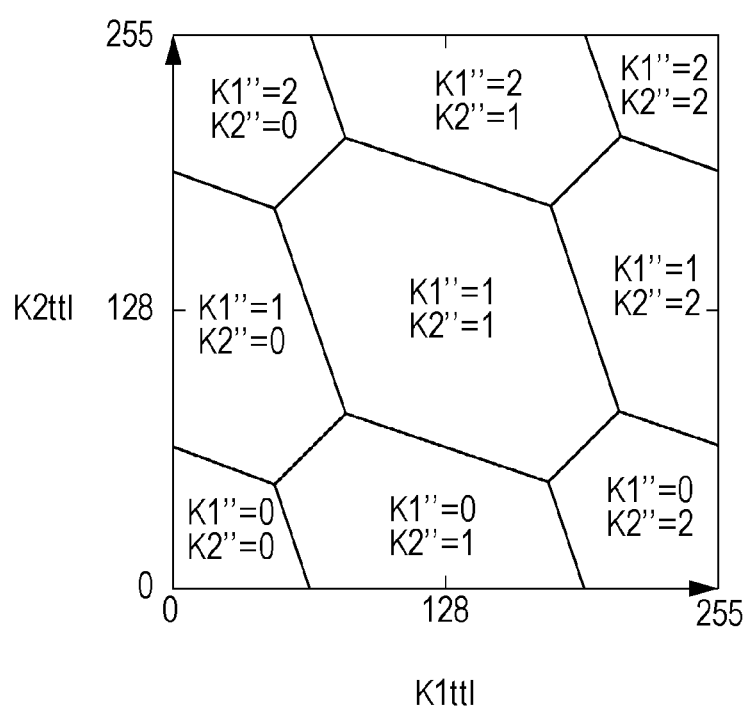
FIG. 18 illustrates a correspondence between results (K1", K2") of quantization by ternarization by a quantization processor 38006 and input values (K1ttl, K2ttl).

FIG. 18 illustrates a correspondence between results (K1" and K2") of the L-valuing (ternarization) by the quantization processor 45 and input values (K1ttl and K2ttl) like FIGS. 22A to 22G. In FIG. 18, the values of K1" and K2" represent numbers of dots recorded on a target pixel by first and second recording scans. Herein, the first threshold used for quantizing K2ttl is indicated by a thick dotted line, and the second threshold is indicated by a thick broken line.

For example, on a target pixel with K1" and K2" both being 2, two dots are recorded by each of the first and second recording scans. On a target pixel with K1" being 1 and K2" being 2, a dot is recorded by the first recording scan, and two dots are recorded by the second recording scan. On a target dot with K1" and K2" both being 0, no dot is recorded.

Referring back to FIG. 23, ternary image data K1" and K2" quantized by the quantization processor 45 is transmitted to the printer engine 3008, and an index rendering processor 46 performs index rendering. The index rendering binarizes the L-valued (L is an integer equal to or larger than 3) quantized data. Thus, this processing may be considered as part of the quantization. Thus, the index rendering processor 46 serves as part of quantizing means or the second generating means. The index rendering will be described below in detail.

The index rendering processor 46 converts the ternary image data K1" into first-scan binary image data (first-scan binary quantized data) 47-1. Similarly, the index rendering processor 46 converts the ternary image data K2" into first-scan binary image data (second-scan binary quantized data) 47-2. Then, a first-scan binary-data division processor 48-1 divides the first-scan binary image data 47-1 into first-nozzle-array first-scan binary data 49-1 and second-nozzle-array first-scan binary data 49-2. Similarly, a first-scan binary-data division processor 48-2 divides the second-scan binary image data 47-2 into first-nozzle-array first-scan binary data 49-3 and second-nozzle-array second-scan binary data 49-4. The division is executed by using mask patterns like the first embodiment. The four types of binary data (49-1 to 49-4) are respectively stored in corresponding buffers (50-1 to 50-4). When the binary data is stored in the individual buffers by required amounts, recording operation is executed in accordance with the data stored in the corresponding buffers.

Figure 19:
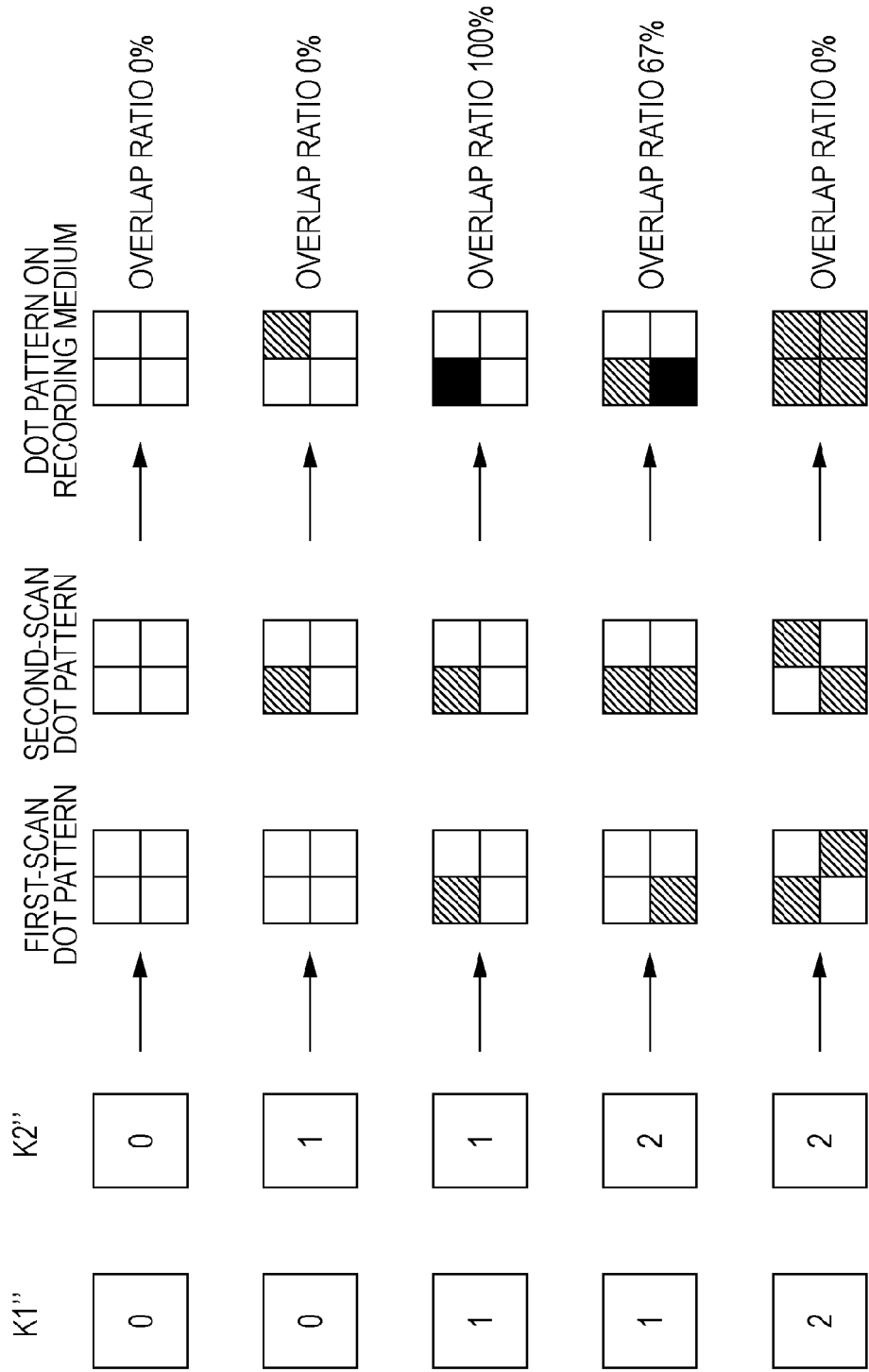
FIG. 19 is an explanatory view showing dot overlap ratios when index rendering is performed.

FIG. 19 is an illustration explaining an example of index rendering and an index pattern (dot pattern) according to this embodiment. The index rendering processor 38011 according to this embodiment converts ternary image data (K1", K2") for a single pixel into binary image data (dot pattern) for 2×2 sub-pixels. More specifically, ternary image data K1" having any value of 0 to 2 is converted into a dot pattern for the first scan. Similarly, ternary image data K2" having any value of 0 to 2 is converted into a dot pattern for the second scan. A pattern ("dot pattern on recording medium" indicated at the rightmost position in the drawing), which is obtained by superposing the dot pattern for the first scan on the dot pattern for the second scan, is recorded on a pixel. Regarding the dot patterns for the first and second scans, an oblique-line area represents data for recording a dot on a sub-pixel (data of "1"), and a white area represents data for not recording a dot on a sub-pixel (data of "0"). Also, regarding the dot patterns on a recording medium, a black area represents that two dots are recorded on a sub-pixel, an oblique-line area represents that a dot is recorded on a sub-pixel, and a white area represents that no dot is recorded on a sub-pixel.

Now, a dot overlap ratio when image processing is employed for converting ternary image data or image data in the form of more than three values corresponding to an image into a binary dot pattern for m×n sub-pixels will be described with reference to FIG. 19. The "dot overlap ratio" in this case indicates a ratio of the number of dots redundantly recorded on a single sub-pixel in a single pixel region including a plurality of sub-pixels by different scans (or by different recording element groups) to the total number of dots to be recorded in the pixel region. To be more specific, referring to FIG. 19, if both K1" and K2" are 0, no dot is recorded by the first or second recording scan. Hence, the dot overlap ratio is 0%. If one of K1" and K2" is 0, a dot is recorded by one of the first and second scans. Hence, the dot overlap ratio is still 0%. If both K1" and K2" are 1, two dots are redundantly recorded on an upper left sub-pixel of 2×2 sub-pixels. Hence, the dot overlap ratio is 100% (=2÷2×100). If one of K1" and K2" is 1 and the other is 2, two dots are redundantly recorded on a lower left sub-pixel of 2×2 sub-pixels, and a dot is recorded on an upper left sub-pixel. Hence, the dot overlap ratio is 67% (=2÷3×100). If both K1" and K2" are 2, dots do not overlap each other on sub-pixels. Hence, the dot overlap ratio is 0%. That is, as long as the index patterns (dot patterns) corresponding to respective levels are prepared, when the combination of K1" and K2" is determined by the quantization shown in FIG. 18, the dot overlap ratio in a pixel region is directly determined.

With the above-described embodiment, the quantization method shown in FIG. 18 and the dot patterns shown in FIG. 19 are used. Thus, an image with a desirable dot overlap ratio can be output while the index rendering is used. Accordingly, a high-quality image with good robustness and decreased graininess can be output at a high speed and with a high resolution.

Sixth Embodiment

Density unevenness that is generated when recording positions on a plurality of planes are deviated from each other, which is to be addressed by the present invention, can be decreased by a certain degree through improvement of a mask. This embodiment utilizes an effect of a mask and also adjusts a dot overlap ratio between planes. Thus, this embodiment can output an image with better robustness.

An image processing method according to this embodiment is similar to the image processing method described in the second embodiment except for a mask to be used. Thus, in this embodiment, the quantization processor 25 performs processing relating to the dot overlap ratio like the second embodiment. These two embodiments are similar to each other since the mask is used for division. However, the mask used in this embodiment is a horizontally long mask. This is the difference from the second embodiment.

The mask is described below. The mask is a set of binary data in which recording (1) or non-recording (0) is predetermined for individual pixels (or sub-pixels). When the division is actually executed, logical multiplication is performed between binary data (K1" or K2") having a value of 1 or 0 and binary data of the mask for the individual pixels (or sub-pixels). The result is an output value for the first nozzle array or the second nozzle array.

If a horizontally long mask is used such that data for permitting (1) recording (recording permissive mask pixels) is continuously arranged in the main-scanning direction, the density unevenness hardly occurs even if the recording positions are deviated from each other in the main-scanning direction such as when scanning by the carriage is unstable. Also, if a vertically long mask is used such that data for permitting (1) recording (recording permissive mask pixels) is continuously arranged in the sub-scanning direction, the density unevenness hardly occurs even if the recording positions are deviated from each other in the sub-scanning direction such as when conveyance of a recording medium is unstable. However, if the vertically or horizontally long mask is used, the density unevenness may be noticeable in the case of a deviation between recording positions in a direction perpendicular to the longitudinal direction of the mask, in particular, in the sub-scanning direction for the vertically long mask and in the main-scanning direction for the horizontally long mask.

Also, as described in the above embodiments, since the method for decreasing the density unevenness by increasing the dot overlap ratio is used, if the dot overlap ratio is too high, the graininess may be noticeable. In this embodiment, both the method of decreasing the density unevenness with the mask and the method for decreasing the density unevenness through the control for the dot overlap ratio are used to compensate each other such that disadvantages of these methods do not appear. Thus, a high-quality image with negligible density unevenness is output. The method will be specifically described below.

In the recording apparatus, deviation may be generated between recording positions among planes. In particular, the direction and level of the deviation during recording can be predicted by a certain degree. For example, it is assumed that a deviation in the main-scanning direction due to a factor 1 is Xerr1, a deviation in the sub-scanning direction due to the factor 1 is Yerr1, a deviation in the main-scanning direction due to a factor 2 is Xerr2, and a deviation in the sub-scanning direction due to the factor 2 is Yerr2. Also, it is assumed that Xerr1≈0, Yerr2≈0, and Xerr2>Yerr1. In this case, the sum of the deviations due to the factors 1 and 2 is $\sqrt{((Yerr1)^2 + (Xerr2)^2)}$. The value is larger than Yerr1 and Xerr2.

In this embodiment, the method for adjusting the dot overlap ratio and the method with the horizontally (or vertically) long mask are respectively used for the two factors with different deviation amounts and different deviation directions. More specifically, the factor 1 is handled by adjusting the dot overlap ratio, and the factor 2 is handled by using the horizontally long mask. Accordingly, the deviation amount between the recording positions to be decreased by the control for the dot overlap ratio can be limited to Yerr1. Consequently, the density unevenness can be decreased while the dot overlap ratio is not excessively increased and hence the graininess is not increased.

As described above, with this embodiment, even if a deviation between recording positions due to a plurality of factors occurs, the dot overlap ratio is adjusted while the method for decreasing the density unevenness with the mask is used. Accordingly, a high-quality image with good robustness can be output while a processing speed is not decreased. The horizontally long mask used in the sixth embodiment may be applied to any of the first to fifth embodiments, and a seventh embodiment which is described below.

Seventh Embodiment

In the first to sixth embodiments, the quantized data corresponding to the plurality of relative scans is generated, and then the quantized data corresponding to the plurality of relative scans to be recorded by the plurality of recording element groups is generated from the quantized data corresponding to the plurality of recording scans. However, the present invention is not limited thereto. The plurality of relative scans can be replaced with the plurality of recording element groups. In particular, as described above, if the inclination of the carriage 5008 is changed during scanning, a deviation between recording positions by the nozzle arrays may be larger than a deviation between recording positions by the recording scans. In this case, the control for the dot overlap ratio is applied only between the nozzle arrays, and the mask division may be applied between the scans. Thus, in this embodiment, as shown in FIG. 14, multivalued image data corresponding to a plurality of recording element groups is generated from input image data, the multivalued image data is quantized, and then quantized data corresponding to the plurality of recording element groups for a plurality of passes is generated.

FIG. 14 is a block diagram explaining image processing according to this embodiment. This embodiment uses a recording head having two recording element groups (nozzle arrays) for ejecting ink of a single type as shown in FIG. 20. The two recording element groups for ejecting the ink of the single type (first recording element group, second recording element group) perform recording in a single region during two relative movements. A multivalued image data input unit 51 and a gradation correction processor 53 shown in FIG. 14 have the same functions as the multivalued image data input unit 21 and the gradation correction processor 23 shown in FIG. 21. Also, a color conversion/image data division unit 52 and a quantization processor 56 have similar functions to the color conversion/image data division unit 22 and the quantization processor 25 shown in FIG. 21; however, data to be handled is different. In particular, FIG. 21 handles data corresponding to scans, whereas FIG. 14 handles data corresponding to recording element groups.

The multivalued image data input unit 51 receives multivalued image data of RGB (256-value). The color conversion/image data division unit 52 converts the input image data (RGB data) into two pieces of multivalued image data (CMYK data) corresponding to two recording element groups on a pixel basis. The gradation correction processors 53-1 and 53-2 perform gradation correction (density correction) for the two pieces of multivalued image data. Thus, first-recording-element-group multivalued image data 55-1 and second-recording-element-group multivalued image data 55-2 are generated.

Then, the quantization processor 56 quantizes the first-recording-element-group multivalued image data 55-1 and the second-recording-element-group multivalued image data 55-2, which have been processed by the gradation correction. The quantization executed by the quantization processor 56 is similar to the processing described with reference to FIGS. 25, 26, and 16 according to the second embodiment. As the result of the quantization, first-recording-element-group binary image data 57-1 (first quantized data) and second-recording-element-group binary image data 57-2 (second quantized data) are generated.

Then, a first division processor 58-1 divides the first-recording-element-group binary image data 57-1 into first-recording-element-group first-scan binary data 59-1 and first-recording-element-group second-scan binary data 59-2. The binary data 59-1 and the binary data 59-2 are respectively stored in corresponding buffers (60-1 and 60-2). Similarly, a second division processor 58-2 divides the second-recording-element-group binary image data 57-2 into second-recording-element-group first-scan binary data 59-3 and second-recording-element-group second-scan binary data 59-4. The binary data 59-3 and the binary data 59-4 are respectively stored in corresponding buffers (60-3 and 60-4). The division uses a mask pattern like the above-described embodiments.

Then, recording is performed in accordance with binary data 59-1 and 59-3 during the first relative movement, and recording is performed in accordance with the binary data 59-2 and 59-4 during the second relative movement. Accordingly, the two recording element groups for ejecting the ink of the single type (first recording element group, second recording element group) perform recording in the single region during the two relative movements.

Other Embodiments

The above-described embodiments each use the recording head having the two nozzle arrays (recording element groups) for ink of a single color. However, the number of nozzle arrays (recording element groups) for ejecting ink of the single color is not limited to two. The number of nozzle arrays (recording element groups) for ejecting ink of the single color may be N (N is an integer equal to or larger than 2), such as 4 or 8. When M-pass recording is performed with N nozzle arrays, the following two modes may be conceived. In a first mode, M sets of single-color multivalued image data corresponding to M passes are generated from input image data on a pixel basis, the M sets of single-color multivalued image data are quantized on a pixel basis, and M sets of single-color quantized data corresponding to the M passes are generated. Then, each of the M sets of single-color quantized data is divided into N pieces of data by using N masks being complements of each other. Accordingly, binary data for the M passes respectively corresponding to the N nozzle arrays is generated. In a second mode, N sets of single-color multivalued image data corresponding to N nozzle arrays are generated from input image data on a pixel basis, the N sets of single-color multivalued image data are quantized on a pixel basis, and N sets of single-color quantized data corresponding to the N nozzle arrays are generated. Then, each of the N sets of single-color quantized data is divided into M pieces of data by using M masks being complements of each other. Accordingly, binary data for the M passes respectively corresponding to the N nozzle arrays is generated.

In the second to sixth embodiments, when the multivalued image data corresponding to a certain relative movement is quantized, all multivalued image data corresponding to all relative movements are considered. However, the present invention is not limited thereto. For example, if first multivalued image data corresponding to a first relative movement, second multivalued image data corresponding to a second relative movement, and third multivalued image data corresponding to a third relative movement are quantized in a 3-pass mode, although the first and second multivalued image data is quantized while taking into account each other, the third multivalued image data may be quantized regardless of the other multivalued image data in an uncorrelated fashion. Even in this case, a dot overlap ratio between a dot recorded by the first relative movement and a dot recorded by the second relative movement can be controlled. Thus, the robustness can be increased, and the graininess can be decreased.

Also, the above-described embodiments each use the recording apparatus shown in an electric block diagram of FIGS. 3 and 4. However, the present invention is not limited thereto. For example, the printer control unit and the printer engine are described as independent modules. However, the control unit and the printer engine may share common ASIC, CPU, ROM, and RAM. Also, the control unit is connected with the printer engine through the USB and the IEEE-1284, which are general-purpose I/Fs. However, the present invention may use any connection method. Also, the connection from the PC is directly connected with the printer engine through the USB and HUB. However, the control unit may relay image data. Further, the control unit may perform image processing for image data from the PC and then transmit the data to the printer engine.

In the above-described embodiments, the control unit 3000 executes the image processing up to the quantization, and the printer engine 3004 executes the subsequent processing. However, the present invention is not limited thereto. As long as the above-described processing can be executed, the processing can be executed by any processing means, such as hardware or software. Such processing means is included in the scope of the present invention.

In the above-described embodiments, the image processing apparatus for executing the image processing that is a feature of the present invention through the example of the recording apparatus (image forming apparatus) including the control unit 3000 having the image processing function. However, the present invention is not limited thereto. The image processing that is a feature of the present invention may be executed by a host device (for example, PC 3010 in FIG. 3) with a printer driver installed therein, and image data after quantization or division may be input to a recording apparatus. In this case, the host device (external device) connected with the recording apparatus corresponds to the image processing apparatus of the present invention.

The present invention may be actualized by program codes that form a computer-readable program for actualizing the aforementioned image processing function, or a storage medium storing the program codes. In this case, the host device or a computer (or CPU or MPU) in the image forming apparatus may read and execute the program codes to actualize the image processing. As described above, the computer-readable program for causing the computer to execute the aforementioned image processing, or the storage medium storing the program are included in the present invention.

The storage medium that supplies the program codes may be, for example, the Floppy (registered trademark) disk, hard disk, an optical disc, an magneto-optical disk, a CD-ROM, a CD-R, a magnetic tape, a nonvolatile memory card, or a ROM.

The function according to any of the embodiments do not have to be actualized by executing the program codes read by the computer. Alternatively, the actual processing may be executed entirely or partly by OS operating on the computer under an instruction of the program codes. Still alternatively, the program codes may be written in a memory included in a feature expansion board inserted into the computer, or a memory in a function expansion unit connected with the computer, and then the actual processing may be entirely or partly executed by a CPU under an instruction of the program codes.

The present invention is not limited any of the aforementioned embodiments, and may be changed and modified in various forms within the spirit and scope of the present invention. Therefore, the following claims are attached to clarify the scope of the present invention.

With the present invention, the density variation due to the deviation between the recording positions of the dots can be suppressed while the load of data processing is decreased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

| Reference Signs List | |
|---|---|
| 21 | multivalued image data input unit |
| 22 | color conversion/image data division unit |
| 24-1 | first-scan multivalued data |
| 24-2 | second-scan multivalued data |
| 25 | quantization processor |
| 26-1 | first-scan binary data |
| 26-2 | second-scan binary data |
| 27-1 | first-scan binary data division processor |
| 27-2 | second-scan binary data division processor |
| 28-1 | first-nozzle-array first-scan binary data |
| 28-2 | second-nozzle-array first-scan binary data |
| 28-3 | first-nozzle-array second-scan binary data |
| 28-4 | second-nozzle-array second-scan binary data |

The invention claimed is:

1. An image processing apparatus that processes input image data corresponding to an image to be recorded in a predetermined region of a recording medium, to record the image in the predetermined region of the recording medium by a plurality of relative movements between the recording medium and recording means that includes a plurality of recording element groups for ejecting ink of a single color, the apparatus comprising:
    first generating means for generating a plurality of pieces of multivalued image data for a same pixel of the single color respectively corresponding to the plurality of relative movements from the input image data on a pixel basis;
    second generating means for quantizing each of the pieces of the multivalued image data for the same pixel of the single color generated by the first generating means on a pixel basis to generate quantized data corresponding to the plurality of relative movements; and
    dividing means for dividing each of pieces of the quantized data generated by the second generating means and corresponding to the plurality of relative movements into quantized data corresponding to the plurality of recording element groups and being complements of each other.

2. The image processing apparatus according to claim 1, wherein the multivalued image data for the single color corresponding to the plurality of relative movements includes at least first multivalued image data corresponding to a first relative movement and second multivalued image data corresponding to a second relative movement, and
    wherein the second generating means quantizes the first multivalued image data on the basis of the second multivalued image data, and quantizes the second multivalued image data on the basis of the first multivalued image data.

3. The image processing apparatus according to claim 2, wherein the quantization includes error diffusion, and
    wherein the second generating means determines a threshold that is used for performing the error diffusion for the first multivalued image data on the basis of the second multivalued image data and performs the error diffusion for the first multivalued image data on the basis of the determined threshold, and the second generating means determines a threshold that is used for performing the error diffusion for the second multivalued image data on the basis of the first multivalued image data and performs the error diffusion for the second multivalued image data on the basis of the determined threshold.

4. The image processing apparatus according to claim 1, wherein the second generating means includes L-valuing means for converting the multivalued image data for the single color into L values (L is an integer equal to or larger than 3) by an error diffusion method to generate L-valued quantized data, and binarizing means for binarizing the L-valued quantized data generated by the L-valuing means by using a dot pattern to generate binary quantized data.

5. The image processing apparatus according to claim 1, wherein the input image data is RGB data.

6. An image processing apparatus that processes input image data corresponding to a pixel region of a recording medium, to perform recording in the pixel region of the recording medium by a plurality of relative movements between the recording medium and recording means that includes a plurality of recording element groups for ejecting ink of a single color, the apparatus comprising:
    first generating means for generating multivalued image data for the single color corresponding to the plurality of relative movements from the input image data;
    second generating means for quantizing the multivalued image data for the single color generated by the first generating means to generate quantized data corresponding to the plurality of relative movements; and
    third generating means for performing logical multiplication between the quantized data generated by the second generating means and corresponding to the plurality of relative movements and a plurality of mask patterns being complements of each other to generate quantized data corresponding to the plurality of relative movements for the plurality of recording element groups.

7. The image processing apparatus according to claim 6, wherein the input image data is RGB data.

8. An image processing apparatus that processes input image data corresponding to a pixel region of a recording medium, to perform recording in the pixel region by at least first and second relative movements between the recording medium and recording means that includes a plurality of recording element groups for ejecting ink of a first color and a plurality of recording element groups for ejecting ink of a second color, the apparatus comprising:
    first generating means for generating four types of multivalued data including first-color first multivalued data corresponding to the first relative movement, first-color second multivalued data corresponding to the second relative movement, second-color first multivalued data corresponding to the first relative movement, and second-color second multivalued data corresponding to the second relative movement, on the basis of the input image data;
    second generating means for quantizing the first-color first multivalued data on the basis of the four types of multivalued data to generate first-color first quantized data, quantizing the first-color second multivalued data on the basis of the four types of multivalued data to generate first-color second quantized data, quantizing the second-color first multivalued data on the basis of the four types of multivalued data to generate second-color first quantized data, and quantizing the second-color second multivalued data on the basis of the four types of multivalued data to generate second-color second quantized data; and third generating means for generating quantized data for the first relative movement corresponding to the plurality of recording element groups for ejecting the ink of the first color from the first-color first quantized data, generating quantized data for the second relative movement corresponding to the plurality of recording element groups for ejecting the ink of the first color from the first-color second quantized data, generating quantized data for the first relative movement corresponding to the plurality of recording element groups for ejecting the ink of the second color from the second-color first quantized data, and generating quantized data for the second relative movement corresponding to the plurality of recording element groups for ejecting the ink of the second color from the second-color second quantized data.

9. The image processing apparatus according to claim 8, wherein the input image data is RGB data.

10. An image processing apparatus that processes input image data corresponding to an image to be recorded in a predetermined region of a recording medium, to record the image in the predetermined region of the recording medium by a plurality of relative movements between the recording medium and recording means that includes a plurality of recording element groups for ejecting ink of a single color, the apparatus comprising:

first generating means for generating a plurality of pieces of multivalued image data for a same pixel of the single color respectively corresponding to the plurality of recording element groups from the input image data on a pixel basis;

second generating means for quantizing each of the pieces of the multivalued image data for the same pixel of the single color generated by the first generating means on a pixel basis to generate quantized data corresponding to the plurality of recording element groups; and dividing means for dividing each of the pieces of the quantized data generated by the second generating means and corresponding to the plurality of recording element groups into quantized data corresponding to the plurality of relative movements and being complements of each other.

11. The image processing apparatus according to claim 10, wherein the first generating means generates at least first multivalued image data corresponding to a first relative movement and second multivalued image data corresponding to a second relative movement as the multivalued image data for the single color corresponding to the plurality of recording element groups, and wherein the second generating means quantizes the first multivalued image data on the basis of the second multivalued image data, and quantizes the second multivalued image data on the basis of the first multivalued image data.

12. The image processing apparatus according to claim 11, wherein the quantization includes error diffusion, and wherein the second generating means determines a threshold that is used for performing the error diffusion for the first multivalued image data on the basis of the second multivalued image data and performs the error diffusion for the first multivalued image data on the basis of the determined threshold, and the second generating means determines a threshold that is used for performing the error diffusion for the second multivalued image data on the basis of the first multivalued image data and performs the error diffusion for the second multivalued image data on the basis of the determined threshold.

13. The image processing apparatus according to claim 10, wherein the second generating means includes L-valuing means for converting the multivalued image data for the single color into L values (L is an integer equal to or larger than 3) by an error diffusion method to generate L-valued quantized data, and binarizing means for binarizing the L-valued quantized data generated by the L-valuing means by using a dot pattern to generate binary quantized data.

14. The image processing apparatus according to claim 10, wherein the input image data is RGB data.

15. An image processing apparatus that processes input image data corresponding to a pixel region of a recording medium, to perform recording in the pixel region of the recording medium by a plurality of relative movements between the recording medium and recording means that includes a plurality of recording element groups for ejecting ink of a single color, the apparatus comprising:

first generating means for generating multivalued image data for the single color corresponding to the plurality of recording element groups from the input image data;

second generating means for quantizing the multivalued image data for the single color generated by the first generating means to generate quantized data corresponding to the plurality of recording element groups; and third generating means for performing logical multiplication between the quantized data generated by the second generating means and corresponding to the plurality of recording element groups and a plurality of mask patterns being complements of each other to generate quantized data corresponding to the plurality of recording element groups for the plurality of relative movements.

16. The image processing apparatus according to claim 15, wherein the input image data is RGB data.

17. An image processing method that processes input image data corresponding to an image to be recorded in a predetermined region of a recording medium, to record the image in the predetermined region of the recording medium by M (M is an integer equal to or larger than 2) relative movements between the recording medium and recording means that includes N (N is an integer equal to or larger than 2) recording element groups for ejecting ink of a single color, the method comprising the steps of:

using a processor for generating M sets of multivalued image data for a same pixel of the single color respectively corresponding to the M relative movements from the input image data on a pixel basis;

quantizing each of the M sets of multivalued image data for the same pixel of the single color on a pixel basis to generate M sets of quantized data respectively corresponding to the M relative movements using the processor; and dividing each of the M sets of quantized data into N sets of quantized data corresponding to the N recording element groups and being complements of each other using the processor.

18. An image processing method that processes input image data corresponding to an image to be recorded in a predetermined region of a recording medium, to record the image in the predetermined region of the recording medium by M (M is an integer equal to or larger than 2) relative movements between the recording medium and recording means that includes N (N is an integer equal to or larger than 2) recording element groups for ejecting ink of a single color, the method comprising the steps of:

using a processor for generating N sets of multivalued image data for a same pixel of the single color respectively corresponding to the N recording element groups from the input image data on a pixel basis;

quantizing each of the N sets of multivalued image data for the same pixel of the single color on a pixel basis to generate N sets of quantized data respectively corresponding to the N recording element groups using the processor; and dividing each of the N sets of quantized data into M sets of quantized data corresponding to the M relative movements and being complements of each other using the processor.

* * * * *